(12) United States Patent
Huang et al.

(10) Patent No.: US 11,071,072 B2
(45) Date of Patent: Jul. 20, 2021

(54) PREAMBLE SYMBOL RECEIVING METHOD AND DEVICE

(71) Applicant: Shanghai National Engineering Research Center of Digital Television Co., Ltd., Shanghai (CN)

(72) Inventors: Ge Huang, Shanghai (CN); Hongliang Xu, Shanghai (CN); Guanbin Xing, Shanghai (CN); Wenjun Zhang, Shanghai (CN); Xufeng Guo, Shanghai (CN)

(*) Notice: Subject to any disclaimer, the term of this patent is extended or adjusted under 35 U.S.C. 154(b) by 145 days.

(21) Appl. No.: 15/304,851

(22) PCT Filed: Apr. 16, 2015

(86) PCT No.: PCT/CN2015/076815
§ 371 (c)(1),
(2) Date: Oct. 17, 2016

(87) PCT Pub. No.: WO2015/158296
PCT Pub. Date: Oct. 22, 2015

(65) Prior Publication Data
US 2017/0245231 A1    Aug. 24, 2017

(30) Foreign Application Priority Data

Apr. 16, 2014 (CN) .......... 201410153040.X
Apr. 24, 2014 (CN) .......... 201410168180.4
(Continued)

(51) Int. Cl.
*H04W 56/00* (2009.01)
*H04L 27/26* (2006.01)
*H04L 27/38* (2006.01)

(52) U.S. Cl.
CPC ..... *H04W 56/0005* (2013.01); *H04L 27/2602* (2013.01); *H04L 27/2613* (2013.01);
(Continued)

(58) Field of Classification Search
None
See application file for complete search history.

(56) References Cited

U.S. PATENT DOCUMENTS

| 10,574,494 B2 * | 2/2020 | Zhang | H04L 27/2613 |
| 2005/0105460 A1 * | 5/2005 | Suh | H04L 5/0023 370/203 |

(Continued)

FOREIGN PATENT DOCUMENTS

| CN | 101431803 A | 5/2009 |
| CN | 101960810 A | 1/2011 |
| CN | 102075480 A | 5/2011 |

*Primary Examiner* — Andre Tacdiran
(74) *Attorney, Agent, or Firm* — Kilpatrick Townsend & Stockton LLP

(57) ABSTRACT

A preamble symbol receiving method includes, receiving a signal, processing the received signal, determining whether the processed signal contains the preamble symbol, in response to determining that the processed signal contains the preamble symbol, determining the position of the preamble symbol and resolving signaling information carried by the preamble symbol. The preamble symbol includes at least one time-domain symbol generated using a free combination of any number of first three-segment structures and second three-segment structures according to a predefined generation rule.

44 Claims, 16 Drawing Sheets

(30) Foreign Application Priority Data

| Date | | Number |
|---|---|---|
| Apr. 28, 2014 | (CN) | 201410175323.4 |
| Apr. 29, 2014 | (CN) | 201410177035.2 |
| Apr. 30, 2014 | (CN) | 201410182962.3 |
| May 4, 2014 | (CN) | 201410184919.0 |
| May 5, 2014 | (CN) | 201410185112.9 |
| May 28, 2014 | (CN) | 201410229558.7 |
| Jun. 12, 2014 | (CN) | 201410259080.2 |
| Jun. 19, 2014 | (CN) | 201410274626.1 |
| Jul. 10, 2014 | (CN) | 201410326504.2 |
| Dec. 10, 2014 | (CN) | 201410753506.X |
| Jan. 26, 2015 | (CN) | 201510039510.4 |
| Jan. 30, 2015 | (CN) | 201510052202.5 |
| Jan. 30, 2015 | (CN) | 201510061935.5 |
| Feb. 6, 2015 | (CN) | 201510064118.5 |
| Feb. 12, 2015 | (CN) | 201510076151.X |
| Feb. 12, 2015 | (CN) | 201510076155.8 |
| Feb. 12, 2015 | (CN) | 201510076216.0 |

(52) U.S. Cl.
CPC ...... *H04L 27/2657* (2013.01); *H04L 27/2663* (2013.01); *H04L 27/3818* (2013.01)

(56) References Cited

U.S. PATENT DOCUMENTS

| | | | | |
|---|---|---|---|---|
| 2006/0056528 | A1* | 3/2006 | Jung | H04B 7/0667 375/260 |
| 2006/0153282 | A1* | 7/2006 | Jung | H04L 1/0618 375/146 |
| 2007/0248175 | A1* | 10/2007 | Bruninghaus | H04B 7/0413 375/260 |
| 2009/0225822 | A1* | 9/2009 | Tupala | H04L 27/2675 375/226 |
| 2009/0290654 | A1* | 11/2009 | Yu | H04L 1/0041 375/267 |
| 2010/0054233 | A1 | 3/2010 | Park et al. | |
| 2011/0274204 | A1* | 11/2011 | Ko | H04L 1/0057 375/295 |
| 2013/0315342 | A1* | 11/2013 | Um | H04L 27/2613 375/295 |
| 2015/0229507 | A1* | 8/2015 | Kim | H04L 27/2646 375/260 |
| 2015/0365975 | A1* | 12/2015 | Sahlin | H04L 27/2613 370/252 |
| 2016/0197750 | A1* | 7/2016 | Hong | H04N 21/2389 375/295 |

\* cited by examiner

PREAMBLE SYMBOL RECEIVING METHOD AND DEVICE

This application is a US National Stage of International Application No. PCT/CN2015/076815, filed on Apr. 16, 2015, designating the United States, and claiming priority to Chinese Patent Application No. 201410153040.X, filed Apr. 16, 2014; Chinese Patent Application No. 201410168180.4, filed Apr. 24, 2014; Chinese Patent Application No. 201410175323.4, filed Apr. 28, 2014; Chinese Patent Application No. 201410177035.2, filed Apr. 29, 2014; Chinese Patent Application No. 201410182962.3, filed Apr. 30, 2014; Chinese Patent Application No. 201410184919.0, filed May 4, 2014; Chinese Patent Application No. 201410185112.9, filed May 5, 2014; Chinese Patent Application No. 201410229558.7, filed May 28, 2014; Chinese Patent Application No. 201410259080.2, filed Jun. 12, 2014; Chinese Patent Application No. 201410274626.1, filed Jun. 19, 2014; Chinese Patent Application No. 201410326504.2, filed Jul. 10, 2014; Chinese Patent Application No. 201410753506.X, filed Dec. 10, 2014; Chinese Patent Application No. 201510039510.4, filed Jan. 26, 2015; Chinese Patent Application No. 201510052202.5, filed Jan. 30, 2015; Chinese Patent Application No. 201510061935.5, filed Jan. 30, 2015; CN, 201510064118.5, filed Feb. 6, 2015; Chinese Patent Application No. 201510076155.8, filed Feb. 12, 2015; Chinese Patent Application No. 201510076151.X, filed Feb. 12, 2015; Chinese Patent Application No. 201510076216.0, filed Feb. 12, 2015, the content of which are hereby incorporated by reference in its entirety.

TECHNICAL FIELD

The present invention relates to the technical field of communications, and especially to a preamble symbol receiving method and device.

BACKGROUND ART

Typically, in order to enable a receiving end of an OFDM system to correctly demodulate data sent by a transmitting end, the OFDM system has to realize accurate and reliable time synchronization between the transmitting end and the receiving end. At the same time, since the OFDM system is very sensitive to the frequency offset of a carrier, the receiving end of the OFDM system also has to adopt an accurate and efficient carrier frequency estimation method, so as to precisely estimate and correct the carrier frequency offset.

At present, a signal of an OFDM system is composed of physical frames, and each physical frame generally has one synchronization frame head referred to as a preamble symbol or bootstrap, for realizing the time and frequency synchronization between a transmitting end and a receiving end. The preamble symbol is known to both the transmitting end and the receiving end, and is generally referred to as a P1 symbol. The usage of the P1 symbol or bootstrap symbol includes:

1) Enabling the receiving end to make a detection rapidly to determine whether a signal transmitted in a channel is a signal desired to be received; 2) providing a basic transmission parameter (e.g. the number of FFT points, frame type information, etc.), so that the receiving end can perform subsequent receiving processing; 3) detecting initial carrier frequency offset and a timing error, and compensating same to achieve frequency and timing synchronization; and 4) emergency alarm or broadcast system wakeup.

A P1 symbol design based on an existing time-domain structure is proposed in existing standards such as DVB_T2 standard, which well achieves the above-mentioned functions. However, there are still some limitations on low-complexity receiving algorithms. By way of example, in the case of long and multi-path channels with 1024, 542, or 482 samples, rough timing synchronization will cause great deviation, thus leading mistake when estimating integral frequency offset of the carrier in the frequency domain. Further, in a complex frequency selective fading channel, for example in a long multi-path channel, DBPSK differential decoding method may also fail. Moreover, since the time-domain structure of the preamble symbol in the DVB_T2 standard does not include a cyclic prefix, when channel estimation needs to be conducted by utilizing the preamble symbol, the frequency-domain channel estimation performance thereof will be severely degraded.

SUMMARY OF THE INVENTION

The problem to be solved by the present invention is that at present, in DVB_T2 standard and other standards, the time-domain structure of the preamble symbol in the DVB_T2 standard cannot be applied to coherent detection, in a complex frequency selective fading channel, the DBPSK differential decoding method of the preamble symbol would fail, and the receiving algorithm detection will probably fail.

In order to solve the problem, the embodiments of the present invention provide the following preamble symbol receiving method and device.

Method I

The embodiments of the present invention provide a preamble symbol receiving method, characterizing by comprising the following steps: processing a received signal; judging whether the processed signal obtained contains the preamble symbol desired to be received; and if a judgement result is yes, determining the position of the preamble symbol and resolving signalling information carried by the preamble symbol, wherein the received preamble symbol comprises at least one time-domain symbol generated by a sending end using a free combination of any number of first three-segment structures and/or second three-segment structures according to a predefined generation rule, the first three-segment structure containing: a time-domain main body signal, a prefix generated based on the entirety or a portion of the time-domain main body signal, and a postfix generated based on the entirety or a portion of a partial time-domain main body signal, and the second three-segment structure containing: the time-domain main body signal, a prefix generated based on the entirety or a portion of the time-domain main body signal, and a hyper prefix generated based on the entirety or a portion of the partial time-domain main body signal.

Optionally, the provided preamble symbol receiving method further comprise such features: the steps of judging whether the processed signal obtained contains the preamble symbol desired to be received, and if a judgement result is yes, determining the position of the preamble symbol and resolving signalling information carried by the preamble symbol contain at least any one of the following steps: initial timing synchronization, integer frequency offset estimation, fine timing synchronization, channel estimation, decoding analysis and fractional frequency offset estimation.

Optionally, the provided preamble symbol receiving method further comprise such features: at least any one of the following is utilized to judge if the processed signal contains the preamble symbol desired to be received: an initial timing synchronization method, an integer frequency offset estimation method, a fine timing synchronization method, a channel estimation method, a decoding result analysis method and a fractional frequency offset estimation method.

Optionally, the provided preamble symbol receiving method further comprise such features: the position of the preamble symbol is preliminarily determined by means of initial timing synchronization, and it is judged, based on a result of the initial timing synchronization, whether the processed signal contains the preamble symbol containing the three-segment structure and desired to be received.

Optionally, the provided preamble symbol receiving method further comprise such features: the position of the preamble symbol is preliminarily determined by means of any one of the following initial timing synchronization methods, a first initial timing synchronization method, comprising: performing necessary inverse processing on the received signal, which has been processed, by utilizing an association relationship between any two segments in a first predefined three-segment time-domain structure and/or a second predefined three-segment time-domain structure, and performing delayed moving autocorrelation to acquire basic accumulation correlation values; when the signal comprises at least two time-domain symbols with a three-segment structure, grouping the basic accumulation correlation values according to different delay lengths of the delayed moving autocorrelation, and performing at least one delay relationship match and/or phase adjustment between symbols in each group according to a specific assembling relationship of the at least two time-domain symbols, and then carrying out a mathematical calculation to obtain several final accumulation correlation values with regard to a certain delay length, and when there is only one time-domain symbol with a three-segment structure, the final accumulation correlation value is the basic accumulation correlation value; and after performing delay relationship match and/or a specific predefined mathematical calculation based on at least one of the final accumulation correlation values, using the result of the calculation for initial timing synchronization; a second initial timing synchronization method, comprising: when a time-domain main body signal in any three-segment structure in the preamble symbol contains a known signal, performing a differential operation on the time-domain main body signal in accordance with N predefined differential values, and also performing a differential operation on a time-domain signal corresponding to known information, then correlating the two to obtain N sets of differential correlated results corresponding to the N differential values on a one-to-one basis, and performing initial synchronization based on the N sets of differential correlated results to obtain processed values for preliminarily determining the position of the preamble symbol, where N≥1, wherein when the determination of the position of the preamble symbol is accomplished based on the first initial timing synchronization method and the second initial timing synchronization method, weighting the processed values obtained respectively, and completing initial timing synchronization using the weighted results.

Optionally, the provided preamble symbol receiving method further comprise such features: the first initial timing synchronization method comprises: when the signal comprises two time-domain symbols with three-segment structure, grouping the basic accumulation correlation values according to different delay lengths of the delayed moving autocorrelation, and for each set, performing one delay relationship match and/or phase adjustment between symbols according to a assembling relationship specific to the two time-domain symbols, and then carrying out a mathematical calculation to obtain several final accumulation correlation values with regard to a certain delay length.

Optionally, the provided preamble symbol receiving method further comprise such features: the first initial timing synchronization method further comprises adjusting, within a certain range, delay lengths that there should be during each delayed moving autocorrelation, to form a plurality of adjusted delay lengths; then performing delayed moving autocorrelation according to the plurality of obtained adjusted delay lengths and the delay lengths that there should be, and choosing a correlation result which is the most significant as the basic accumulation correlation value.

Optionally, the provided preamble symbol receiving method further comprise such features: the N differential values are selected according to at least any one of the following predefined differential selection rules, for initial synchronization: a first predefined differential selection rule containing: selecting any several differential values within the range of the length of a local time-domain sequence corresponding to the know information; and a second predefined differential selection rule containing: selecting several differential values which constitute an arithmetic sequence, within the range of the length of the local time-domain sequence corresponding to the know information.

Optionally, the provided preamble symbol receiving method further comprise such features: when the N differential values are selected using the first predefined differential selection rule, accumulating or averaging the weighted absolute values of N sets of differential correlated results obtained on a one-to-one basis; or when the N differential values are selected using the first predefined differential selection rule or the second predefined differential selection rule, accumulating or averaging weighted vectors of the obtained N sets of differential correlated results.

Optionally, the provided preamble symbol receiving method further comprise such features: fractional frequency offset estimation is conducted by utilizing a result of the first initial timing synchronization method and/or the second initial timing synchronization method, when a result of the first initial timing synchronization method is used, the result comprises the final accumulation correlation value obtained by performing predefined processing calculation utilizing a processing relationship corresponding to the time-domain main body signal and the prefix in the first three-segment structure and/or the second three-segment structure, and a second fractional frequency offset value is calculated from the accumulation correlation value; the result of the first initial timing synchronization method also comprises two said final accumulation correlation values obtained by performing predefined processing calculation utilizing a processing relationship corresponding to the time-domain main body signal and the postfix/the hyper prefix and a processing relationship corresponding to the prefix and the postfix/the hyper prefix in the first three-segment structure and/or the second three-segment structure, and a third fractional frequency offset value is calculated from the two accumulation correlation values; the fractional frequency offset estimation can be conducted based on at least any one of the obtained second fractional frequency offset value and third fractional frequency offset value; and when utilizing the results of the first initial timing synchronization method and the second initial timing synchronization method, a fractional frequency offset value is obtained based on at least any one of or a combination of at least any two of the first fractional frequency offset value, the second fractional frequency offset value and the third fractional frequency offset value.

Optionally, the provided preamble symbol receiving method further comprise such features: based on a result of the initial timing synchronization method, if it is detected that the result satisfies a pre-set condition, then it is determined that the processed signal contains an expected preamble symbol containing the three-segment structure, wherein the pre-set condition contains: conducting a specific calculation based on the result of the initial timing synchronization, and then judging whether the maximum value of a calculation result exceeds a predefined threshold, or further determining it in conjunction with an integer frequency offset estimation result and/or a decoding result.

Optionally, the provided preamble symbol receiving method further comprise such features: the preamble symbol receiving method further comprises: conducting fractional frequency offset estimation by utilizing a result of an initial timing synchronization method.

Optionally, the provided preamble symbol receiving method further comprise such features: the step of determining the position of the preamble symbol and resolving signalling information carried by the preamble symbol comprises: resolving the signalling information carried by the preamble symbol by utilizing the entirety or a portion of a time-domain waveform of the preamble symbol and/or a frequency-domain signal obtained through performing Fourier transform on the time-domain waveform.

Optionally, the provided preamble symbol receiving method further comprise such features: in the predefined generation rule, the generated preamble symbol comprises: a free combination of several time-domain symbols with the first three-segment structure and/or several time-domain symbols with the second three-segment structure arranged in any order. the first three-segment structure containing: a time-domain main body signal, a prefix generated based on a rear part of the time-domain main body signal, and a postfix generated based on the rear part of the time-domain main body signal, and the second three-segment structure containing: a time-domain main body signal, a prefix generated based on a rear part of the time-domain main body signal, and a hyper prefix generated based on the rear part of the time-domain main body signal.

Optionally, the provided preamble symbol receiving method further comprise such features: when a transmitting end generates the postfix or the hyper prefix by truncating the time-domain main body signal to get a partial signal, different start points of the truncation are used for transmitting different signalling information, and the signalling is parsed based on the following: different delay relationships of the same content between the prefix and the postfix or the hyper prefix, and/or the time-domain main body signal and the postfix or the hyper prefix.

Optionally, the provided preamble symbol receiving method further comprise such features: the parsed signalling contains emergency broadcast.

Optionally, the provided preamble symbol receiving method further comprise such features: the preamble symbol is obtained by processing a frequency-domain symbol, and the generation step of the frequency-domain symbol comprises: arranging a fixed sequence and a signalling sequence, which are generated respectively, in a predefined arrangement rule, and filling valid subcarriers with arranged fixed sequence and signalling sequence.

Optionally, the provided preamble symbol receiving method further comprise such features: the step of resolving signalling information carried by the preamble symbol comprises: resolving the signalling information carried by signalling sequence subcarriers in the preamble symbol by performing calculation using a signal containing all or some of the signalling sequence subcarriers and a set of signalling sequence subcarriers, or resolving the signalling information carried by the signalling sequence subcarriers in the preamble symbol by performing calculation using a time-domain signal corresponding to the entire or a portion of the set of signalling sequence subcarriers.

Optionally, the provided preamble symbol receiving method further comprise such features: conducting fine timing synchronization using a fixed subcarrier sequence contained in at least one time-domain symbol.

Optionally, the provided preamble symbol receiving method further comprise such features: when the time-domain main body signal in the preamble symbol or a corresponding frequency-domain main body signal contains a known signal, the preamble symbol receiving method further comprises integer frequency offset estimation in any of the following manners: according to a result of the initial timing synchronization, truncating to get a section of time-domain signal at least containing the entirety or a portion of the time-domain main body signal, modulating the truncated section of time-domain signal using different frequency offsets in a frequency sweeping manner to obtain N frequency sweeping time-domain signals corresponding to the offset values on a one-to-one basis, and after performing moving correlation between a known time-domain signal obtained by performing inverse Fourier transform on a known frequency-domain sequence and each frequency sweeping time-domain signal, comparing the maximum correlation peaks of N correlation results, regarding a frequency offset value by which a frequency sweeping time-domain signal corresponding to the maximum correlation result is modulated as the integer frequency offset estimation value; or performing Fourier transform on the time-domain signal which is truncated to the length of the time-domain main body signal according to the result of the initial timing synchronization, conducting cyclic shift on the obtained frequency-domain subcarriers using different shift values within a frequency sweeping range, truncating a received sequence corresponding to a valid subcarrier, performing predefined calculation and then inverse transform on the received sequence and the known frequency-domain sequence, performing selection from several groups of inverse transform results corresponding to the shift values on a one-to-one basis to obtain a corresponding shift value, and obtaining the integer frequency offset estimation value according to a corresponding relationship between the shift value and the integer frequency offset estimation value.

Optionally, the provided preamble symbol receiving method further comprise such features: the step of channel estimation comprises: performing arbitrarily on the time domain and/or on the frequency domain: after finishing the decoding of the previous time-domain main body signal, using obtained decoded information as known information to perform channel estimation on the time domain/frequency domain once again and perform certain specific calculation on a previous channel estimation result to obtain a new channel estimation result, which will be used in channel estimation of signalling parsing for the next time-domain main body signal.

Optionally, the provided preamble symbol receiving method further comprise such features: the received preamble symbol is obtained by processing the frequency-domain subcarrier, the frequency-domain subcarrier being generated based on the frequency-domain main body sequence, The steps of generating the frequency-domain subcarrier contains: a predefined sequence generation rule for generating the frequency-domain main body sequence, and/or a predefined processing rule for processing the frequency-domain main body sequence for generating the frequency-domain subcarrier. The predefined sequence generation rule contains either one or a combination of two of the following: generating a sequence based on different sequence generation formulas; and/or generating a sequence based on the same sequence generation formula, and further preforming cyclic shift on the generated sequence. The predefined processing rule contains: according to the frequency offset value, performing phase modulation on a pre-generated subcarrier which is obtained by processing the frequency-domain main body sequence.

Optionally, the provided preamble symbol receiving method further comprise such features: when the preamble symbol at least contains one time-domain symbol, in the case where a first time-domain symbol contains known information, fine timing synchronization is conducted by utilizing the known information.

Optionally, the provided preamble symbol receiving method further comprise such features: in the step of parsing signalling information, firstly, producing a set of known signalling sequences using all possible different root values and/or different frequency-domain shift values, and then conducting calculation using the set of signalling sequences and all possible frequency-domain modulation frequency offset values and a frequency-domain main body sequence transmitted by the transmitting end.

Optionally, the provided preamble symbol receiving method further comprise such features: when the time-domain main body signal in the preamble symbol or a corresponding frequency-domain main body signal contains a known signal, the preamble symbol receiving method further comprises integer frequency offset estimation in any of the following manners: according to a result of the initial timing synchronization, truncating to get a section of time-domain signal at least containing the entirety or a portion of the time-domain main body signal, modulating the truncated section of time-domain signal using different frequency offsets in a frequency sweeping manner to obtain N frequency sweeping time-domain signals corresponding to the offset values on a one-to-one basis, and after performing moving correlation between a known time-domain signal obtained by performing inverse Fourier transform on a known frequency-domain sequence and each frequency sweeping time-domain signal, comparing the maximum correlation peaks of N correlation results, regarding a frequency offset value by which a frequency sweeping time-domain signal corresponding to the maximum correlation result is modulated as the integer frequency offset estimation value; or performing Fourier transform on the time-domain signal which is truncated to the length of the time-domain main body signal according to the result of the initial timing synchronization, conducting cyclic shift on the obtained frequency-domain subcarriers using different shift values within a frequency sweeping range, truncating a received sequence corresponding to a valid subcarrier, performing predefined calculation and then inverse transform on the received sequence and the known frequency-domain sequence, performing selection from several groups of inverse transform results corresponding to the shift values on a one-to-one basis to obtain a corresponding shift value, and obtaining the integer frequency offset estimation value according to a corresponding relationship between the shift value and the integer frequency offset estimation value.

Optionally, the provided preamble symbol receiving method further comprise such features: the step of channel estimation comprises: performing arbitrarily on the time domain and/or on the frequency domain: after finishing the decoding of the previous time-domain main body signal, using obtained decoded information as known information to perform channel estimation on the time domain/frequency domain once again and perform certain specific calculation on a previous channel estimation result to obtain a new channel estimation result, which will be used in channel estimation of signalling parsing for the next time-domain main body signal.

Optionally, the provided preamble symbol receiving method further comprise such features: after the integer frequency offset estimation, compensating the frequency offset and parsing the transmitted signalling.

Optionally, the provided preamble symbol receiving method further comprise such features: when generating a sequence using different sequence generation formulas; and/or generating a sequence based on the same sequence generation formula, and further preforming cyclic shift on the generated sequence, in the process of generating the frequency-domain subcarrier, performing a specific mathematical calculation on the frequency-domain signalling subcarrier and the channel estimation value, and all possible frequency-domain main body sequence, so as to parse the signalling, wherein the specific mathematical calculation contains any one of the following: maximum likelihood correlation calculation incorporating channel estimation; or performing channel equalization on the frequency-domain signalling subcarrier using the channel estimation value, then performing correlation calculation with all of the possible frequency-domain main body sequences, and selecting the maximum correlation value as a decoding result of signalling parsing.

Optionally, the provided preamble symbol receiving method further comprise such features: the process of generating the frequency-domain subcarrier includes: performing phase modulation on a pre-generated subcarrier using the frequency offset value, or performing cyclic shift in the time domain after inverse Fourier transform.

Optionally, the provided preamble symbol receiving method further comprise such features: the step of determining the position of the preamble symbol and parsing signalling information carried by the preamble symbol comprises: performing Fourier transform on the time-domain main body signal of each of the time-domain symbol to extract valid subcarriers; performing predefined mathematical calculation using each of the valid subcarriers and a known subcarrier corresponding to each known frequency-domain sequence in a set of known frequency-domain signalling of the time-domain symbol and a channel estimation value, and then performing inverse Fourier transform, and obtaining a corresponding inverse Fourier result for each of the known frequency-domain sequence; and each of the time-domain symbol selecting an inverse Fourier selection result from one or more of the inverse Fourier results according to a first predefined selection rule, then performing a predefined processing operation using a plurality of the time-domain symbols, and resolving the signalling information based on an obtained inter-symbol processing result.

Optionally, the provided preamble symbol receiving method further comprise such features: calculating the absolute value or square of the absolute value of the inverse Fourier selection result, and then selecting the inverse Fourier selection result according to the first predefined selection rule.

Optionally, the provided preamble symbol receiving method further comprise such features: the first predefined selection rule contains performing selection according to the maximum peak value and/or performing selection according to the peak-to-average ratio.

Optionally, the provided preamble symbol receiving method further comprise such features: the method further comprises a noise filtering processing step comprising: noise filtering processing can be performed on the inverse Fourier result of each time-domain symbol, with large values being reserved and all smaller values being set to zero.

Optionally, the provided preamble symbol receiving method further comprise such features: the parsed signalling information contains: signalling transmitted using different frequency-domain sequences and/or signalling transmitted using a frequency-domain modulation frequency offset, i.e. a time-domain cyclic shift value.

Optionally, the provided preamble symbol receiving method further comprise such features: the set of known frequency-domain signalling refers to all possible frequency-domain sequences of the time-domain main body signal corresponding to each time-domain symbol on frequency-domain subcarrier modulation while phase modulation is not performed.

Optionally, the provided preamble symbol receiving method further comprise such features: if there is only one known sequence within a set of known frequency-domain sequences of the time-domain symbols, the first predefined selection rule is: directly selecting the unique inverse Fourier result of each of the time-domain symbols as the inverse Fourier selection result, then performing a predefined processing operation between a plurality of the time-domain symbols, and resolving the signalling information based on an obtained inter-symbol processing result.

Optionally, the provided preamble symbol receiving method further comprise such features: the predefined mathematical calculation contains: conjugate multiplication or division calculation.

Optionally, the provided preamble symbol receiving method further comprise such features: the step of performing a predefined processing operation between a plurality of the time-domain symbols and resolving the signalling information based on an obtained inter-symbol processing result comprises: multiplying or conjugate multiplying a later time-domain symbol which have been cyclically shifted and a former time-domain symbol, and accumulating to obtain an accumulated value, finding out a shift value corresponding to a maximum accumulated value in all the predefined frequency offset values or cyclic shift values, and deriving the signalling information from the shift value.

Optionally, the provided preamble symbol receiving method further comprise such features: the step of determining the position of the preamble symbol and parsing signalling information carried by the preamble symbol comprises: extending the set of known frequency-domain signalling of each time-domain symbol to be an extended set of known frequency-domain signalling. performing Fourier transform on the time-domain main body signal of each of the time-domain symbol to extract valid subcarriers; performing predefined mathematical calculation using each of the valid subcarriers and the known subcarrier corresponding to each known frequency-domain sequence in the extended set of known frequency-domain signalling and the channel estimation value, and then accumulating the calculation values on all the valid subcarriers; and selecting an accumulated value from a plurality of accumulated values according to a second predefined selection rule, using a known frequency-domain sequence of the extended set of known frequency-domain signalling corresponding to the accumulated value to infer the signalling transmitted using the frequency-domain modulation frequency offset value, i.e. the time-domain cyclic shift, and selecting a corresponding known frequency-domain sequence from the original set of known frequency-domain signalling before extension, so as to resolve signalling information transmitted by different frequency-domain sequences.

Optionally, the provided preamble symbol receiving method further comprise such features: the second predefined selection rule contains performing selection according to the maximum absolute value or performing selection according to the maximum real part.

Optionally, the provided preamble symbol receiving method further comprise such features: the set of known frequency-domain signalling refers to all possible frequency-domain sequences of the time-domain main body signal corresponding to each time-domain symbol on frequency-domain subcarrier while phase modulation is not performed.

Optionally, the provided preamble symbol receiving method further comprise such features: the extended set of known frequency-domain signalling is obtained in the following way: performing phase modulation on of each known frequency-domain sequence of the set of known frequency-domain signalling on the subcarriers using all possible frequency offset values, wherein all the possible S modulation frequency offset values correspondingly generate S frequency offset modulated known sequences.

Optionally, the provided preamble symbol receiving method further comprise such features: when there is only one known sequence within the non-extended set of known frequency-domain signalling of the symbol, namely, the signalling information is transmitted only by a frequency-domain modulation frequency offset s, i.e., the time-domain cyclic shift value, the extended set of known frequency-domain signalling contains altogether S known frequency-domain sequences, and the modulation frequency offset value can be inferred by utilizing the known frequency-domain sequences of the extended set of known frequency-domain signalling corresponding to the modulation frequency offset s, thus obtaining the signalling information transmitted by the frequency-domain modulation frequency offset, i.e. the time-domain cyclic shift.

Optionally, the provided preamble symbol receiving method further comprise such features: the predefined mathematical calculation contains: conjugate multiplication or division calculation.

Optionally, the provided preamble symbol receiving method further comprise such features: the step of determining the position of the preamble symbol and parsing signalling information carried by the preamble symbol comprises: performing Fourier transform on the time-domain main body signal of each of the time-domain symbol to extract valid subcarriers; performing predefined mathematical calculation using each of the valid subcarriers and a known subcarrier corresponding to each known frequency-domain sequence in a set of known frequency-domain signalling of the time-domain symbol and a channel estimation value, and then performing inverse Fourier transform, and obtaining a corresponding inverse Fourier transform result for each of the known frequency-domain sequence; and each of the time-domain symbol, based on an inverse Fourier selection result selected from one or more of the inverse Fourier results according to a first predefined selection rule, performing a predefined processing operation using a plurality of the time-domain symbols, and resolving the signalling information based on an obtained inter-symbol processing result.

Optionally, the provided preamble symbol receiving method further comprise such features: the method further comprises: calculating the absolute value or square of the absolute value of the inverse Fourier selection result, and then selecting the inverse Fourier selection result according to the first predefined selection rule.

Optionally, the provided preamble symbol receiving method further comprise such features: the first predefined selection rule contains performing selection according to the maximum peak value and/or performing selection according to the peak-to-average ratio.

Optionally, the provided preamble symbol receiving method further comprise such features: the method further comprises a noise filtering processing step comprising: noise filtering processing can be performed on the inverse Fourier result of each time-domain symbol, with large values being reserved and all smaller values being set to zero.

Optionally, the provided preamble symbol receiving method further comprise such features: the parsed signalling information contains: signalling transmitted using different frequency-domain sequences and/or signalling transmitted using a frequency-domain modulation frequency offset, i.e. a time-domain cyclic shift value.

Optionally, the provided preamble symbol receiving method further comprise such features: the set of known frequency-domain signalling refers to all possible frequency-domain sequences of the time-domain main body signal corresponding to each time-domain symbol that are used for filling the frequency-domain subcarriers while phase modulation is not performed.

Optionally, the provided preamble symbol receiving method further comprise such features: if there is only one known sequence within a set of known frequency-domain sequences of the time-domain symbols, the first predefined selection rule is: directly selecting the unique inverse Fourier result of each of the time-domain symbols as the inverse Fourier selection result, then performing a predefined processing operation between a plurality of the time-domain symbols, and resolving the signalling information based on an obtained inter-symbol processing result.

Optionally, the provided preamble symbol receiving method further comprise such features: the predefined mathematical calculation contains: conjugate multiplication or division calculation.

Optionally, the provided preamble symbol receiving method further comprise such features: the step of performing a predefined processing operation between a plurality of the time-domain symbols and resolving the signalling information based on an obtained inter-symbol processing result comprises: multiplying or conjugate multiplying a later time-domain symbol and a former time-domain symbol which have been cyclically shifted, and accumulating to obtain an accumulated value, finding out a shift value corresponding to a maximum accumulated value in all the predefined frequency offset values or cyclic shift values, and deriving the signalling information from the shift value.

Method II

Furthermore, the embodiments of the present invention also provide a preamble symbol receiving method, characterizing by comprising the following steps: processing a received signal; judging whether the processed signal obtained contains the preamble symbol desired to be received; and if a judgement result is yes, determining the position of the preamble symbol and resolving signalling information carried by the preamble symbol, wherein the received preamble symbol is obtained by processing a frequency-domain symbol, and the generation step of the frequency-domain symbol comprises: arranging a fixed sequence and a signalling sequence, which are generated respectively, in a predefined arrangement rule, and filling valid subcarriers with the arranged fixed sequence and signalling sequence.

Optionally, the provided preamble symbol receiving method further comprise such features: at least any one of the following method is utilized to judge if the processed signal contains the preamble symbol desired to be received: an initial timing synchronization method, an integer frequency offset estimation method, a fine timing synchronization method, a channel estimation method, a decoding result analysis method and a fractional frequency offset estimation method.

Optionally, the provided preamble symbol receiving method further comprise such features: the functions of judging if the received signal, which has been processed, contains the preamble symbol desired to be received, and if a judgement result is yes, determining the position of the preamble symbol and resolving signalling information carried by the preamble symbol contains are realized by utilizing at least any one of the following steps: initial timing synchronization, integer frequency offset estimation, fine timing synchronization, channel estimation, decoding analysis and fractional frequency offset estimation.

Optionally, the provided preamble symbol receiving method further comprise such features: using the fixed sequence to perform an integer frequency offset estimation or channel estimation comprises the following steps: according to the determined position of the preamble symbol, truncating to get a signal containing the entirety or a portion of the fixed subcarrier; and performing calculation using the truncated signal and a frequency-domain fixed subcarrier sequence or a time-domain signal corresponding to the frequency-domain fixed subcarrier sequence, so as to realize an integer frequency offset estimation or channel estimation.

Optionally, the provided preamble symbol receiving method further comprise such features: conducting fine timing synchronization using a fixed subcarrier sequence contained in at least one time-domain symbol in the preamble symbol.

Optionally, the provided preamble symbol receiving method further comprise such features: the step of determining the position of the preamble symbol and resolving signalling information carried by the preamble symbol comprises: resolving the signalling information carried by the preamble symbol by utilizing the entirety or a portion of a time-domain waveform of the preamble symbol and/or a frequency-domain signal obtained through performing Fourier transform on the entirety or a portion of the time-domain waveform of the preamble symbol.

Optionally, the provided preamble symbol receiving method further comprise such features: when the time-domain main body signal in the preamble symbol or a corresponding frequency-domain main body signal contains a known signal, the method further comprises performing any of the following integer frequency offset estimation using the preamble symbol: according to a result of the initial timing synchronization, truncating to get a section of time-domain signal at least containing the entirety or a portion of the time-domain main body signal, modulating the truncated section of time-domain signal using different frequency offsets in a frequency sweeping manner to obtain N frequency sweeping time-domain signals corresponding to the offset values on a one-to-one basis, and after performing moving correlation between a known time-domain signal obtained by performing inverse transform on a known frequency-domain sequence and each frequency sweeping time-domain signal, comparing the maximum correlation peaks of N correlation results, regarding a frequency offset value by which a frequency sweeping time-domain signal corresponding to the maximum correlation result is modulated as the integer frequency offset estimation value; or performing Fourier transform on the time-domain signal which is truncated to the length of the time-domain main body signal using the result of the initial timing synchronization, conducting cyclic shift on the obtained frequency-domain subcarriers using different shift values within a frequency sweeping range, truncating a received sequence corresponding to a valid subcarrier, performing predefined calculation and then inverse Fourier transform on the received sequence and the known frequency-domain sequence, performing selection from several groups of inverse transform results corresponding to the shift values on a one-to-one basis to obtain a corresponding shift value, and obtaining the integer frequency offset estimation value according to a corresponding relationship between the shift value and the integer frequency offset estimation value.

Optionally, the provided preamble symbol receiving method further comprise such features: the step of resolving signalling information carried by the preamble symbol comprises: resolving the signalling information carried by signalling sequence subcarriers in the preamble symbol by performing calculation using a signal containing all or some of the signalling sequence subcarriers and a set of signalling sequence subcarriers, or a time-domain signal corresponding to the set of signalling sequence subcarriers, Method III Furthermore, the embodiments of the present invention also provide a preamble symbol receiving method, characterizing by comprising the following steps: processing a received signal; judging whether the received signal which has been processed contains the preamble symbol desired to be received; and if a judgement result is yes, determining the position of the preamble symbol and resolving signalling information carried by the preamble symbol, the received preamble symbol is obtained by performing inverse Fourier transform on the frequency-domain subcarrier, the frequency-domain subcarrier being generated based on the frequency-domain main body sequence, The steps of generating the frequency-domain subcarrier contains: a predefined sequence generation rule for generating the frequency-domain main body sequence, and/or a predefined processing rule for processing the frequency-domain main body sequence for generating the frequency-domain subcarrier. The predefined sequence generation rule contains either one or a combination of two of the following: generating a sequence based on different sequence generation formulas; and/or generating a sequence based on the same sequence generation formula, and further preforming cyclic shift on the generated sequence. The predefined processing rule contains: according to the frequency offset value, performing phase modulation on a pre-generated subcarrier which is obtained by processing the frequency-domain main body sequence.

Optionally, the provided preamble symbol receiving method further comprise such features: the steps of judging whether the processed signal obtained contains the preamble symbol desired to be received, and if a judgement result is yes, determining the position of the preamble symbol and resolving signalling information carried by the preamble symbol contain at least any one of the following steps: initial timing synchronization, integer frequency offset estimation, fine timing synchronization, channel estimation, decoding analysis and fractional frequency offset estimation.

Optionally, the provided preamble symbol receiving method further comprise such features: at least any one of the following method is utilized to judge if the processed signal contains the preamble symbol desired to be received: an initial timing synchronization method, an integer frequency offset estimation method, a fine timing synchronization method, a channel estimation method, a decoding result analysis method and a fractional frequency offset estimation method.

Optionally, the provided preamble symbol receiving method further comprise such features: when the preamble symbol contains at least one time-domain symbol, if a first time-domain symbol contains known information, fine timing synchronization is conducted by utilizing the known information.

Optionally, the provided preamble symbol receiving method further comprise such features: the step of channel estimation comprises: performing arbitrarily on the time domain and/or on the frequency domain: after finishing the decoding of the previous time-domain main body signal, using obtained decoded information as sending information to perform channel estimation on the time domain/frequency domain once again and perform certain specific calculation on a previous channel estimation result to obtain a new channel estimation result, which will be used in channel estimation of signalling parsing for the next time-domain main body signal.

Optionally, the provided preamble symbol receiving method further comprise such features: when the time-domain main body signal in the preamble symbol or a corresponding frequency-domain main body signal contains a known signal, the preamble symbol receiving method further comprises integer frequency offset estimation in any of the following manners: modulating the entirety or a portion of the truncated time-domain signal using different frequency offsets in a frequency sweeping manner to obtain several frequency sweeping time-domain signals, and after performing moving correlation between a known time-domain signal obtained by performing inverse transform on a known frequency-domain sequence and each frequency sweeping time-domain signal, regarding a frequency offset value by which a frequency sweeping time-domain signal of the maximum correlation peak value is modulated as the integer frequency offset estimation value; or conducting cyclic shift on frequency-domain subcarriers, which are obtained by performing Fourier transform on the time-domain main body signal truncated according to the position result of the initial timing synchronization, using different shift values within a frequency sweeping range, truncating a received sequence corresponding to valid subcarriers, performing predefined calculation and then inverse transform on the received sequence and the known frequency-domain sequence, obtaining a shift value from inverse transform results corresponding to several groups of shift values, thereby obtaining the integer frequency offset estimation value according to a corresponding relationship between the shift value and the integer frequency offset estimation value.

Optionally, the provided preamble symbol receiving method further comprise such features: after the integer frequency offset estimation, compensating the frequency offset and parsing the transmitted signalling.

Optionally, the provided preamble symbol receiving method further comprise such features: when generating a sequence using different sequence generation formulas; and/or generating a sequence based on the same sequence generation formula, and further preforming cyclic shift on the generated sequence, in the process of generating the frequency-domain subcarrier, a specific mathematical calculation is performed on the frequency-domain signalling subcarrier and the channel estimation value, and all possible frequency-domain main body sequence, so as to realize signalling parsing, wherein the specific mathematical calculation containing any one of the following: maximum likelihood correlation calculation incorporating channel estimation; or performing channel equalization on the frequency-domain signalling subcarrier using the channel estimation value, then performing correlation calculation using an equalized signal and all of the possible frequency-domain main body sequences, and selecting the maximum correlation value as a decoding result of signalling parsing.

Optionally, the provided preamble symbol receiving method further comprise such features: the step of determining the position of the preamble symbol and resolving signalling information carried by the preamble symbol comprises: resolving the signalling information carried by the preamble symbol by utilizing the entirety or a portion of a time-domain waveform of the preamble symbol and/or utilizing a frequency-domain signal obtained through performing Fourier transform on the entirety or a portion of the time-domain waveform of the preamble symbol.

Optionally, the provided preamble symbol receiving method further comprise such features: the generation process of the frequency-domain subcarrier includes: performing phase modulation on a pre-generated subcarrier using the predefined frequency offset value or performing inverse Fourier transform on the frequency-domain subcarriers and then performing cyclic shift in the time domain.

Optionally, the provided preamble symbol receiving method further comprise such features: the step of determining the position of the preamble symbol and parsing signalling information carried by the preamble symbol comprises: performing Fourier transform on the time-domain main body signal of each of the time-domain symbol to extract valid subcarriers; performing predefined mathematical calculation using each of the valid subcarriers and a known subcarrier corresponding to each known frequency-domain sequence in a set of known frequency-domain signalling of the time-domain symbol and a channel estimation value, and then performing inverse Fourier transform, and obtaining a corresponding inverse Fourier transform result for each of the known frequency-domain sequence; and each of the time-domain symbol, based on an inverse Fourier selection result selected from one or more of the inverse Fourier results according to a first predefined selection rule, performing a predefined processing operation on a plurality of the time-domain symbols, and resolving the signalling information based on an obtained inter-symbol processing result.

Optionally, the provided preamble symbol receiving method further comprise such features: the method further comprises: calculating the absolute value or square of the absolute value of the inverse Fourier selection result, and then selecting the inverse Fourier selection result according to the first predefined selection rule.

Optionally, the provided preamble symbol receiving method further comprise such features: the first predefined selection rule contains performing selection according to the maximum peak value and/or performing selection according to the peak-to-average ratio.

Optionally, the provided preamble symbol receiving method further comprise such features: the method further comprises a noise filtering processing step comprising: noise filtering processing can be performed on the inverse Fourier result of each time-domain symbol, with large values being reserved and all smaller values being set to zero.

Optionally, the provided preamble symbol receiving method further comprise such features: the parsed signalling information contains: signalling transmitted using different frequency-domain sequences and/or signalling transmitted using a frequency-domain modulation frequency offset, i.e. a time-domain cyclic shift value.

Optionally, the provided preamble symbol receiving method further comprise such features: the set of known frequency-domain signalling refers to all possible frequency-domain sequences of the time-domain main body signal corresponding to each time-domain symbol that are used for filling the frequency-domain subcarriers while phase modulation is not performed.

Optionally, the provided preamble symbol receiving method further comprise such features: if there is only one known sequence within a set of known frequency-domain sequences of the time-domain symbols, the first predefined selection rule is: directly selecting the unique inverse Fourier result of each of the time-domain symbols as the inverse Fourier selection result, then performing a predefined processing operation between a plurality of the time-domain symbols, and resolving the signalling information based on an obtained inter-symbol processing result.

Optionally, the provided preamble symbol receiving method further comprise such features: the predefined mathematical calculation contains: conjugate multiplication or division calculation.

Optionally, the provided preamble symbol receiving method further comprise such features: the step of performing a predefined processing operation between a plurality of the time-domain symbols and resolving the signalling information based on an obtained inter-symbol processing result comprises: multiplying or conjugate multiplying a later time-domain symbol which have been cyclically shifted and a former time-domain symbol, and accumulating to obtain an accumulated value, finding out a shift value corresponding to a maximum accumulated value in all the predefined frequency offset values or cyclic shift values, and deriving the signalling information from the shift value.

Optionally, the provided preamble symbol receiving method further comprise such features: the step of determining the position of the preamble symbol and parsing signalling information carried by the preamble symbol comprises: extending the set of known frequency-domain signalling of each time-domain symbol to be an extended set of known frequency-domain signalling. performing Fourier transform of the time-domain main body signal of each of the time-domain symbol to extract valid subcarriers; performing predefined mathematical calculation using each of the valid subcarriers and the known subcarrier corresponding to each known frequency-domain sequence in the extended set of known frequency-domain signalling and the channel estimation value, and then accumulating the calculation values on all the valid subcarriers; and selecting an accumulated value from a plurality of accumulated values according to a second predefined selection rule, using a known frequency-domain sequence of the extended set of known frequency-domain signalling corresponding to the accumulated value to infer the signalling which is transmitted by utilizing the frequency-domain modulation frequency offset value, i.e. the time-domain cyclic shift, and inferring a corresponding known frequency-domain sequence in the original set of known frequency-domain signalling before extension, so as to resolve signalling information transmitted by a different frequency-domain sequence.

Optionally, the provided preamble symbol receiving method further comprise such features: the second predefined selection rule contains performing selection according to the maximum absolute value or performing selection according to the maximum real part.

Optionally, the provided preamble symbol receiving method further comprise such features: the set of known frequency-domain signalling refers to all possible modulated phase frequency-domain sequences of the time-domain main body signal corresponding to each time-domain symbol that are used for filling the frequency-domain subcarriers while phase modulation is not performed.

Optionally, the provided preamble symbol receiving method further comprise such features: the extended set of known frequency-domain signalling is obtained in the following way: modulating the subcarrier phase of each known frequency-domain sequence of the set of known frequency-domain signalling correspondingly using all possible frequency offset values, wherein all the possible S modulation frequency offset values will generate S frequency offset modulated known sequences.

Optionally, the provided preamble symbol receiving method further comprise such features: when there is only one known sequence within the non-extended set of known frequency-domain signalling of the symbol, namely, the signalling information is transmitted only by a frequency-domain modulation frequency offset s, i.e., the time-domain cyclic shift value, the extended set of known frequency-domain signalling contains altogether S known frequency-domain sequences, and the modulation frequency offset value can be inferred by utilizing the known frequency-domain sequences of the extended set of known frequency-domain signalling corresponding to the modulation frequency offset s, thus obtaining the signalling information transmitted by the frequency-domain modulation frequency offset, i.e. the time-domain cyclic shift.

Optionally, the provided preamble symbol receiving method further comprise such features: the predefined mathematical calculation contains: conjugate multiplication or division calculation.

Optionally, the provided preamble symbol receiving method further comprise such features: the step of determining the position of the preamble symbol and parsing signalling information carried by the preamble symbol comprises: performing Fourier transform on the time-domain main body signal of each of the time-domain symbol to extract valid subcarriers; performing predefined mathematical calculation using each of the valid subcarriers and a known subcarrier corresponding to each known frequency-domain sequence in a set of known frequency-domain signalling of the time-domain symbol and a channel estimation value, and then performing inverse Fourier transform, and obtaining a corresponding inverse Fourier result for each of the known frequency-domain sequence; and each of the time-domain symbol, based on an inverse Fourier selection result selected from one or more of the inverse Fourier results according to a first predefined selection rule, performing a predefined processing operation on a plurality of the time-domain symbols, and resolving the signalling information based on an obtained inter-symbol processing result.

Optionally, the provided preamble symbol receiving method further comprise such features: the predefined sending rule contains: after processing a frequency-domain main body sequence corresponding to a time-domain main body signal in each transmitted time-domain signal to obtain pre-generated subcarriers, performing phase modulation on each valid subcarrier using a predefined frequency offset value S in the frequency domain or performing cyclic shift in the time domain after inverse Fourier transform.

Optionally, the provided preamble symbol receiving method further comprise such features: the method further comprises: calculating the absolute value or square of the absolute value of the inverse Fourier selection result, and then selecting the inverse Fourier selection result according to the first predefined selection rule.

Optionally, the provided preamble symbol receiving method further comprise such features: the first predefined selection rule contains performing selection according to the maximum peak value and/or performing selection according to the peak-to-average ratio.

Optionally, the provided preamble symbol receiving method further comprise such features: the method further comprises a noise filtering processing step comprising: noise filtering processing can be performed on the inverse Fourier result of each time-domain symbol, with large values being reserved and all smaller values being set to zero.

Optionally, the provided preamble symbol receiving method further comprise such features: the parsed signalling information contains: signalling transmitted using different frequency-domain sequences and/or signalling transmitted using frequency-domain modulation frequency offset, i.e. a time-domain cyclic shift value.

Optionally, the provided preamble symbol receiving method further comprise such features: the set of known frequency-domain signalling refers to all possible sequences of the time-domain main body signal corresponding to each time-domain symbol that are used for filling the frequency-domain subcarriers before performing phase modulation on of the frequency-domain subcarriers.

Optionally, the provided preamble symbol receiving method further comprise such features: if there is only one known sequence within a set of known frequency-domain sequences of the time-domain symbols, the first predefined selection rule is: directly selecting the unique inverse Fourier result of each of the time-domain symbols as the inverse Fourier selection result, then performing a predefined processing operation between a plurality of the time-domain symbols, and resolving the signalling information based on an obtained inter-symbol processing result.

Optionally, the provided preamble symbol receiving method further comprise such features: the predefined mathematical calculation contains: conjugate multiplication or division calculation.

Optionally, the provided preamble symbol receiving method further comprise such features: the step of performing a predefined processing operation between a plurality of the time-domain symbols and resolving the signalling information based on an obtained inter-symbol processing result comprises: multiplying or conjugate multiplying a later time-domain symbol which have been cyclically shifted and a former time-domain symbol, and accumulating to obtain an accumulated value, finding out a shift value corresponding to a maximum accumulated value in all the predefined frequency offset values or cyclic shift values, and deriving the signalling information from the shift value.

Device I

Additionally, the embodiments of the present invention also provide a preamble symbol receiving device, characterized by comprising: a receiving and processing unit for processing a received signal; a judgement unit for judging whether the processed signal obtained contains the preamble symbol desired to be received; and a position locating unit for, if a judgement result is yes, determining the position of the preamble symbol and resolving signalling information carried by the preamble symbol, wherein the preamble symbol received by the receiving and processing unit comprises at least one time-domain symbol generated by a transmitting end using a free combination of any number of first three-segment structures and/or second three-segment structures according to a predefined generation rule, the first three-segment structure containing: a time-domain main body signal, a prefix generated based on the entirety or a portion of the time-domain main body signal, and a postfix generated based on the entirety or a portion of a partial time-domain main body signal, and the second three-segment structure containing: the time-domain main body signal, a prefix generated based on the entirety or a portion of the time-domain main body signal, and a hyper prefix generated based on the entirety or a portion of the partial time-domain main body signal.

Device II

Additionally, the embodiments of the present invention also provide a preamble symbol receiving device, characterized by comprising: a receiving and processing unit for processing a received signal; a judgement unit for judging whether the processed signal obtained contains the preamble symbol desired to be received; and a position locating unit for, if a judgement result is yes, determining the position of the preamble symbol and resolving signalling information carried by the preamble symbol, wherein the preamble symbol received by the receiving and processing unit is obtained by processing a frequency-domain symbol, and the generation step of the frequency-domain symbol comprises: arranging a fixed sequence and a signalling sequence, which are generated respectively, in a predefined arrangement rule, and filling valid subcarriers with the same.

Device III

Additionally, the embodiments of the present invention also provide a preamble symbol receiving device, characterized by comprising: a receiving unit for processing a received signal; a judgement unit for judging whether the received signal, which has been processed, contains the preamble symbol desired to be received; and a position locating unit for, if a judgement result is yes, determining the position of the preamble symbol and resolving signalling information carried by the preamble symbol, wherein the preamble symbol received by the receiving unit is obtained by performing inverse Fourier transform on the frequency-domain subcarrier, the frequency-domain subcarrier being generated based on the frequency-domain main body sequence, The steps of generating the frequency-domain subcarrier contains: a predefined sequence generation rule for generating the frequency-domain main body sequence, and/or a predefined processing rule for processing the frequency-domain main body sequence for generating the frequency-domain subcarrier. The predefined sequence generation rule contains either one or a combination of two of the following: generating a sequence based on different sequence generation formulas; and/or generating a sequence based on the same sequence generation formula, and further preforming cyclic shift on the generated sequence. The predefined processing rule contains: according to the frequency offset value, performing phase modulation on a pre-generated subcarrier which is obtained by processing the frequency-domain main body sequence.

The preamble symbol can include, but is not limited to, time-domain symbols with one or two three-segment structures.

Compared with the prior art, the technical solutions of the present invention have the following beneficial effects:

according to the preamble symbol receiving method and device provided in the embodiments of the present invention, when a time-domain main body signal is an OFDM symbol, the entirety or a portion of the time-domain main body signal is used as a prefix, and coherent detection can be realized by utilizing the generated prefix, which solves the issues of performance degradation with non-coherent detection and differential decoding failure under complex frequency selective fading channels (DBPSK); and using the entirety or a portion of the time-domain main body signal as a postfix or hyper prefix and making optional modulation would enable the generated preamble symbol to have sound fractional frequency offset estimation performance and timing synchronization performance.

Further, it can be chosen to transmit a time-domain symbol with a three-segment structure as a preamble symbol according to the requirements of transmission efficiency and robustness. When the preamble symbol contains at least one symbol with a three-segment structure, based on the same OFDM symbol main body, a different start point when truncating to get the second part from the first part can be used for transmitting signalling, such as emergency broadcast, hook information, transmitter sign information or other transmission parameters. By designing two different three-segment structures, emergency broadcast is identified. When the preamble symbol is generated by using two symbols with a three-segment structure, two OFDM symbol main bodies thereof are different, and the three-segment structures adopted therein are also different; on this basis, emergency broadcast is identified according to the sequential order of the two three-segment structures. By using different three-segment structures of two symbols, the problem of fractional frequency offset estimation failure occurring in some special-length multi-path channels can be avoided.

Furthermore, using three-segment structure with partial identical contents (as a preamble symbol) ensures that significant peaks can be obtained by means of delayed moving auto-correlation at a receiving end. Moreover, in the process of generating the preamble symbol, a signal obtained by modulating a time-domain main body signal can avoid the following: continuous wave interference or single-frequency interference, or the occurrence of a multi-path channel with the same length to that of the modulated signal, on the occurrence of an error peak detection when the length of a guard interval in the received signal is the same as that of the modulated signal.

BRIEF DESCRIPTION OF THE DRAWINGS

FIG. 22(*b*) is respectively an oscillograph of an inverse Fourier result of the time-domain main body signal of the latter time-domain symbol before noise filter processing under an 0 dB two-path channel in the embodiments;

FIG. 23(*b*) is respectively an oscillograph of an inverse Fourier result of the time-domain main body signal of the latter time-domain symbol after noise filter processing under an 0 dB two-path channel in the embodiments.

DETAILED DESCRIPTION OF THE DRAWINGS

{Generation Method}

Figure 1:
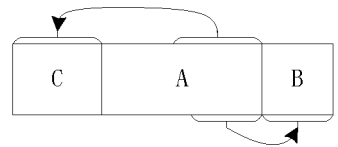
FIG. 1 is a schematic diagram of a time-domain symbol with a first three-segment structure in the embodiments of the present invention.
Figure 2:
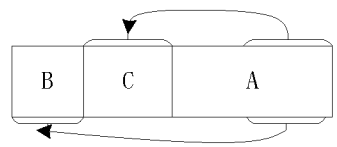
FIG. 2 is a schematic diagram of a time-domain symbol with a second three-segment structure in the embodiments of the present invention.

This embodiment provides a preamble symbol generation method. The preamble symbol generation method comprises the following steps: generating time-domain symbols which have the following three-segment structures based on a time-domain main body signal; and generating the preamble symbol based on at least one of the time-domain symbols, FIG. 1 is a schematic diagram of a time-domain symbol with a first three-segment structure in the embodiments of the present invention. FIG. 2 is a schematic diagram of a time-domain symbol with a second three-segment structure in the embodiments of the present invention.

The generated preamble symbol comprises:

a time-domain symbol with a first three-segment structure; or a time-domain symbol with a second three-segment structure; or a free combination of several time-domain symbols with the first three-segment structure and/or several time-domain symbols with the second three-segment structure arranged in any order.

The following description is made to a time-domain structure of the time-domain symbols contained in the above-mentioned preamble symbol through FIG. 1 and FIG. 2. The time-domain structure contains a three-segment structure; and the three-segment have two alternatives, i.e. a first three-segment structure and a second three-segment structure.

As shown in FIG. 1, the first three-segment structure is: a time-domain main body signal (part A), a prefix (part C) generated by utilizing to a partial time-domain main body signal which is truncated from the time-domain main body signal, and a modulated signal, i.e. a postfix (part B), which is generated by utilizing a portion or the entirety of the partial time-domain main body signal.

As shown in FIG. 2, the second three-segment structure is: a time-domain main body signal (part A), a prefix (part C) generated by utilizing to a partial time-domain main body signal which is truncated from the time-domain main body signal, and a modulation signal, i.e. a hyper prefix (part B), which is generated by utilizing the partial time-domain main body signal.

Specifically, a section of a time-domain main body signal (indicated by A in the figure) is taken as a first part, a first portion is taken from the end of the first part according to a predefined acquisition rule, and is processed according to a first predefined processing rule and replicated to the front of the first part to produce a third part (indicated by C in the figure), thus taking it as a prefix; at the same time, a portion is taken from the rear of the first part according to a predefined acquisition rule, and is processed according to a second predefined processing rule and replicated to the rear of the first part or processed and replicated to the front of the prefix to produce a second part (indicated by B in the figure), thus respectively taking it as a postfix or a hyper prefix correspondingly, thereby respectively producing the first three-segment structure with B as the postfix as shown in FIG. 1 (CAB structure) and the second three-segment structure with B as the hyper prefix as shown in FIG. 2 (BCA structure).

With regard to the particular rules for processing the third part and the second part from the first part, the first predefined processing rule comprises: direct copy, or multiplying each sampling signal in the taken part by a fixed coefficient or a predefined variable coefficient. The second predefined processing rule comprises: conducting modulation when the first predefined processing rule is direct copy, or when the first predefined processing rule is multiplying each sampling signal in the taken part by a fixed coefficient or predefined variable coefficient, multiplying a corresponding part by the corresponding coefficient as well and then conducting modulation processing. That is, when the third part is directly copied as the prefix, modulation processing is performed on the second part as the postfix or hyper prefix by a corresponding main body part; and when the third part is multiplied by a corresponding coefficient, the second part also needs to be multiplied by a coefficient for modulation processing, and is then taken as the postfix or hyper prefix.

Figure 3:
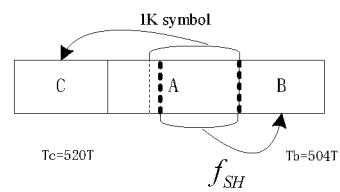
FIG. 3 is a schematic diagram of acquisition processing based on a time-domain symbol with the first three-segment structure in the embodiments of the present invention.

FIG. 3 is a schematic diagram of a predefined processing rule for a time-domain symbol with a first three-segment structure in the embodiments of the present invention.

In this embodiment, section C is directly copied from section A, and section B is a modulated signal section of section A. As shown in FIG. 3, for example, the length of A is 1024, and the length of C truncated is 520, and the length of B is 504, wherein when processing C and B, each sample of the signal can be multiplied with a fixed coefficient, or each sample is multiplied by a different coefficient.

The data length of B does not exceed the data length of C, which means that the range in A which is selected for generating the modulated signal section B would not exceed the range of A truncated as the prefix C. Preferably, the sum of the length of B and that of C is the length of A.

Let $N_A$ denotes the length of A, $Len_C$ denotes the length of C, and $Len_B$ denotes the length of the modulation signal section B. Let the sampling point serial numbers of A be 0, 1, ... $N_A-1$. Let the first sampling point serial number for generating the modulated signal section part B in A be N1, and the final sampling point serial number for generating the modulated signal section part B in A be N2. The first sampling point serial number and the second sampling point serial number satisfy the following predefined restriction relationship:

$$N2=N1+Len_B-1 \quad \text{(Formula 1)}$$

Generally, modulation made on the second part B section is frequency offset modulation, i.e. multiplying a frequency shift sequence, a modulation (M) sequence or other sequences, etc. The modulation frequency offset is taken as an example in this embodiment, assuming that P1_A(t) is the time-domain expression of A, then the time-domain expression of the first C–A–B three-segment structure is (Formula 2)

$$P_{C-A-B}(t) = \begin{cases} P1\_A(t+(N_A-Len_C)T) & 0 \le t < Len_C T \\ P1\_A(t-Len_C T) & Len_C T \le t < (N_A+Len_C)T \\ P1\_A\left(t-\begin{pmatrix} Len_C + \\ N_A - \\ N1 \end{pmatrix}T\right)e^{j2\pi f_{SH} t} & (N_A+Len_C)T \le t < \begin{pmatrix} N_A + \\ Len_C + \\ Len_B \end{pmatrix}T \\ 0 & \text{otherwise} \end{cases}$$

where if the time-domain main body signal is an OFDM symbol, the modulation frequency offset value $f^{SH}$ of the frequency shift sequence can be selected as a frequency-domain subcarrier interval i.e. $1/N_A T$ corresponding to a time-domain OFDM main-body signal, with T being the sampling period, $N_A$ being the length of the time-domain OFDM main-body signal. In this example, $N_A$ is 1024, and $f_{SH}=1/1024T$. The primary phase of the frequency shift sequence may be an arbitrary value; and in order to enable a correlation peak to be sharp, $f_{SH}$ can also be selected as $1/(Len_B T)$.

As shown in FIG. 3, $N_A 1024$; $Len_C=520$, $Len_B=504$, and N1=520. At this moment, the auto-correlation delay of section CA containing the same content is $N_A$, the auto-correlation delay of section CB containing the same content is $N_A+Len_B$, and the auto-correlation delay of section AB containing the same content is $Len_B$.

In another embodiment, the length of section C is the same as that of section B, that is to say, section B can be considered as a completely frequency offset adjustment of section C.

Particularly, the cyclic prefix C is assembled at the front of the time-domain OFDM symbol A as a guard interval, and the modulation signal section B is assembled at the rear of the OFDM symbol as a modulation frequency offset sequence, so as to generate a time-domain symbol with the first three-segment structure. For example, when $N_A=1024$, the particular expression can be as follows, (Formula 3)

$$P_{C-A-B}(t) = \begin{cases} P1\_A(t+(1024-Len_C)T) & 0 \le t < Len_C T \\ P1\_A(t-Len_C T) & Len_C T \le t < (1024+Len_C)T \\ P1\_A(t-2Len_C T)e^{j2\pi f_{SH} t} & (1024+Len_C)T \le t < (1024+2Len_C)T \\ 0 & \text{otherwise} \end{cases}$$

Figure 4:
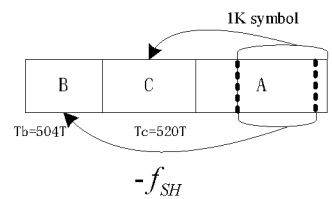
FIG. 4 is a schematic diagram of acquisition processing based on a time-domain symbol with the second three-segment structure in the embodiments of the present invention.

FIG. 4 is a schematic diagram of the processing of a time-domain symbol with a second three-segment structure in the embodiments of the present invention.

In a similar way, the time-domain expression of the time-domain symbol with the second three-segment structure is as follows. No that in order to enable the processing method of the receiving end as consistent as possible, in B–C–A structure, the modulation frequency offset value is exactly opposite to C–A–B structure, and the primary phase of the modulation frequency offset sequence can be an arbitrary value.

$$P_{B-C-A}(t) = \quad \text{(Formula 4)}$$

$$\begin{cases} P1\_A(t+(N1)T)e^{-j2\pi f_{SH}(t-Len_C T)} & 0 \le t < Len_B T \\ P1\_A\left(t - \begin{pmatrix} Len_B - \\ N_A + \\ Len_C \end{pmatrix} T\right) & Len_B T \le t < (Len_B + Len_C)T \\ P1\_A(t - (Len_B + Len_C)T) & (Len_B + Len_C)T \le t < \begin{pmatrix} Len_B + \\ Len_C + \\ N_A \end{pmatrix} T \\ 0 & \text{otherwise} \end{cases}$$

As shown in FIG. 4, $N_A=1024$; $Len_C=520$, $Len_B=504$, and N1=504. At this moment, the auto-correlation delay of section CA containing the same content is $N_A$, the auto-correlation delay of section BC containing the same content is $Len_B$, and the auto-correlation delay of section BA containing the same content is $N_A+Len_B$.

Further, when the preamble symbol contains a symbol with a three-segment structure, no matter the three-segment structure is the first three-segment structure or the second three-segment structure, based on the same OFDM symbol main body, signalling can also be transmitted using a time-domain structure in the following way.

A different start point to select the second part from the first part can be used for transmitting signalling, such as emergency broadcast, hook information, transmitter sign information or other transmission parameters.

By way of example, for the first three-segment structure, for example, the predefined length is 1024, $Len_C$ is 512, and $Len_B$ is 256.

N1 can be valued at 512+i*16 0≤i<16, which can then indicate 16 different mode to take by the second part, and transmit 4 bits of signalling parameters. Different transmitters can transmit an identifier corresponding to the transmitter by taking different N1, the same transmitter can also transmit a parameter by changing N1 in a time-division manner.

For another example, 1 bit of signalling is used for transmitting emergency broadcast identifier EAS_flag.

if EAS_flag=1, then N1=512−L, that is, taking sampling points from serial numbers 512−L to 1023-2L of OFDM symbol with $N_A$ being 1024 and perform modulation by the frequency offset sequence to generate B, and placing it at the rear of A.

if EAS_flag=0, then N1=512+L, that is, taking sampling points from serial numbers 512+L to 1023 of OFDM symbol with $N_A$ being 1024 and perform modulation by the frequency offset sequence to generate B, and placing it at the rear of A.

The value of L is 8.

Particularly, $N_A=1024$, $Len_C$ is 520, $Len_B$ is 504; N1=520 indicates that EAS_flag=0, and N1=504 indicates that EAS_flag=1; or N1=504 indicates that EAS_flag=0, and N1=520 indicates that EAS_flag=1.

For another example, $N_A=2048$, $Len_C$ is 520, $Len_B$ is 504; N1=1544 indicates that EAS_flag=0, and N1=1528 indicates that EAS_flag=1; or N1=1528 indicates that EAS_flag=0, and N1=1544 indicates that EAS_flag=1.

Besides truncating to get the second part from the first part at different start points to indicate emergency broadcast, when the preamble symbol contains only one three-segment structure, a variable three-segment structure can be used to identify emergency broadcast. For example, EAS_flag=0 can be indicated by transmitting the first three-segment structure C–A–B, and EAS_flag=1 is indicated by transmitting the second three-segment structure B–C–A; alternatively, EAS_flag=1 is indicated by transmitting the first three-segment structure C–A–B, and EAS_flag=0 is indicated by transmitting the second three-segment structure B–C–A.

Besides containing a time-domain symbol with a three-segment structure, the preamble symbol can also contain the assembling of two time-domains with a three-segment structure. When the three-segment structures of the two time-domain symbols are the same, the two three-segment symbols are directly spiced; and for two different three-segment structure, there are two assembling ways according to the sequential order. Assembling two different three-segment structures has the following advantages: in some multi-path environment with a special delay, the rear part of segment A of the former path may just be counteracted by segment C of the later path identical to A, leading to a reduction in timing synchronization performance, and more seriously, not being able to perform small offset estimation. At this time, when assembling with two different three-segment structure, even in the case of a dangerous multipath, small offset can still be normally estimated.

In this embodiment, the preamble symbol contains a free combination of multiple time-domain symbols with the first three-segment structure and/or multiple time-domain symbols with the second three-segment structure arranged in any order. Two three-segment structure are taken as an example for explanation in this embodiment below, and the two three-segment structures are respectively the first three-segment structure and the second three-segment structure.

Figure 5:
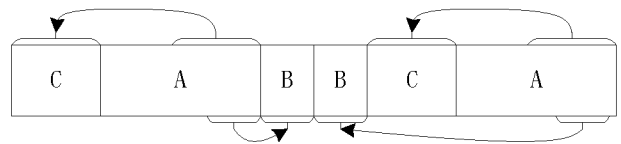
FIG. 5 is the structural diagram of the first three-segment structure and the second three-segment structure assembled in a first assembling mode in the embodiments of the present invention.
Figure 6:
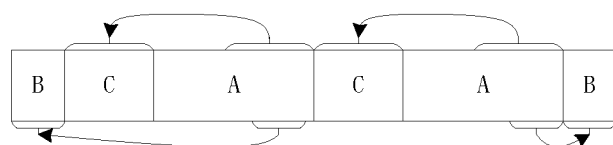
FIG. 6 is the structural diagram of the first three-segment structure and the second three-segment structure assembled in a second assembling mode in the embodiments of the present invention.

FIG. 5 is a schematic diagram of a first method to splice two three-segment structures in this embodiment. FIG. 6 is a schematic diagram of a second method to splice two three-segment structures in this embodiment.

In the time-domain symbol shown in FIG. 5 and the time-domain symbol shown in FIG. 6, respectively, the two time-domain main body signals therein are different, and the three-segment structures adopted thereby are also different; and the first assembling method as shown in FIG. 5 and the second assembling method as shown in FIG. 6 are respectively formed by different sequential orders of the two time-domain symbols.

No matter which assembling method is used, the time-domain main body signals (i.e. A) of the two time-domain symbols in FIG. 5 and FIG. 6 can be different; in this way, the capacity for signalling transmission after assembling the two symbols is twice or nearly twice of that of a single time-domain symbol with a three-segment structure. Respective time-domain main body symbols of at least one time-domain symbols contained in the preamble symbol may be different and may be the same, on which there is no restriction.

A peak is acquired by means of the delayed auto-correlation of section CB, section CA and section BA when detecting a single time-domain symbol with a three-segment structure; when assembling two time-domain symbols with a three-segment structure, in order to be able to perform addition of the auto-correlation values of the two time-domain symbols with a three-segment structure and obtain more robust performance, the parameter N1 of each of the two time-domain symbols with a three-segment structure (that is, N1 is the sampling point serial number in A corresponding to the start point chosen to be replicated for modulation signal segment B) should satisfy a certain relationship, assuming that N1 of the first symbol is N1_1, and N1 of the second symbol is N1_2, then they should satisfy N1_1+N1_2=2$N_A$−($Len_B$+$Len_C$). Moreover, if the modulation performed on segment B is frequency offset modulation, the frequency offset value is exactly contrary.

Serial number 1 is used to indicate the symbol with the C–A–B structure, and serial number 2 is used to indicate the symbol with the B–C–A structure. Assuming that P1_A(t) is the time-domain expression of A1, and P2_A(t) is the time-domain expression of A2, then the time-domain expression of a time-domain symbol with the first three-segment structure is:

$$P_{C-A-B}(t) = \begin{cases} P1\_A(t+(N_A - Len_C)T) & 0 \le t < Len_C T \\ P1\_A(t - Len_C T) & Len_C T \le t < (N_A + Len_C)T \\ P1\_A\left(t - \begin{pmatrix} Len_C + \\ N_A - \\ N1\_1 \end{pmatrix} T\right) e^{j2\pi f_{SH} t} & (N_A + Len_C)T \le t < \begin{pmatrix} N_A + \\ Len_C + \\ Len_B \end{pmatrix} T \\ 0 & \text{otherwise} \end{cases} \quad \text{(Formula 5)}$$

and then the time-domain expression of a time-domain symbol with the second three-segment structure is:

$$P_{B-C-A}(t) = \begin{cases} P2\_A(t+(N1\_2)T) e^{-j2\pi f_{SH}(t - Len_C T)} & 0 \le t < Len_B T \\ P2\_A\left(t - \begin{pmatrix} Len_B - \\ N_A + \\ Len_C \end{pmatrix} T\right) & Len_B T \le t < (Len_B + Len_C)T \\ P2\_A(t - (Len_B + Len_C)T) & (Len_B + Len_C)T \le t < \begin{pmatrix} Len_B + \\ Len_C + \\ N_A \end{pmatrix} T \\ 0 & \text{otherwise} \end{cases} \quad \text{(Formula 6)}$$

Then, as shown in FIG. 5, the time-domain expression of the time-domain symbol spliced in the first splicing method, which contains the first three-segment structure and the second three-segment structure which are connected successively, is:

$$P_{combine}(t) = \begin{cases} P_{C-A-B}(t) & 0 \le t < \begin{pmatrix} Len_B + \\ Len_C + \\ N_A \end{pmatrix} T \\ P_{B-C-A}\left(t - \begin{pmatrix} Len_B + \\ Len_C + \\ N_A \end{pmatrix} T\right) & \begin{pmatrix} Len_B + \\ Len_C + \\ N_A \end{pmatrix} T \le t < 2 \begin{pmatrix} Len_B + \\ Len_C + \\ N_A \end{pmatrix} T \\ 0 & \text{otherwise} \end{cases} \quad \text{(Formula 7)}$$

Then, as shown in FIG. 6, the time-domain expression of the time-domain symbol spliced in the second splicing method, which contains the second three-segment structure and the first three-segment structure which are connected successively, is:

$$P_{combine}(t) = \begin{cases} P_{B-C-A}(t) & 0 \le t < \begin{pmatrix} Len_B + \\ Len_C + \\ N_A \end{pmatrix} T \\ P_{C-A-B}\left(t - \begin{pmatrix} Len_B + \\ Len_C + \\ N_A \end{pmatrix} T\right) & \begin{pmatrix} Len_B + \\ Len_C + \\ N_A \end{pmatrix} T \le t < 2 \begin{pmatrix} Len_B + \\ Len_C + \\ N_A \end{pmatrix} T \\ 0 & \text{otherwise} \end{cases} \quad \text{(Formula 8)}$$

Similarly to the case above, when the C–A–B structure and the B–C–A structure are cascaded, the problem of fractional frequency offset estimation failure under a dangerous delay can be solved. When the dangerous delay results in the counteraction of segment C and segment A, section CB with the first structure and section BC with the second structure can still be used for timing synchronization and fractional frequency offset estimation.

In one preferred embodiment, the lengths of segment C, segment A and segment B in the two three-segment structures are the same, $N_A$=1024 or 2048; $Len_C$=520, $Len_B$=504, only N1 is different, when $N_A$=1024, N1_1=520, N1_2=504, and when $N_A$=2048, N1_1=1544, N1_2=1528. A first assembling result and a second assembling result are respectively shown in FIG. 7 and FIG. 8 when $N_A$=1024, $f_{SH}$=1/1024T, and when $N_A$=2048, $f_{SH}$=1/2048T, then the time-domain expression of the first three-segment structure is:

$$P_{C-A-B}(t) = \begin{cases} P1\_A(t+504T) & 0 \le t < 520T \\ P1\_A(t-520T) & 520T \le t < 1544T \\ P1\_A(t-1024T)e^{j2\pi f_{SH} t} & 1544T \le t < 2048T \\ 0 & \text{otherwise} \end{cases} \quad \text{(Formula 9)}$$

when ($N_A$ = 1024)

or $$P_{C-A-B}(t) = \begin{cases} P1\_A(t+1528T) & 0 \le t < 520T \\ P1\_A(t-520T) & 520T \le t < 2568T \\ P1\_A(t-1024T)e^{j2\pi f_{SH} t} & 2568T \le t < 3072T \\ 0 & \text{otherwise} \end{cases} \quad \text{(Formula 10)}$$

when ($N_A$ = 2048)

the time-domain expression of the second three-segment structure is:

$$P_{B-C-A}(t) = \begin{cases} P2\_A(t+504T)e^{-j2\pi f_{SH}(t-520T)} & 0 \le t < 504T \\ P2\_A(t) & 504T \le t < 1024T \\ P2\_A(t-1024T) & 1024T \le t < 2048T \\ 0 & \text{otherwise} \end{cases} \quad \text{(Formula 11)}$$

when ($N_A$ = 1024)

or $$P_{B-C-A}(t) = \begin{cases} P2\_A(t+1528T)e^{-j2\pi f_{SH}(t-520T)} & 0 \le t < 504T \\ P2\_A(t+1024T) & 504T \le t < 1024T \\ P2\_A(t-1024T) & 1024T \le t < 3072T \\ 0 & \text{otherwise} \end{cases} \quad \text{(Formula 12)}$$

when ($N_A$ = 1024)

Figure 7:
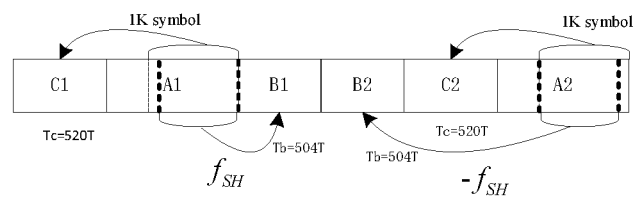
FIG. 7 is a schematic diagram of acquisition processing based on the first assembling mode in the embodiments of the present invention.
Figure 8:
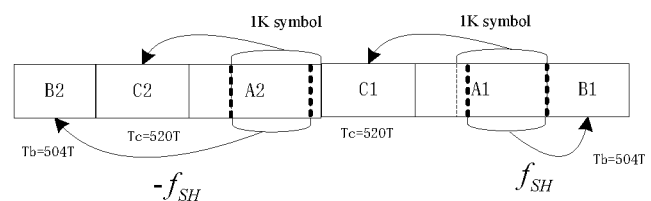
FIG. 8 is a schematic diagram of acquisition processing based on the second assembling mode in the embodiments of the present invention.

FIG. 7 is a schematic diagram of predefined processing rule based on the first assembling mode in the embodiments of the present invention. FIG. 8 is a schematic diagram of predefined processing rule based on the second assembling mode in the embodiments of the present invention.

With regard to the case where a preamble symbol is assembled by two time-domain symbols with three-segment structure, the two three-segment structures shown in FIG. 7 and FIG. 8 are respectively the first three-segment structure (CAB) and the second three-segment structure (BCA); similarly, in each time-domain symbol with a three-segment structure, the second part (part B, as a postfix or a hyper prefix) can be generated by truncating the first part (part A) from different start points so as to transmit signalling. Only specially, when performing assembling with two different three-segment structures, the start point N1_1 of selection for the symbol with the first three-segment structure and the selection start point N1_2 for the symbol with the second three-segment structure satisfy some restriction relationship:

$$N1\_1 + N1\_2 = 2N_A - (Len_B + Len_c) \quad \text{(Formula 13)}$$

For another example, as stated above, 1 bit of signalling is used for transmitting emergency broadcast identifier EAS_flag. Description is made below by utilizing table 1 and particular expressions.

TABLE 1

Corresponding table of emergency broadcast identification and selection start points for the postfix or the hyper prefix with a time-domain main body signal length predefined

|  | $N_A = 1024$, EAS_flag = 0 | $N_A = 1024$, EAS_flag = 1 | $N_A = 2048$, EAS_flag = 0 | $N_A = 2048$, EAS_flag = 1 |
|---|---|---|---|---|
| C-A-B | N1_1 = 520 | N1_1 = 504 | N1_1 = 1544 | N1_1 = 1528 |
| B-C-A | N1_2 = 504 | N1_2 = 520 | N1_2 = 1528 | N1_2 = 1544 | when EAS_flag=0, the time-domain expression of the C-A-B three-segment structure is:

$$P_{C-A-B}(t) = \begin{cases} P1\_A(t+504T) & 0 \le t < 520T \\ P1\_A(t-520T) & 520T \le t < 1544T \\ P1\_A(t-1024T)e^{j2\pi f_{SH}t} & 1544T \le t < 2048T \\ 0 & \text{otherwise} \end{cases} \quad \text{(Formula 14)}$$

when $(N_A = 1024)$ $$P_{C-A-B}(t) = \begin{cases} P1\_A(t+1528T) & 0 \le t < 520T \\ P1\_A(t-520T) & 520T \le t < 2568T \\ P1\_A(t-1024T)e^{j2\pi f_{SH}t} & 2568T \le t < 3072T \\ 0 & \text{otherwise} \end{cases} \quad \text{(Formula 15)}$$

when $(N_A = 2048)$
and the time-domain expression of the B-C-A three-segment structure is:

$$P_{B-C-A}(t) = \begin{cases} P2\_A(t+504T)e^{-j2\pi f_{SH}(t-520T)} & 0 \le t < 504T \\ P2\_A(t) & 504T \le t < 1024T \\ P2\_A(t-1024T) & 1024T \le t < 2048T \\ 0 & \text{otherwise} \end{cases} \quad \text{(Formula 16)}$$

when $(N_A = 1024)$
and $$P_{B-C-A}(t) = \begin{cases} P2\_A(t+1528T)e^{-j2\pi f_{SH}(t-520T)} & 0 \le t < 504T \\ P2\_A(t+1024T) & 504T \le t < 1024T \\ P2\_A(t-1024T) & 1024T \le t < 3072T \\ 0 & \text{otherwise} \end{cases} \quad \text{(Formula 17)}$$

when $(N_A = 2048)$ when EAS_flag=1, the time-domain expression of the C-A-B three-segment structure is:

$$P_{C-A-B}(t) = \begin{cases} P1\_A(t+504T) & 0 \le t < 520T \\ P1\_A(t-520T) & 520T \le t < 1544T \\ P1\_A(t-1040T)e^{j2\pi f_{SH}t} & 1544T \le t < 2048T \\ 0 & \text{otherwise} \end{cases} \quad \text{(Formula 18)}$$

when $(N_A = 1024)$ $$P_{C-A-B}(t) = \begin{cases} P1\_A(t+1528T) & 0 \le t < 520T \\ P1\_A(t-520T) & 520T \le t < 2568T \\ P1\_A(t-1040T)e^{j2\pi f_{SH}t} & 2568T \le t < 3072T \\ 0 & \text{otherwise} \end{cases} \quad \text{(Formula 19)}$$

when $(N_A = 2048)$
and the time-domain expression of the B-C-A three-segment structure is:

$$P_{B-C-A}(t) = \begin{cases} P1\_A(t+520T)e^{-j2\pi f_{SH}(t-504T)} & 0 \le t < 504T \\ P1\_A(t) & 504T \le t < 1024T \\ P1\_A(t-1024T) & 1024T \le t < 2048T \\ 0 & \text{otherwise} \end{cases} \quad \text{(Formula 20)}$$

when $(N_A = 1024)$
and $$P_{B-C-A}(t) = \begin{cases} P1\_A(t+1544T)e^{-j2\pi f_{SH}(t-504T)} & 0 \le t < 504T \\ P1\_A(t+1024T) & 504T \le t < 1024T \\ P1\_A(t-1024T) & 1024 \le t < 3072T \\ 0 & \text{otherwise} \end{cases} \quad \text{(Formula 21)}$$

when $(N_A = 2048)$

With regard to the case where a preamble symbol is assembled by two time-domain symbols with three-segment structure, emergency broadcast can also be identified by different sequential orders of the two time-domain symbols.

As stated above, on the basis of existing two three-segment symbols, the two symbols can be assembled; and when the assembling is performed based on the first assembling method, it indicates that a system is offering a common broadcast service, and when the assembling is performed based on the second assembling method, it indicates that the system is offering an emergency broadcast service. It is also possible that when the assembling is performed based on the first assembling method, it indicates that a system is offering an emergency broadcast service, and when the assembling is performed based on the second assembling method, it indicates that the system is offering a common broadcast service.

The preamble symbol (preamble) or bootstrap introduced above contains not only: a time-domain symbol with a first three-segment structure; or a time-domain symbol with a second three-segment structure; or a united symbol assembled by the first three-segment structure and the second three-segment structure; but also contains a free combination of several time-domain symbols with the first three-segment structure and/or several time-domain symbols with the second three-segment structure arranged in any order. That is, the preamble symbol or bootstrap can only contains CAB or BCA, can also contain a combination of several CAB or several BCA, and can also be a free combination of an unlimited number of CAB and an unlimited number of BCA arranged in any order. It should be specially noted that the preamble symbol of bootstrap in the present invention is not limited to only containing a C–A–B or B–C–A structure, but can also contain other time-domain structures, such as a traditional CP structure.

It has been mentioned above that, when the C–A–B structure and the B–C–A structure are cascaded, the problem of fractional frequency offset estimation failure under a dangerous delay can be solved. When the dangerous delay results in the counteraction of segment C and segment A, section CB with the first structure and section BC with the second structure can still be used for timing synchronization and small offset estimation. Therefore, in the preferred embodiment, when the preamble symbol contains at least two time-domain symbols with a three-segment structure, it generally at least contains a cascade of a C–A–B structure and a B–C–A structure.

Specifically, the number of time-domain symbols contained in the preamble symbols is set to four, and some preferable spliced structures of four time-domain symbols are given below, which are successively arranged into any one of the following structures:

(1) C–A–B, B–C–A, C–A–B, B–C–A; or
(2) C–A–B, B–C–A, B–C–A, B–C–A; or
(3) B–C–A, C–A–B, C–A–B, C–A–B; or
(4) C–A–B, B–C–A, C–A–B, C–A–B; or
(5) C–A–B, C–A–B, C–A–B, B–C–A; or
(6) C–A–B, C–A–B, C–A–B, C–A–B or
(7) C–A–B, C–A–B, B–C–A, B–C–A.

A structure of four time-domain symbols like C–A–B, B–C–A, C–A–B, B–C–A for example makes the most of the effect of cascading. A structure of four time-domain symbols like C–A–B, B–C–A, B–C–A, B–C–A for example stretches the guard interval for part A of the sequential symbol, and the first symbol is generally a known signal; therefore, C–A–B is adopted.

The number of time-domain symbols is not limited to four, now a particular embodiment in which the first time-domain has a C–A–B three-segment structure, and the three-segment structures after that are all B–C–A connected successively is given below. Let the total number of the time-domain symbols containing the first or the second three-segment structure in the preamble symbol or bootstrap be M.

Then the time-domain expression of the M time-domain symbols with a three-segment structure which are assembled is:

$$P_{combine}(t) = \begin{cases} P_{C-A-B}(t) & 0 \leq t < (Len_B + Len_C + N_A)T \\ P_{B-C-A}(t-1*  & i*(Len_B + Len_C + N_A)T \leq t < \\ (Len_B + Len_C + N_A)T) & (i+1)*(Len_B + Len_C + N_A)T \\ 0 & \text{otherwise} \end{cases} \quad \text{(Formula 22)}$$

$$1 \leq i < M-1$$

The present invention also provides a frequency-domain symbol generation method, and description is made below to a method for generating a frequency-domain OFDM symbol with the following frequency-domain structure I and a frequency-domain OFDM symbol with the following frequency-domain structure II respectively.

Furthermore, it can be seen in combination with the three-segment time-domain structure above that a fixed corresponding relationship exists between the time domain and the frequency domain. In a general case, a time-domain main body signal (part A) is a time-domain OFDM symbol formed from a frequency-domain OFDM symbol after inverse Fourier transform. However, it should be noted that the frequency-domain symbol generation method provided in the present invention is not limited to be used in a symbol in which the three-segment structure as shown in FIG. 1 to FIG. 8 above is adopted in terms of the time domain, but can also be applied to other symbols with an arbitrary time-domain structure.

It is assumed that P1_X is a corresponding frequency-domain OFDM symbol, and inverse discrete Fourier transform is performed on P1_$X_i$ to obtain a time-domain OFDM symbol:

$$P1\_A(t) = \frac{1}{\sqrt{M}} \sum_{m=0}^{N_{FFT}} P1\_X(m) e^{j2\pi \frac{(m-N_{FFT}/2)}{N_{FFT}T}t}, \quad \text{(Formula 23)}$$

where M is the sum of the power for valid non-zero subcarriers.

In the present invention, the frequency-domain structures of two different types of P1_X are elaborated.

[Frequency-Domain Structure I]

First of all, the frequency-domain structure of the first type of P1_X is elaborated, and is defined as frequency-domain structure I. For frequency-domain structure I, the frequency-domain symbol generation method comprises the following steps:

respectively generating a fixed sequence and a signalling sequence on the frequency domain; and arranging the fixed sequence and the signalling sequence and filling valid subcarriers with the arranged fixed sequence and signalling sequence, for forming a frequency-domain symbol.

For frequency-domain structure I of P1_X, the frequency-domain OFDM symbol respectively comprises three parts, i.e. virtual subcarriers, signalling sequence (referred to as SC) subcarriers and fixed sequence (referred to as FC) subcarriers.

After arranging signalling sequence subcarriers and fixed sequence subcarriers according to a predefined interlaced arrangement rule, the virtual subcarriers are distributed at two sides of them. The predefined interlaced arrangement rule comprises either one of the following two rules:

a first predefined interlaced arrangement rule: arrangement in an odd-even interlaced manner or an even-odd interlaced manner; and a second predefined interlaced arrangement rule: placing a portion of the signalling sequence on odd-numbered subcarriers, and the other portion of the signalling sequence on even-numbered subcarriers; and placing a portion of the fixed sequence on the odd-numbered subcarriers, and the other portion of the fixed sequence on the even-numbered subcarriers.

The first predefined interlaced arrangement rule is to arrange the SC and the FC in an odd-even interlaced pattern or an even-odd interlaced pattern, in this way, the FC is arranged according to a pilor rule. In the second predefined interlaced arrangement rule, a part of the SC sequence needs to be put on odd-numbered subcarriers, and the remaining SC sequence is put on even-numbered subcarriers; and a part of the FC sequence needs to be put on odd-numbered subcarriers, and the remaining FC sequence is put on even-numbered subcarriers; in this way, the case where the entire FC or SC is put on odd-numbered or even-numbered subcarriers and would entirely fade under some special multipath channel is avoided, and this arrangement would not increase the complexity of channel estimation, and is thus a better choice.

Let the length of the fixed sequence be L (that is, the number of valid subcarriers bearing the fixed sequence is L), and the length of the signalling sequence be P (that is, the number of valid subcarriers bearing the signalling sequence is P). In this embodiment, L=P. It should be noted that when the length of the fixed sequence is not consistent with that of the signalling sequence (e.g. P>L), the interlaced arrangement of the fixed sequence and the signalling sequence according to the above-mentioned rule can be realized by means of filling subcarriers with zero sequence.

Figure 9:
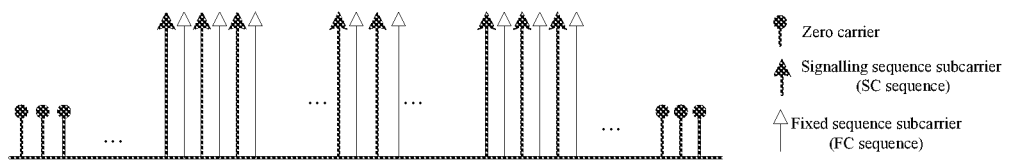
FIG. 9 is a schematic diagram of frequency-domain structure I arranged according to a first predetermined interlaced arrangement rule in the embodiments of the present invention.

FIG. 9 is a schematic diagram of the signalling sequence subcarriers, the fixed sequence subcarriers and the virtual subcarriers arranged according to a first predetermined interlaced arrangement rule in the embodiments of the present invention.

As shown in FIG. 9, in this preferred implementation, the step comprises: respectively filling subcarriers with certain zero sequence at two sides of the valid subcarriers, to form a frequency-domain OFDM symbol with a predefined length.

Corresponding to the fact that the length $N_A$ of the time-domain main body signal A in the above-mentioned time-domain structure is 1024, the length of frequency domain signal $N_{FFT}$ formed by performing fast Fourier transform (FFT) is 1024.

The example of the predefined length of $N_{FFT}$ being 1024 is continued to be used below, the length of the zero sequence subcarriers is G=1024−L−P, and (1024−L−P)/2 zero sequence subcarriers are used for filling subcarriers at two sides thereof. For example, L=P=353, then G=318, 159 zero sequence subcarriers are respectively filled at two sides.

Generating the frequency-domain OFDM symbol according to the first predefined interlaced arrangement rule comprises the following step:

The (11)th fixed sequence generation step: the fixed sequence is composed of 353 complex numbers, the modulus thereof is constant, and the nth value of the fixed sequence subcarriers is expressed as:

$$FC(n)=\sqrt{R}e^{j\omega_n}, \ n=0\sim352 \quad \text{(Formula 24)}$$

where R is the power ratio of FC to SC, and the modulus SC, is constant 1.

$$R = \frac{\sum_n |FC(n)|^2}{\sum_n |SC(n)|^2} \quad \text{(Formula 25)}$$

The radian value $\omega_n$ of the fixed sequence subcarriers is determined through the first predefined fixed subcarrier radian values in table 2.

TABLE 2

The first predefined fixed subcarrier radian value table
(first predefined interlaced arrangement rule)

| | | | | | | | | | |
|---|---|---|---|---|---|---|---|---|---|
| 5.43 | 2.56 | 0.71 | 0.06 | 2.72 | 0.77 | 1.49 | 6.06 | 4.82 | 2.10 |
| 5.62 | 4.96 | 4.93 | 4.84 | 4.67 | 5.86 | 5.74 | 3.54 | 2.50 | 3.75 |
| 0.86 | 1.44 | 3.83 | 4.08 | 5.83 | 1.47 | 0.77 | 1.29 | 0.16 | 1.38 |
| 4.38 | 2.52 | 3.42 | 3.46 | 4.39 | 0.61 | 4.02 | 1.26 | 2.93 | 3.84 |
| 3.81 | 6.21 | 3.80 | 0.69 | 5.80 | 4.28 | 1.73 | 3.34 | 3.08 | 5.85 |
| 1.39 | 0.25 | 1.28 | 5.14 | 5.54 | 2.38 | 6.20 | 3.05 | 4.37 | 5.41 |
| 2.23 | 0.49 | 5.12 | 6.26 | 3.00 | 2.60 | 3.89 | 5.47 | 4.83 | 4.17 |
| 3.36 | 2.63 | 3.94 | 5.13 | 3.71 | 5.89 | 0.94 | 1.38 | 1.88 | 0.13 |
| 0.27 | 4.90 | 4.89 | 5.50 | 3.02 | 1.94 | 2.93 | 6.12 | 5.47 | 6.04 |
| 1.14 | 5.52 | 2.01 | 1.08 | 2.79 | 0.74 | 2.30 | 0.85 | 0.58 | 2.25 |
| 5.25 | 0.23 | 6.01 | 2.66 | 2.48 | 2.79 | 4.06 | 1.09 | 2.48 | 2.39 |
| 5.39 | 0.61 | 6.25 | 2.62 | 5.36 | 3.10 | 1.56 | 0.91 | 0.08 | 2.52 |
| 5.53 | 3.62 | 2.90 | 5.64 | 3.18 | 2.36 | 2.08 | 6.00 | 2.69 | 1.35 |
| 5.39 | 3.54 | 2.01 | 4.88 | 3.08 | 0.76 | 2.13 | 3.26 | 2.28 | 1.32 |
| 5.00 | 3.74 | 1.82 | 5.78 | 2.28 | 2.44 | 4.57 | 1.48 | 2.48 | 1.52 |
| 2.70 | 5.61 | 3.06 | 1.07 | 4.54 | 4.10 | 0.09 | 2.11 | 0.10 | 3.18 |
| 3.42 | 2.10 | 3.50 | 4.65 | 2.18 | 1.77 | 4.72 | 5.71 | 1.48 | 2.50 |
| 4.89 | 4.04 | 6.12 | 4.28 | 1.08 | 2.90 | 0.24 | 4.02 | 1.29 | 3.61 |
| 4.36 | 6.00 | 2.45 | 5.49 | 1.02 | 0.85 | 5.58 | 2.43 | 0.83 | 0.65 |
| 1.95 | 0.79 | 5.45 | 1.94 | 0.31 | 0.12 | 3.25 | 3.75 | 2.35 | 0.73 |
| 0.20 | 6.05 | 2.98 | 4.70 | 0.69 | 5.97 | 0.92 | 2.65 | 4.17 | 5.71 |
| 1.54 | 2.84 | 0.98 | 1.47 | 6.18 | 4.52 | 4.44 | 0.44 | 1.62 | 6.09 |
| 5.86 | 2.74 | 3.27 | 3.28 | 0.55 | 5.46 | 0.24 | 5.12 | 3.09 | 4.66 |
| 4.78 | 0.39 | 1.63 | 1.20 | 5.26 | 0.92 | 5.98 | 0.78 | 1.79 | 0.75 |
| 4.45 | 1.41 | 2.56 | 2.55 | 1.79 | 2.54 | 5.88 | 1.52 | 5.04 | 1.53 |
| 5.53 | 5.93 | 5.36 | 5.17 | 0.99 | 2.07 | 3.57 | 3.67 | 2.61 | 1.72 |
| 2.83 | 0.86 | 3.16 | 0.55 | 5.99 | 2.06 | 1.90 | 0.60 | 0.05 | 4.01 |
| 6.15 | 0.10 | 0.26 | 2.89 | 3.12 | 3.14 | 0.11 | 0.11 | 3.97 | 5.15 |
| 4.38 | 2.08 | 1.27 | 1.17 | 0.42 | 3.47 | 3.86 | 2.17 | 5.07 | 5.33 |
| 2.63 | 3.20 | 3.39 | 3.21 | 4.58 | 4.66 | 2.69 | 4.67 | 2.35 | 2.44 |
| 0.46 | 4.26 | 3.63 | 2.62 | 3.35 | 0.84 | 3.89 | 4.17 | 1.77 | 1.47 |
| 2.03 | 0.88 | 1.93 | 0.80 | 3.94 | 4.70 | 6.12 | 4.27 | 0.31 | 4.85 |
| 0.27 | 0.51 | 2.70 | 1.69 | 2.18 | 1.95 | 0.02 | 1.91 | 3.13 | 2.27 |
| 5.39 | 5.45 | 5.45 | 1.39 | 2.85 | 1.41 | 0.36 | 4.34 | 2.44 | 1.60 |
| 5.70 | 2.60 | 3.41 | 1.84 | 5.79 | 0.69 | 2.59 | 1.14 | 5.28 | 3.72 |
| 5.55 | 4.92 | 2.64 | | | | | | | |

The (12)th signalling sequence generation step: the signalling sequence generation step contains two methods, i.e. a first signalling sequence generation method and a second signalling sequence generation method described below. In this embodiment, either one of the following two methods can be used to generate a signalling sequence in the frequency domain, and the two particular methods for generating a signalling sequence are described in detail below.

A first signalling sequence generation method:

1.1 Determine the length and number of a signalling sequence;

1.2 Determine the root value in a CAZAC sequence generation formula based on the length and number of the signalling sequence, wherein the length of the signalling sequence is smaller than or equal to the root value, and the root value is greater than or equal to twice of the number of the signalling sequence. Preferably, the root value is selected as the length of the signalling sequence.

For example, the length (L) of the sequence and the number of signalling are determined. For example, if N bits are to be transmitted, then the number (num) of signalling is $2^N$, and a root of CAZAC sequence is chosen to generate the $\exp(j\pi qn(n+1)/\text{root})$ in the formula. The length (L) of the sequence is smaller than or equal to the root value, and the root value is greater than or equal to 2*num. Generally, the root value is a prime number.

1.3 Select different q values for generating CAZAC sequences, wherein the number of q values is equal to the number of the signalling sequence, and the sum of any two q values is not equal to the root value; and the generated CAZAC sequences should be performed cyclic shift on, and the number of the cyclic shift is determined by the corresponding root value and q value.

For example, value of num different $q_0, q_1, \ldots, q_{num-1}$ are chosen to generate the CAZAC sequence:

$$s(n)=\exp(j\pi qn(n+1)/\text{root}), n=0, \ldots \text{root}-1, \quad \text{(Formula 26)}$$

after the cyclic shift, the sequence is:

$$s_k(n)=(k), s(k+1), \ldots, s(L-1), s(0), \ldots, s(k-1)] \quad \text{(Formula 27)}$$

where k is the value of the cyclic shift.

It should be noted that, in this embodiment, $q_i(0 \leq i \leq \text{num}-1)$ selected should satisfy the following condition: any two $q_i$ and $q_j(0 \leq i, j \leq \text{num}-1)$ satisfy $q_i+q_j \neq \text{root}$.

Under the above-mentioned condition, a sequence enabling the PAPR of the overall frequency-domain OFDM symbol to be lower is preferably selected. Moreover, if L is greater than or equal to 2*num, it is preferably selected that root=L. As such, the auto-correlation value of the sequence is zero.

1.4 Select the signalling sequence from all the CAZAC sequences according to the determined number of signalling sequences. It should be noted that if L=root, then truncation is not required, and the obtained CAZAC sequences can be taken as signalling sequences directly.

For example a continuous partial sequence with a length of L truncated from each sequence among the num sequences, or the entire sequence is taken as a signalling sequence.

By way of example, the signalling sequence has a length of L=353 and a number of num=128, then the root can be selected as the closest prime number 353. The value range of q is 1 to 352, and the value range of the cyclic shift value of each sequence is 1 to 353. Among all the selectable signalling sequences, the following 128 sets are preferably selected, the q values and the cyclic shift digits thereof are as shown in q value table of table 3 and cyclic shift digit table of table 4:

TABLE 3 q value table

| 1 | 9 | 10 | 16 | 18 | 21 | 28 | 29 | 32 | 35 | 49 | 51 | 53 | 54 | 55 |
|---|---|---|---|---|---|---|---|---|---|---|---|---|---|---|
| 57 | 59 | 60 | 61 | 65 | 68 | 70 | 74 | 75 | 76 | 77 | 78 | 82 | 84 | 85 |
| 86 | 88 | 90 | 95 | 96 | 103 | 113 | 120 | 123 | 125 | 126 | 133 | 134 | 135 | 137 |
| 138 | 140 | 141 | 142 | 145 | 147 | 148 | 150 | 151 | 155 | 156 | 157 | 161 | 163 | 165 |
| 167 | 170 | 176 | 178 | 179 | 181 | 182 | 184 | 185 | 187 | 194 | 200 | 201 | 204 | 209 |
| 210 | 217 | 222 | 223 | 224 | 225 | 229 | 232 | 234 | 235 | 237 | 239 | 241 | 244 | 246 |
| 247 | 248 | 249 | 251 | 252 | 253 | 254 | 255 | 262 | 270 | 272 | 273 | 280 | 282 | 290 |
| 291 | 306 | 307 | 308 | 309 | 311 | 313 | 314 | 315 | 317 | 320 | 326 | 327 | 330 | 331 |
| 333 | 336 | 338 | 340 | 342 | 345 | 347 | 349 | | | | | | | |

TABLE 4

Cyclic shift value table

| 105 | 244 | 172 | 249 | 280 | 251 | 293 | 234 | 178 | 11 | 63 | 217 | 83 | 111 | 282 |
|---|---|---|---|---|---|---|---|---|---|---|---|---|---|---|
| 57 | 85 | 134 | 190 | 190 | 99 | 180 | 38 | 191 | 22 | 254 | 186 | 308 | 178 | 251 |
| 277 | 261 | 44 | 271 | 265 | 298 | 328 | 282 | 155 | 284 | 303 | 113 | 315 | 299 | 166 |
| 342 | 133 | 115 | 225 | 13 | 26 | 326 | 148 | 195 | 145 | 185 | 121 | 58 | 162 | 118 |
| 151 | 182 | 230 | 39 | 249 | 305 | 309 | 144 | 188 | 181 | 265 | 140 | 212 | 137 | 10 |
| 298 | 122 | 281 | 181 | 267 | 178 | 187 | 177 | 352 | 4 | 353 | 269 | 38 | 342 | 288 |
| 277 | 88 | 124 | 120 | 162 | 204 | 174 | 294 | 166 | 157 | 56 | 334 | 110 | 183 | 131 |
| 171 | 166 | 321 | 96 | 37 | 261 | 155 | 34 | 149 | 156 | 267 | 332 | 93 | 348 | 300 |
| 245 | 101 | 186 | 117 | 329 | 352 | 215 | 55 | | | | | | | |

A second signalling sequence generation method:

2.1 Determine the length and number of a signalling sequence;

2.2 Determine several root values in a CAZAC sequence generation formula based on the length and number of the signalling sequence, wherein the length of the signalling sequence is smaller than or equal to the minimum value in the selected several root values, and the sum of the selected several root values is greater than or equal to twice of the number of the signalling sequence. Preferably, the root value is selected as the length of the signalling sequence.

For example, the length (L) of the sequence and the number of signalling are determined. For example, if N bits are to be transmitted, then the number (num) of signalling is $2^N$, and a CAZAC sequence is chosen to generate K $root_k$ (0≤k≤K−1) in the formula exp(jπqn(n+1)/root). The length (L) of the signalling sequence is smaller than or equal to the minimum value in $root_k$, and the sum of several $root_k$ is greater than or equal to 2*num, i.e.

$$\sum_{k=0}^{K-1} root_k \geq 2^*num.$$

Generally, the value of $root_k$ is a prime number.

2.3 For each root value, select different q values for generating CAZAC sequences, wherein the number of q values is smaller than or equal to ½ of the corresponding root value, and the sum of any two q values is not equal to the corresponding root value; and the generated CAZAC sequences should be performed cyclic shift on, and the value of the cyclic shift is determined by the corresponding root value and q value.

For example, for each $root_k$(0≤k≤K−1), $num_k$ different $q_0$, $q_1$, and $q_{num_k-1}$ are chosen to the produce CAZAC sequences exp(jπqn(n+1)/$root_k$), n=0, . . . $root_k$−1, where $$num_k \leq \left\lfloor \frac{root_k}{2} \right\rfloor, \text{ and } \sum_{k=0}^{K-1} num_k = num.$$

In the second signalling sequence generation method, for each root value, different q values are chosen to generate the CAZAC sequences, and the generated CAZAC sequences should be performed cyclic shift on, which can refer to the description about method I above, and will not be described herein.

It should be noted that, in this embodiment, $q_i$(0≤i≤$num_k$−1) selected should satisfy the following condition: any two $q_i$ and $q_j$(0≤i, j≤$num_k$−1) satisfy $q_i$+$q_j$≠$root_k$.

Under the above-mentioned condition, a sequence enabling the PAPR of the overall frequency-domain OFDM symbol to be lower is preferably selected. Moreover, it can be preferentially selected that one root=L. As such, the auto-correlation value of the sequence generated by this root is zero.

2.4 Select the signalling sequence from each CAZAC sequence according to the determined number of signalling sequences. It is worth emphasizing that, if some root=L, then the signalling sequence is determined using the CAZAC sequence generated by the root value which is the length of the signalling sequence.

For example a continuous partial sequence with a length of L cyclically truncated from each sequence among the num sequences, or the entire sequence is taken as a signalling sequence.

By way of example, L=353, num=128. According to the first signalling sequence generation method, it is preferentially selected that the root is 353. Then, it is selected that q=1,2, . . . 128, and satisfies $q_i$+$q_j$≠353, (0≤i, j≤128−1). Finally, cyclically truncating each sequence with a length of 353.

For another example, L=350, num=256. According to the second signalling sequence generation method, it is preferentially selected that the root1 is 353 and root2=359, and then for root1=353, 128 sequences are selected in total, i.e. q=1, 2, 3, . . . 128, $q_i$+$q_j$≠353. Then for root2=359, 128 sequences are selected in total, i.e. q=100, 101, 102, . . . 227; to this end, there are 256 sequences in total. Finally, cyclically truncating each sequence with a length of 353.

In the following, in the (12)th signalling sequence generation step, 512 signalling sequences are generated in total by means of the second signalling sequence generation method, i.e. $Seq_0$, $Seq_1$, . . . , $Seq_{511}$; then obtaining the opposite number of each signalling sequence $Seq_0$~$Seq_{511}$, namely, $Seq_0$~−$Seq_{511}$; the receiving end differentiates a positive sequence from a negative according to whether a correlation value is positive or negative, which means 10 bits of signalling information is conveyed in total. The 512 signalling sequences can be further divided into 4 groups, each group including 128 signalling sequences. The substeps of generating each group of 128 signalling sequences are as follows:

The first substep: generating a reference sequence $zc_i(n)$, which is a Zadoff-Chu sequence zc(n) with a length of N:

$$zc_i(n) = e^{-j\pi \frac{u_i n(n+1)}{N}}, n = 0 \sim N-1, i = 0 \sim 127 \quad \text{(Formula 28)}$$

The second substep: $zc^*_i(n)$ with a length of 2N is produced by copying $zc_i(n)$ twice:

$$zc^*_i(n) = \begin{cases} zc_i(n), 0 \leq n < N \\ zc_i(n-N), N \leq n < 2N \end{cases}, \quad \text{(Formula 29)}$$

$$n = 0 \sim N-1, i = 0 \sim 127$$

The third substep: truncating a sequence with a length of 353 from a specific start position $k_i$ in $zc^*_i(n)$, to produce $SC_i(n)$:

$$SC_i(n) = zc^*_i(k_i - 1 + n), n = 0 \sim 352 \quad \text{(Formula 30)}$$

The N value, $u_i$ and shift value $k_i$ of each group of signalling sequences $Seq_0$~$Seq_{127}$ are respectively determined from various corresponding predefined signalling sequence parameter tables below, i.e. table 5 to table 8.

The N value, $u_i$ and shift value $k_i$ of the first group of sequences $Seq_0$~$Seq_{127}$ are as shown in table 5 below.

TABLE 5

The first group of signalling sequence parameters

| | |
|---|---|
| N | 353 |
| $u_i$, i = 0-127 | 1, 9, 10, 16, 18, 21, 28, 29, 32, 35, 49, 51, 53, 54, 55, 57, 59, 60, 61, 65, 68, 70, 74, 75, 76, 77, 78, 82, 84, 85, 86, 88, 90, 95, 96, 103, 113, 120, 123, 125, 126, 133, 134, 135, 137, 138, 140, 141, 142, 145, 147, 148, 150, 151, 155, 156, 157, 161, 163, 165, 167, 170, 176, 178, 179, 181, 182, 184, 185, 187, 194, 200, 201, 204, 209, 210, 217, 222, 223, 224, 225, 229, |

TABLE 5-continued

The first group of signalling sequence parameters

|  |  |
|---|---|
|  | 232, 234, 235, 237, 239, 241, 244, 246, 247, 248, 249, 251, 252, 253, 254, 255, 262, 270, 272, 273, 280, 282, 290, 291, 306, 307, 308, 309, 311, 313, 314, 315, 317, 320, 326, 327, 330, 331, 333, 336, 338, 340, 342, 345, 347, 349 |
| $k_i$, i = 0-127 | 105, 244, 172, 249, 280, 251, 293, 234, 178, 11, 63, 217, 83, 111, 282, 57, 85, 134, 190, 190, 99, 180, 38, 191, 22, 254, 186, 308, 178, 251, 277, 261, 44, 271, 265, 298, 328, 282, 155, 284, 303, 113, 315, 299, 166, 342, 133, 115, 225, 13, 26, 326, 148, 195, 145, 185, 121, 58, 162, 118, 151, 182, 230, 39, 249, 305, 309, 144, 188, 181, 265, 140, 212, 137, 10, 298, 122, 281, 181, 267, 178, 187, 177, 352, 4, 353, 269, 38, 342, 288, 277, 88, 124, 120, 162, 204, 174, 294, 166, 157, 56, 334, 110, 183, 131, 171, 166, 321, 96, 37, 261, 155, 34, 149, 156, 267, 332, 93, 348, 300, 245, 101, 186, 117, 329, 352, 215, 55 |

The generation steps of the second group of sequences $Seq_{128}$~$Seq_{255}$ are the same as those of the first group, and the N value, $u_i$ and shift value $k_i$ of thereof are as shown in table 6 below.

TABLE 6

The second group of signalling sequence parameters

| | |
|---|---|
| N | 367 |
| $u_i$, i = 0-127 | 8, 9, 10, 15, 19, 21, 31, 34, 39, 49, 58, 59, 71, 76, 80, 119, 120, 121, 123, 140, 142, 151, 154, 162, 166, 171, 184, 186, 188, 190, 191, 193, 194, 195, 198, 203, 204, 207, 208, 209, 210, 211, 212, 214, 215, 219, 220, 221, 222, 223, 224, 226, 228, 230, 232, 233, 235, 236, 237, 239, 240, 241, 243, 245, 249, 250, 252, 254, 257, 259, 260, 261, 262, 263, 264, 265, 266, 267, 269, 271, 272, 273, 275, 276, 277, 278, 281, 282, 283, 284, 285, 286, 289, 294, 297, 299, 302, 303, 306, 307, 310, 311, 312, 313, 314, 316, 317, 321, 322, 323, 326, 327, 329, 331, 332, 334, 338, 340, 342, 344, 345, 347, 349, 351, 356, 361, 363, 366 |
| $k_i$, i = 0-127 | 198, 298, 346, 271, 345, 324, 160, 177, 142, 71, 354, 290, 69, 144, 28, 325, 100, 55, 237, 196, 271, 210, 187, 277, 8, 313, 53, 53, 194, 294, 36, 202, 69, 25, 18, 179, 318, 149, 11, 114, 254, 191, 226, 138, 179, 341, 366, 176, 64, 50, 226, 23, 181, 26, 327, 141, 244, 179, 74, 23, 256, 265, 223, 288, 127, 86, 345, 304, 260, 139, 312, 62, 360, 107, 201, 301, 263, 257, 184, 329, 300, 81, 121, 49, 196, 201, 94, 147, 346, 179, 59, 212, 83, 195, 145, 3, 119, 152, 310, 31, 134, 54, 187, 131, 63, 276, 294, 142, 246, 54, 181, 121, 273, 276, 36, 47, 16, 199, 243, 235, 194, 348, 95, 262, 52, 210, 115, 250 |

The generation steps of the third group of sequences $Seq_{256}$~$Seq_{383}$ are the same as those of the first group, and the N value, $u_i$ and shift value $k_i$ of thereof are as shown in table 7 below.

TABLE 7

The third group of signalling sequence parameters

| | |
|---|---|
| N | 359 |
| $u_i$, i = 0-127 | 1, 3, 5, 6, 9, 12, 14, 22, 29, 30, 32, 34, 60, 63, 65, 67, 72, 874, 76, 78, 83, 84, 87, 88, 9, 90, 91, 92, 94, 95, 96, 99, 112, 115, 123, 124, 128, 137, 141, 143, 145, 149, 152, 153, 154, 155, 159, 164, 165, 169, 175, 179, 183, 186, 187, 188, 189, 192, 197, 199, 201, 202, 203, 211, 215, 219, 220, 221, 223, 226, 227, 228, 229, 230, 234, 237, 238, 239, 243, 246, 248, 249, 250, 252, 254, 257, 258, 261, 262, 273, 274, 280, 282, 284, 286, 288, 290, 297, 298, 300, 303, 308, 309, 310, 312, 313, 314, 317, 318, 319, 320, 321, 322, 323, 324, 326, 333, 334, 335, 336, 339, 341, 342, 344, 349, 351, 352, 355 |
| $k_i$, i = 0-127 | 300, 287, 80, 119, 68, 330, 93, 359, 17, 93, 355, 308, 106, 224, 20, 18, 226, 165, 320, 339, 352, 316, 241, 336, 119, 166, 258, 273, 302, 275, 46, 26, 259, 330, 206, 46, 10, 308, 165, 195, 314, 330, 208, 148, 275, 15, 214, 251, 8, 27, 264, 169, 128, 207, 21, 246, 14, 291, 345, 114, 306, 179, 109, 336, 322, 149, 270, 253, 207, 152, 26, 190, 128, 137, 196, 268, 36, 40, 253, 29, 264, 153, 221, 341, 116, 24, 55, 60, 171, 25, 100, 202, 37, 93, 115, 174, 239, 148, 170, 37, 328, 37, 253, 237, 355, 39, 288, 225, 223, 140, 163, 145, 264, 75, 29, 282, 252, 270, 30, 262, 271, 305, 122, 78, 27, 127, 92, 6 |

The generation steps of the fourth group of sequences $Seq_{384}$~$Seq_{511}$ are the same as those of the first group, and the N value, $u_i$ and shift value $k_i$ of thereof are as shown in table 8 below.

TABLE 8

The fourth group of signalling sequence parameters

| | |
|---|---|
| N | 373 |
| $u_i$, i = 0-127 | 26, 28, 29, 34, 38, 40, 43, 49, 54, 57, 58, 62, 64, 65, 79, 80, 81, 83, 85, 86, 87, 101, 102, 187, 189, 190, 191, 193, 194, 195, 196, 198, 199, 200, 202, 204, 205, 206, 208, 209, 211, 213, 214, 216, 217, 218, 219, 220, 221, 222, 223, 224, 225, 227, 228, 230, 232, 233, 236, 237, 241, 243, 245, 246, 247, 248, 249, 250, 251, 252, 253, 255, 256, 259, 260, 261, 262, 263, 265, 266, 267, 275, 276, 280, 282, 283, 284, 285, 289, 295, 297, 300, 301, 302, 303, 305, 307, 317, 320, 322, 323, 325, 327, 328, 332, 338, 341, 342, 343, 348, 349, 351, 352, 353, 355, 356, 357, 358, 359, 360, 361, 362, 363, 364, 367, 369, 370, 372 |
| $k_i$, i = 0-127 | 333, 337, 177, 125, 169, 270, 254, 88, 123, 310, 96, 273, 120, 239, 157, 224, 62, 119, 19, 235, 136, 117, 237, 100, 244, 181, 295, 249, 356, 9, 289, 139, 82, 171, 178, 292, 158, 308, 257, 42, 55, 210, 320, 294, 100, 75, 79, 163, 195, 80, 303, 97, 271, 179, 359, 178, 241, 281, 367, 58, 91, 7, 179, 39, 267, 245, 213, 286, 349, 172, 35, 301, 361, 102, 301, 155, 1, 34, 96, 293, 202, 87, 176, 248, 319, 301, 168, 280, 154, 244, 215, 370, 260, 117, 30, 329, 42, 149, 112, 125, 50, 249, 197, 273, 230, 13, 142, 244, 335, 57, 21, 261, 48, 370, 110, 296, 326, 224, 77, 112, 31, 262, 121, 38, 283, 323, 93, 94 |

In the (13)th arrangement and filling step, the fixed sequences and signalling sequences obtained from the (11)th step and the (12)th step are in an odd-even interlaced arrangement, and after filling virtual subcarriers, the frequency-domain OFDM symbols are formed according to the following formula, $$P1\_X(m) = \begin{cases} 0 & m = 0, 1, \ldots, 158 \\ SC\left(\frac{m-159}{2}\right) & m = 159, 161, 163, \ldots 863 \\ FC\left(\frac{m-160}{2}\right) & m = 160, 162, 164, \ldots 864 \\ 0 & m = 865, 866, \ldots 1023 \end{cases} \quad \text{(Formula 31)}$$

Figure 10:
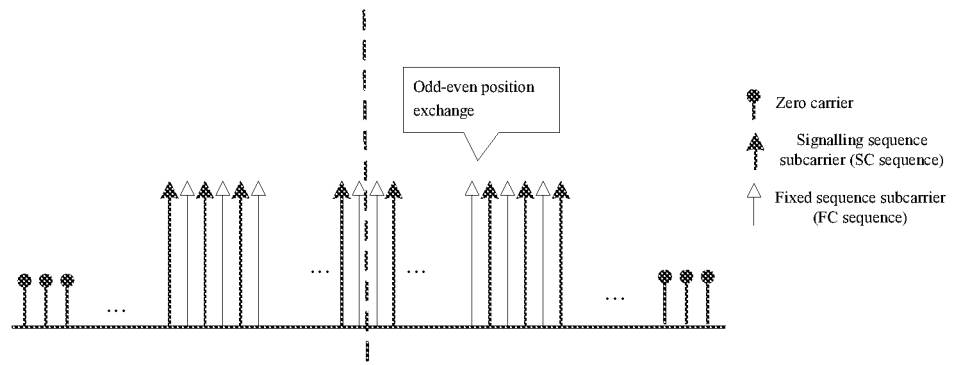
FIG. 10 is a schematic diagram of frequency-domain structure I arranged according to a second predetermined interlaced arrangement rule in the embodiments of the present invention.

FIG. 10 is a schematic diagram of the signalling sequence subcarriers, the fixed sequence subcarriers and the virtual subcarriers arranged according to a second predetermined interlaced arrangement rule in the embodiments of the present invention.

As shown in FIG. 10, a first half part of the signalling sequence at the left side of the dashed line in the figure is placed on odd-numbered subcarriers, and the other half part of the signalling sequence at the right side of the dashed line in the figure is placed on even-numbered subcarrier; and a first half part of the fixed sequence at the left side of the dashed line is placed on even-numbered subcarriers, and the latter half part of the fixed sequence at the right side of the dashed line is placed on odd-numbered subcarrier. That is to say, $P1\_X_0, P1\_X_1, \ldots, P1\_X_{1023}$ is generated according to the second predefined interlaced arranged rule; in the first half part, the SC is placed at odd-numbered carriers, and the FC is placed at even-numbered carrier; and in the later half part, the SC is placed at even-numbered carriers, and the FC is placed at odd-numbered carriers. The odd-even positions of the signalling sequence and the fixed sequence in the first and the latter half part are interchanged. The odd-even positions of such fixed sequence subcarriers $\overline{FC}$ and signalling sequence subcarriers $\overline{SC}$ can be interchanged, without any influence on the transmission performance.

When filling virtual carriers, i.e. zero sequence subcarriers, the length of the zero sequence subcarriers filled at the left and right side can also be different, but are inappropriate to be far different from each other.

Particularly optimized embodiments of frequency-domain symbols generated according to the second predefined interlaced arrangement rule are given below continuously. Generating the frequency-domain OFDM symbol according to the second predefined interlaced arrangement rule comprises the following step:

The (21)th fixed sequence generation step: this fixed sequence generation step is the same as the above-mentioned (11)th fixed sequence generation step, and only the value of the fixed sequence subcarriers radian value $\omega_n$ is determined through a second predefined fixed subcarrier radian value table. The second predefined fixed subcarrier radian value table is as shown in table 9.

TABLE 9

The fixed subcarrier radian value table (according to the second predefined interlaced arrangement rule)

| 0.63 | 2.34 | 5.57 | 6.06 | 0.55 | 5.68 | 2.20 | 1.58 | 2.23 | 4.29 |
|---|---|---|---|---|---|---|---|---|---|
| 1.80 | 3.89 | 4.08 | 2.41 | 5.06 | 0.10 | 4.49 | 4.15 | 4.99 | 6.18 |
| 0.86 | 4.31 | 3.08 | 0.73 | 1.67 | 5.03 | 4.26 | 1.73 | 5.58 | 2.74 |
| 5.06 | 1.23 | 1.67 | 1.31 | 2.19 | 5.90 | 2.13 | 3.63 | 3.90 | 0.73 |
| 4.13 | 5.90 | 5.00 | 1.78 | 6.10 | 2.45 | 2.00 | 3.61 | 1.72 | 5.90 |
| 4.07 | 0.39 | 4.72 | 2.73 | 4.67 | 3.56 | 4.13 | 3.07 | 3.74 | 4.87 |
| 1.54 | 4.28 | 1.88 | 2.96 | 3.07 | 4.13 | 1.97 | 5.69 | 4.45 | 2.07 |
| 6.05 | 4.88 | 3.39 | 2.55 | 5.83 | 1.86 | 1.65 | 4.23 | 0.46 | 3.24 |
| 1.39 | 0.19 | 0.66 | 4.13 | 4.83 | 2.26 | 2.19 | 3.06 | 5.66 | 0.66 |
| 5.19 | 5.04 | 4.62 | 3.64 | 0.66 | 3.52 | 1.18 | 4.18 | 5.93 | 5.51 |
| 1.05 | 2.18 | 5.87 | 1.27 | 0.92 | 0.66 | 5.75 | 0.16 | 5.04 | 0.54 |
| 5.68 | 0.13 | 4.76 | 0.56 | 1.57 | 1.59 | 4.50 | 3.18 | 0.82 | 3.84 |

TABLE 9-continued

The fixed subcarrier radian value table (according to the second predefined interlaced arrangement rule)

| 4.39 | 5.53 | 2.25 | 3.20 | 4.04 | 6.03 | 4.41 | 0.32 | 1.39 | 5.06 |
|---|---|---|---|---|---|---|---|---|---|
| 4.67 | 3.20 | 4.63 | 0.88 | 6.00 | 3.99 | 0.31 | 3.72 | 4.17 | 3.37 |
| 4.77 | 0.30 | 4.85 | 2.65 | 0.88 | 3.13 | 1.77 | 6.05 | 0.46 | 1.93 |
| 4.25 | 1.47 | 6.12 | 1.18 | 3.19 | 3.00 | 2.88 | 5.43 | 1.01 | 2.96 |
| 2.16 | 1.17 | 4.77 | 6.07 | 5.32 | 3.55 | 1.64 | 4.35 | 5.10 | 3.87 |
| 2.79 | 4.57 | 0.51 | 3.27 | 2.42 | 1.52 | 1.40 | 0.19 | 0.35 | 4.96 |
| 6.04 | 4.90 | 5.47 | 5.55 | 1.40 | 1.91 | 4.62 | 4.22 | 2.11 | 4.14 |
| 2.33 | 2.75 | 2.68 | 2.06 | 4.86 | 0.34 | 0.47 | 3.13 | 2.97 | 0.05 |
| 5.75 | 1.51 | 6.22 | 2.48 | 5.10 | 5.20 | 2.18 | 2.31 | 4.29 | 3.09 |
| 3.93 | 5.47 | 3.22 | 1.84 | 4.67 | 1.35 | 3.04 | 0.60 | 0.62 | 5.09 |
| 6.04 | 5.39 | 2.71 | 2.47 | 1.86 | 2.69 | 1.75 | 4.94 | 5.98 | 1.08 |
| 5.99 | 3.84 | 3.67 | 5.53 | 1.59 | 5.60 | 1.22 | 5.35 | 4.44 | 2.72 |
| 5.97 | 5.08 | 2.32 | 0.13 | 4.52 | 2.18 | 1.36 | 5.72 | 4.76 | 2.98 |
| 5.30 | 1.71 | 4.31 | 2.05 | 1.68 | 4.61 | 3.86 | 2.52 | 5.36 | 2.39 |
| 3.29 | 1.47 | 6.05 | 0.48 | 5.57 | 1.29 | 4.88 | 5.97 | 0.53 | 0.88 |
| 5.43 | 2.12 | 3.97 | 2.61 | 2.51 | 0.50 | 6.00 | 5.86 | 5.35 | 1.15 |
| 5.38 | 4.42 | 5.05 | 0.96 | 2.41 | 4.84 | 0.79 | 4.99 | 0.51 | 1.32 |
| 5.09 | 1.33 | 2.83 | 2.27 | 4.36 | 0.53 | 5.89 | 4.98 | 5.33 | 2.12 |
| 2.35 | 0.59 | 1.94 | 1.65 | 4.44 | 2.99 | 4.37 | 0.01 | 1.64 | 0.08 |
| 5.34 | 4.09 | 2.14 | 3.31 | 3.69 | 1.38 | 5.95 | 3.31 | 2.44 | 4.81 |
| 4.03 | 4.80 | 0.39 | 3.28 | 4.57 | 0.30 | 4.66 | 2.21 | 4.22 | 2.20 |
| 3.98 | 4.78 | 3.97 | 6.17 | 5.59 | 2.78 | 5.92 | 3.61 | 1.41 | 0.88 |
| 5.24 | 5.47 | 2.38 | 2.42 | 3.22 | 5.38 | 5.02 | 5.10 | 3.06 | 2.43 |
| 1.51 | 4.52 | 4.85 | | | | | | | |

The (22)th signalling sequence generation step: this signalling sequence generation step is the same as the above-mentioned (12)th signalling sequence generation step.

The (23)th arrangement and filling step: the signalling sequences and fixed sequences obtained from the (21)th step and the (22)th step are in an odd-even and then even-odd interlaced arrangement, and after filling zero subcarriers at the left and the right side thereof, the frequency-domain OFDM symbols are formed according to the following formula, $$P1\_X(m) = \begin{cases} 0 & m = 0, 1, \ldots, 158 \\ SC\left(\frac{m-159}{2}\right) & m = 159, 161, \ldots 159 + 176*2 \\ FC\left(\frac{m-159-1}{2}\right) & m = 160, 162, 160 + 176*2 \\ FC\left(\frac{m-159}{2}\right) & m = 161 + 176*2, 163 + \\ & 176*2, 159 + 352*2 \\ SC\left(\frac{m-159-1}{2}\right) & m = 162 + 176* \\ & 2, 164 + 176*2, \ldots 160 + 352*2 \\ 0 & m = 865, \ldots 1023 \end{cases} \quad \text{(Formula 32)}$$

With regard to a united symbol formed by assembling two time-domain symbols with three-segment structure, the step of generating a frequency-domain OFDM symbol corresponding to two time-domain main body signals thereof contains: any of the above-mentioned signalling sequence generation steps or fixed sequence generation steps or any of the first predefined interlaced arrangement rule or the second predefined interlaced arrangement rule. Additionally, the structure of the frequency-domain OFDM symbol corresponding to the two time-domain symbols with a three-segment structure can also satisfy at least any one of the following three predefined association rules:

The first predefined association rule: two time-domain OFDM symbols respectively adopt the same set of signalling sequences. For example, if 10 bits are transmitted by a single symbol according to the above statement, the total transmission capacity is 20 bits in total.

The second predefined association rule: the fixed sequence of the second time-domain OFDM symbol and the fixed sequence of the first time-domain OFDM symbol keep the same.

The third predefined association rule: the positions of the valid subcarriers containing a fixed sequence and a signalling sequence in the second time-domain OFDM symbol are the integral left-wise or right-wise shift of the positions of the valid subcarriers in the first time-domain OFDM symbol, and the shift value is generally controlled to be in the range of 0-5.

Figure 11:
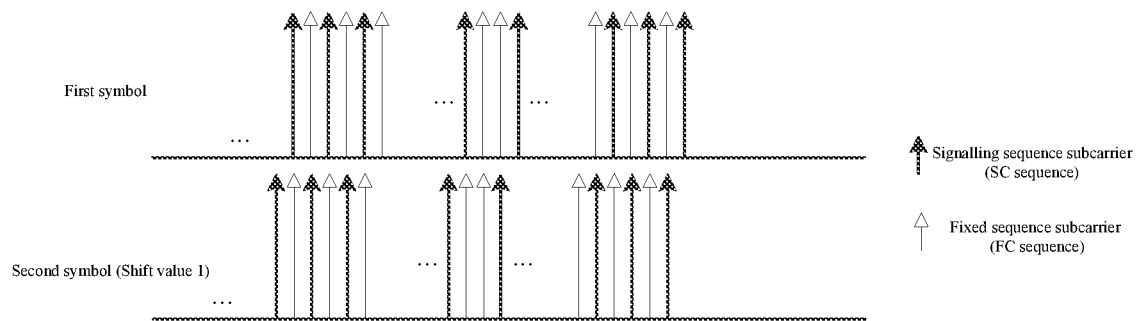
FIG. 11 is a schematic diagram of overall shift with a first shift value according to a third predefined association rule in the embodiments of the present invention.
Figure 12:
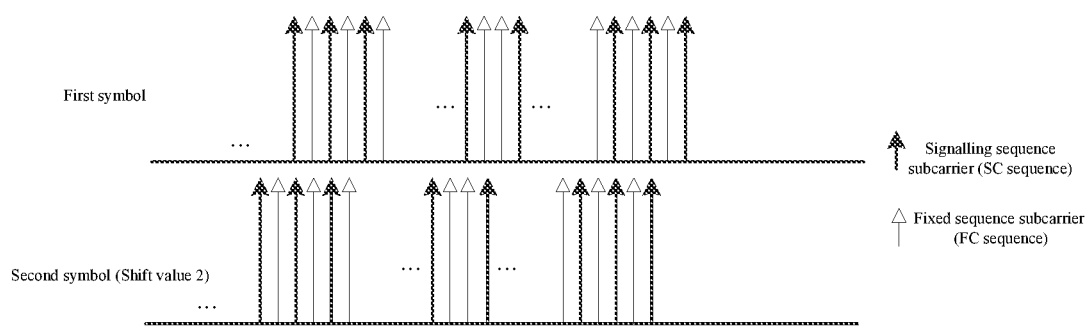
FIG. 12 is a schematic diagram of overall shift with a second shift value according to a third predefined association rule in the embodiments of the present invention.

FIG. 11 and FIG. 12 are respectively schematic diagrams of integral shift of frequency-domain symbols corresponding to two time-domain main body signals according to the third predefined association rule with a first shift value and a second shift value. The first shift value in FIG. 11 is 1, and the second shift value in FIG. 12 is 2.

In the united time-domain symbol containing a plurality of three-segment structures, for example two three-segment structures, the preferred embodiment of generating a frequency-domain symbol for a time-domain main body signal A1 in the first three-segment structure and a time-domain main body signal A2 in the second three-segment structure is as follows:

A frequency-domain symbol corresponding to a time-domain main body signal A1 of a first time-domain symbol in a united preamble symbol is identical to the frequency-domain symbol in the common preamble symbol generated according to the second predefined interlaced arrangement rule introduced above, the FC and SC sequence and the frequency domain position arrangement and zero carrier positions are exactly the same.

A frequency-domain symbol corresponding to a time-domain main body signal A2 of a second time-domain symbol in a united preamble symbol is identical with the FC and SC sequence of the common preamble symbol generated according to the second predefined interlaced arrangement rule introduced above, and the positions of the valid subcarriers of the frequency-domain symbol corresponding to A2 is an integral one-unit left-wise shift of the frequency-domain symbol corresponding to A1. i.e., $$P2\_X(m) = \begin{cases} 0 & m = 0, 1, \ldots, 157 \\ SC\left(\frac{m-158}{2}\right) & m = 158, 160, \ldots 158+176*2 \\ FC\left(\frac{m-158-1}{2}\right) & m = 159, 161, 159+176*2 \\ FC\left(\frac{m-158}{2}\right) & m = 160+176*2, 162+ \\ & 176*2, 158+352*2 \\ SC\left(\frac{m-158-1}{2}\right) & m = 161+176* \\ & 2,163+176*2, \ldots 159+352*2 \\ 0 & m = 864, \ldots 1023 \end{cases} \quad \text{(Formula 33)}$$

[Frequency-Domain Structure II]

Description is made below to a method for generating a frequency-domain OFDM symbol with the following frequency-domain structure II. The frequency-domain structure of the second type of P1_X is elaborated, and is defined as frequency-domain structure II. For frequency-domain structure II, the frequency-domain symbol generation method comprises the following steps:

generating a frequency-domain main body sequence with a predefined sequence generation rule; and/or processing the frequency-domain main body sequence with a predefined processing rule to generate a frequency-domain symbol, wherein the predefined sequence generation rule contains either one or a combination of two of the following:

generating a sequence based on different sequence generation formulas; and/or generating a sequence based on the same sequence generation formula, and further preforming cyclic shift on the generated sequence.

the predefined processing rule contains: according to the predefined frequency offset value, performing phase modulation on a pre-generated subcarrier which is obtained by processing the frequency-domain main body sequence.

Figure 13:
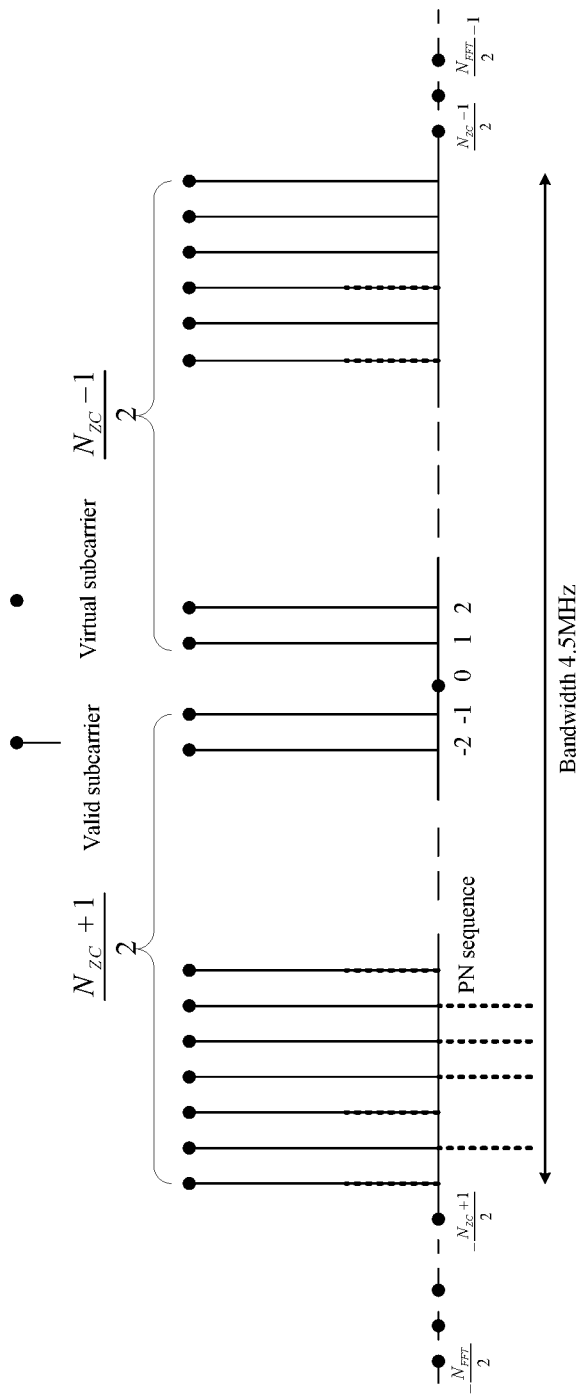
FIG. 13 is a schematic diagram of the arrangement of frequency-domain structure II corresponding to a time-domain symbol in the embodiments of the present invention.

FIG. 13 is a schematic diagram of the arrangement of frequency-domain structure II corresponding to a time-domain symbol in the preamble symbol of the embodiments of the present invention;

The preamble symbol as previously stated contains at least one time-domain symbol, and a frequency-domain subcarrier corresponding to the time-domain symbol is obtained based on a frequency-domain main body sequence.

The generation of the frequency-domain subcarrier is described through FIG. 13. The frequency-domain subcarrier contain a predefined sequence generation rule for generating the frequency-domain main body sequence and/or a predefined processing rule for processing the frequency-domain main body sequence for generating the frequency-domain subcarrier.

For the predefined sequence generation rule, the process of generating the frequency-domain main body sequence is relatively flexible. The predefined sequence generation rule contains any one or a combination of two of the following: generating a sequence based on different sequence generation formulas; and/or generating a sequence based on the same sequence generation formula, and further preforming cyclic shift on the generated sequence. In this embodiment, the generation process is realized using a constant amplitude zero auto-correlation sequence (CAZAC sequence); that is to say, the above-mentioned different sequence generation formulas are obtained by assigning different root values to the same CAZAC sequence, and it can also be that the same sequence generation formula mentioned above is obtained by assigning the same root value to the CAZAC sequence.

The frequency-domain main body sequence is generated based on one or more CAZAC sequences, and the frequency-domain main body sequence has a predefined sequence length $N_{ZC}$. The predefined sequence length $N_{ZC}$ is not greater than a Fourier transform length $N_{FFT}$ of the time-domain main body signal.

In general, the step of processing and filling with the frequency-domain main body sequence comprises: mapping the frequency-domain main body sequence to positive frequency subcarriers and negative frequency subcarriers with reference to the predefined sequence length $N_{ZC}$, filling a predefined number of virtual subcarriers and direct-current subcarrier at the outer edge of the positive frequency subcarriers and the negative frequency subcarriers with reference to the Fourier transform length $N_{FFT}$; and performing cyclic left-wise shift on the resulting subcarriers, so that the zero subcarrier corresponds to the first position in inverse Fourier transform.

Herein, an example of generation based on one CAZAC sequence is listed.

First of all, a frequency-domain main body sequence (Zadoff-Chu, sequence ZC) with a length of $N_{ZC}$ is generated, which is one of CAZAC sequences.

Assuming that the sequence formula is:

$$a_q(n) = e^{-j\pi q \frac{n(n+1)}{N_{root}}} \quad \text{(Formula 34)}$$

No that $N_{ZC}$ can be equal to or smaller than $N_{root}$, namely, it can be generated by a complete Zadoff-Chu sequence with some root value in its entirety or by truncating the ZC sequence; then it is selectable to modulate the ZC sequence with a PN sequence having the same length to obtain a ZC_M sequence; the ZC_M sequence is divided into two parts, i.e. a left half part having a length of $$\frac{N_{ZC}+1}{2}$$

and being mapped to a negative frequency part of subcarriers, and a right half part having a length of $$\frac{N_{ZC}-1}{2}$$

and being mapped to a positive frequency part of subcarriers; $N_{ZC}$ can be selected as some natural number, and does not exceed the FFT length of segment A. Additionally, at the edge of the negative frequency of subcarriers, $$\frac{N_{FFT}-N_{ZC}-1}{2}$$

zeros are added, and at the edge of the positive frequency of subcarriers, $$\frac{N_{FFT}-N_{ZC}-1}{2}$$

zeros are added, as virtual subcarriers. Therefore, the specific sequence is composed by $$\frac{N_{FFT}-N_{ZC}-1}{2}$$

zeros, $$\frac{N_{ZC}+1}{2}$$

PN-modulated ZC sequences, 1 direct-current subcarrier, $$\frac{N_{ZC}-1}{2}$$

PN-modulated ZC sequences and $$\frac{N_{FFT}-N_{ZC}-1}{2}$$

zeros sequentially; and the number of valid subcarriers is $N_{ZC}+1$.

To describe the process of generating the frequency-domain main body sequence particularly, taking the sequence formula $$a_q(n) = e^{-j\pi q \frac{n(n+1)}{N_{root}}}$$

as an example, several different root values q can be selected; and for the sequence generated by each root value q, different cyclic shift can be performed again to obtain more sequences; either or both of the two modes are adopted to transmit signalling.

By way of example, if 256 root values q are taken, and 256 sequences are obtain, then 8 bits can be transmitted, which is based on 2^8=256; and a shift value is set to 1024, each of the 256 sequences can be shifted by 0-1023, that is, each sequence realizes the transmission of another 10 bits of signalling via 1024 shifts, which is based on 2^10=1024; thus 8+10=18 bits of signalling can be transmitted together.

These signalling is mapped to a bit field, and the transmitted signalling can be used for indicating frame format parameters of a physical frame and/or for indicating an emergency broadcast content, where the frame format parameters include: the number of frames, the frame length, the bandwidth of a subsequent signalling symbol, the bandwidth of data area, the FFT size and guard interval length of the signalling symbol, modulation and coding parameters of the signalling symbol, etc.

The cyclic shift in the above-mentioned predefined sequence generation rule can be performed before PN sequence modulation of the ZC sequence, and can also be performed after the PN sequence modulation. In addition, PN modulation can be performed on the frequency-domain main body sequence corresponding to each of the time-domain main body signals by using the same or different PN sequences.

It is known that a physical frame structure contains a preamble symbol and a data area, wherein the preamble symbol contains a physical-layer format control (PFC) part and a physical-layer content control (PCC) part.

If a time-domain main body signal of a first time-domain symbol in the preamble symbol correspondingly employs a frequency-domain main body sequence known in advance, then the frequency-domain main body sequence and the corresponding frequency offset value will not be used for signalling transmission, but signalling transmission is performed by the physical-layer format control (PFC) part in subsequent time-domain symbols.

The phase of a frequency-domain main body sequence (ZC sequence) used by the last time-domain OFDM symbol differs from that of a frequency-domain main body sequence (ZC sequence) used by the first time-domain OFDM symbol by 180 degrees, which is used for indicating the last time-domain OFDM symbol of the PFC. The ZC sequence used by the first time-domain OFDM symbol in the PFC is generally a root sequence with a predefined length and without cyclic shift, and under this length, the ZC sequence has a set; therefore, in the present invention, a certain sequence in this set, is used to indicate specific information, e.g. a version number, or to indicate the type or mode of a service transmitted in the data frame. Additionally, information is transmitted using the corresponding root value in the first time-domain main body signal and/or using an initial phase of the PN modulation sequence, wherein the initial phase of the PN modulation sequence also has some signalling capability, e.g. indicating the version number.

Herein, an example of generating a frequency-domain main body sequence using a plurality of CAZAC sequences is listed.

Each CAZAC sequence has a corresponding sub-sequence length $L_M$; for each CAZAC sequence, a sub-sequence with a sub-sequence length $L_M$ is generated according to the above-mentioned predefined sequence generation rule; and a plurality of sub-sequences are assembled into a frequency-domain main body sequence with a predefined sequence length $N_{ZC}$.

Specifically, in the generation of frequency-domain valid subcarrier, M CAZAC sequences are included; assuming that the lengths of the M CAZAC sequences are respectively $L_1, L_2, \ldots, L_M$, and satisfy $$\sum_{i=1}^{M} L_M = N_{ZC};$$

the generation method for each CAZAC sequence is the same as that mentioned above, with only one step added; the M CAZAC sequences are generated and assembled into a sequence with a length $N_{ZC}$; it is selectable to use a PN sequence to modulate the CAZAC sequence to form ZC_M; frequency domain interleaving is then performed to form a new ZC_I and then fill the above-mentioned same subcarrier with it; a left half part has a length of $$\frac{N_{ZC} + 1}{2}$$

and is mapped to a negative frequency part of subcarriers, and a right half part has a length of $$\frac{N_{ZC} - 1}{2}$$

and is mapped to a positive frequency part of subcarriers; $N_{ZC}$ can be selected as some natural number, and does not exceed the FFT length of segment A. Additionally, at the edge of the negative frequency of subcarriers, $$\frac{N_{FFT} - N_{ZC} - 1}{2}$$

zeros are added, and at the edge of the positive frequency of subcarriers, $$\frac{N_{FFT} - N_{ZC} - 1}{2}$$

zeros are added, as virtual subcarriers. Therefore, the specific sequence is composed by $$\frac{N_{FFT} - N_{ZC} - 1}{2}$$

zeros, $$\frac{N_{ZC} + 1}{2}$$

PN-modulated ZC sequences, 1 direct-current subcarrier, $$\frac{N_{ZC} - 1}{2}$$

PN-modulated ZC sequences and $$\frac{N_{FFT} - N_{ZC} - 1}{2}$$

zeros sequentially, wherein the step of PN modulation can also be performed after the frequency domain interleaving.

Other processing and filling steps can also be used to carry out subcarrier filling, which is not limited herein.

The subcarrier obtained through the processing and filling above is cyclically left-wise shifted; after the interchange between the first half and latter half of frequency spectrum, which is similar to fftshift operation in Matlab, i.e. enabling a zero subcarrier to correspond to the first position of inverse discrete Fourier transform, a pre-generated subcarrier of the frequency-domain OFDM with a predefined length of $N_{FFT}$ is obtained.

Further, in a frequency-domain subcarrier generation process in this embodiment, besides preferably adopting the above-mentioned predefined sequence generation rule, it is also possible to adopt a predefined processing rule of preferably processing the frequency-domain main body sequence to generate a frequency-domain subcarrier. In the present invention, it is not restricted to use any one or a combination of two of the predefined processing rule and the predefined sequence generation rule to generate a frequency-domain subcarrier.

The predefined processing rule contains: performing phase modulation on the pre-generated subcarrier according to a frequency offset value S, wherein the pre-generated subcarrier is obtained through the above-mentioned steps of processing and filling, and performing cyclic left-wise shift on the frequency-domain main body sequence. In the predefined processing rule, phase modulation is performed on each valid subcarrier in frequency-domain subcarriers corresponding to the same time-domain main body signal A using the same frequency offset value S, the offset values S used for the frequency-domain subcarriers corresponding to different time-domain main body signal A are different.

Particularly, for the predefined processing rule, such as assuming that the expression of the subcarrier of an original OFDM symbol is:

$$a_0(k) \ k=0,1,2, \ldots N_{FFT}-1, \qquad \text{(Formula 35)}$$

then the expression for phase modulation on each subcarrier according to some frequency offset value, such as S is as follows:

$$a_s(k) = a_0(k) \cdot e^{j\frac{2\pi sk}{N_{FFT}}} \qquad \text{(Formula 36)}$$
$$k = 0, 1, 2, \ldots N_{FFT} - 1$$

where the multiplication operation of zero subcarrier does not need to be actually conducted, operation needs only to be conducted on the valid subcarriers. The frequency offset value s can be selected as an integer in the range of $[-(N_{FFT}-1), +(N_{FFT}-1)]$; and the frequency offset value corresponding to this time-domain main body signal is determined according to a Fourier transform length $N_{FFT}$ of the time-domain main body signal, different values of which can be used for transmitting signalling.

It should be noted that the above-mentioned implementation of performing phase modulation on each pre-generated subcarrier according to a frequency offset value S can also be realized in the time domain. It is equivalent to: IFFT transform is performed on an original frequency-domain OFDM symbol with an un-modulated phase to obtain a time-domain OFDM symbol; cyclic shift can be performed on the time-domain OFDM symbol to generate a time-domain main body signal A; and signalling is transmitted through different cyclic shift values. In the present invention, description is made by performing phase modulation on each valid subcarrier according to some frequency shift value in the frequency domain; and apparently, equivalent operation methods thereto in the time domain are also included in the present invention.

In summary, in this embodiment, in the process of generating a frequency-domain subcarrier, it is possible to select, based on the frequency-domain main body sequence, any one or a free combination of at least two of the above-mentioned predefined sequence generation rule (1a) and predefined sequence generation rule (1b), and the predefined processing rule (2).

For example, signalling is transmitted by means of the preamble symbol generation method in the predefined sequence generation rule (1a).

For example, the root value q described in the previous example has 256 values, and the cyclic shift value of each root value q is taken to be 0-1023; then 8+10=18 bits of signalling can be transmitted.

For another example, signalling is transmitted by means of the preamble symbol generation method in the predefined sequence generation rule (1a) and the predefined processing rule (2).

The root value q are taken to be 2 values, the length of the time-domain OFDM symbol is 2048, 1024 shift values are taken, and an interval is taken to be 2, such as 0, 2, 4, 6, . . . , 2046, etc., so as to transmit 1+10=11 bits of signalling.

For another example, only the preamble symbol generation method in the predefined processing rule (2) is used.

The root value q is fixed, and phase modulation is performed on the frequency-domain subcarrier according to different frequency offset values S, for example, the aforementioned $N_{FFT}$ is 2048, and the s value for $$a_s(k) = a_0(k) \cdot e^{j\frac{2\pi sk}{N_{FFT}}}$$
$$k = 0, 1, 2, \ldots N_{FFT} - 1$$

is 0, 8, 16, . . . , 2032, etc.; this is equivalent to the case of performing cyclic shifts with 256 different shift values on the time-domain OFDM symbol which is obtained after performing IFFT on a phase unmodulated frequency-domain OFDM symbol, and taking 8 as an interval, such as 0, 8, 16, . . . , 2032, etc., so as to transmit 8 bits of signalling. Here, the present invention, the shift direction of the cyclic shift is not restricted; when s is a positive number, it corresponds to a cyclic left-wise shift in the time domain, e.g. when its value is 8, it corresponds to 8 units of cyclic left-wise shift in the time domain; and when s is a negative number, it correspond to a cyclic right-wise shift in the time domain, e.g. when its value is −8, it corresponds to 8 units of cyclic right-wise shift in the time domain.

Additionally, in the above-mentioned frequency-domain symbol generation method, the method for transmitting signalling using a frequency-domain modulation frequency offset value, i.e. a time-domain shift value, is not restricted; both directly transmitting signalling using the absolute shift of a current symbol and transmitting signalling using a difference between shift values of the previous and latter symbols are included; and with respect to the signalling parsing for both methods, one of them can be obviously derived from the other one. At the same time, a corresponding relationship between signalling and a shift value is no restricted either; for a transmitting end, it can be set freely, and for a receiving end, it can be inferred backwards according to a determined rule. An example of transmitting signalling using the absolute value of the shift for each symbol is as follows: for example, there are 4 symbols in all, wherein the first symbol is not for signalling transmission, and the signalling values to be transmitted by the second to the fourth symbols are respectively S1, S2 and S3. Assuming that a value which is 4 times of the signalling is taken as a corresponding shift value, then the shift value of the second symbol is 4S1, the shift value of the second symbol is 4S2, and the shift value of the third symbol is 4S3. An example of transmitting signalling using the difference between shift values of the before and after symbols is as follows: for example, there are 4 PFC symbols in all, wherein the first symbol is not for signalling transmission, and the signalling values to be transmitted by the second to the fourth symbols are respectively S1, S2 and S3. Assuming that a value which is 4 times of the signalling is taken as a corresponding shift value, then the shift value of the second symbol is 4S1, the shift value of the second symbol is 4(S1+S2), and the shift value of the third symbol is 4(S1+S2+S3).

Receiving Method

This embodiment also provides a preamble symbol receiving method. The preamble symbol receiving method is applicable to a preamble symbol generated by a transmitting end with a predefined generation rule.

In the predefined generation rule, the generated preamble symbol contains all the technological factors involved in the first three-segment structure and/or the second three-segment structure described above from the view of time domain in this embodiment, and/or contains all the technological factors involved in for example the frequency-domain structure I and the frequency-domain structure II described above from the view of frequency domain in this embodiment, which will not be described herein anymore. Therefore, in brief, the applicable predefined generation rule contains the above-mentioned preamble symbol generation method described from the view of time domain and the frequency-domain symbol generation method described from the view of frequency domain without loss of generality.

A preamble symbol generated according to the predefined generation rule respectively has the above-mentioned time-domain three-segment structure, has the above-mentioned corresponding frequency-domain structure I, and has the above-mentioned corresponding frequency-domain structure II. Description is made below with regard to the preamble symbol receiving method.

[The Preamble Symbol Satisfies the Condition of having Time-Domain Symbols with the Above-Mentioned Three-Segment Structure]

This embodiment also provides a preamble symbol receiving method, comprising the following steps:

step S11: processing a received signal;

step S12: judging whether the processed signal contains the above-mentioned preamble symbol with three-segment structure desired to be received; and step S13: in the case where a judgement result above is yes, determining the position of the preamble symbol and resolving signalling information carried by the preamble symbol, wherein the received preamble symbol comprises: a preamble symbol generated by a transmitting end through a free combination of any number of first three-segment structures and/or second three-segment structures according to a predefined generation rule, which contains at least one time-domain symbol.

The first three-segment structure as stated above contains: a time-domain main body signal, a prefix generated based on the entirety or a portion of the time-domain main body signal, and a postfix generated based on the entirety or a portion of a partial time-domain main body signal.

The second three-segment structure as stated above contains: the time-domain main body signal, the prefix generated based on the entirety or a portion of the time-domain main body signal, and a hyper prefix generated based on the entirety or a portion of a partial time-domain main body signal.

As stated in step S11, the received physical frame signal is processed to obtain a baseband signal. A signal received by the receiving end is generally an analogue signal, thus analog-to-digital conversion should be performed thereon to obtain a digital signal at first, then processing such as filtering, down-sampling or the like is performed to obtain the baseband signal. It should be noted that if the receiving end receives an intermediate frequency signal, after performing analog-to-digital conversion processing thereon, frequency spectrum shift is also required, then processing such as filtering, down-sampling or the like is performed to obtain the baseband signal As stated in step S12: whether the baseband signal contains the above-mentioned preamble symbol with a three-segment structure desired to be received is judged.

Specifically, first of all, the receiving end will judge whether the received baseband signal contains the preamble symbol desired to be received, i.e. whether the received signal meets a receiving standard; for example, if the receiving end needs to receive data of DVB_T2 standard, whether the received signal contains a preamble symbol of the DVB_T2 standard should be judged; in the same way, here, whether the received signal contains a time-domain symbol with a C–A–B and/or B–C–A three-segment structure needs to be judged.

The steps of judging whether the processed received signal contains the preamble symbol desired to be received, determining the position of the preamble symbol and solving signalling information carried by the preamble symbol, i.e. the above-mentioned steps S12 and S13, contain at least any one of the following steps: initial timing synchronization, an integral multiple of frequency offset estimation, fine timing synchronization, channel estimation, decoding analysis and fractional frequency offset estimation.

Any one or a free combination of any at least two methods can be used to conduct reliability judgement, i.e. judging if the processed signal contains the preamble symbol desired to be received: an initial timing synchronization method, an integer frequency offset estimation method, a fine timing synchronization method, a channel estimation method, a decoding result analysis method and a fractional frequency offset estimation method.

Step S12 contains S12-1 the initial timing synchronization method for preliminarily determining the position of the preamble symbol in the physical frame, and also contains S12-2 judging whether the baseband signal contains the above-mentioned preamble symbol with a three-segment structure desired to be received, based on a result of the initial timing synchronization method. With regard to the initial timing synchronization method, the initial timing synchronization can be completed by using any one or a combination of both of the initial timing synchronization method (①) and the initial timing synchronization method (②) below.

[Initial Timing Synchronization Method (①)]

Initial timing synchronization method (①) is specifically introduced below. Initial timing synchronization method (①) contains the following steps:

performing necessary inverse processing on the processed signal by utilizing a processing relationship between any two segments in a first predefined three-segment time-domain structure and/or a second predefined three-segment time-domain structure, and performing delayed moving autocorrelation to acquire basic accumulation correlation values;

when the signal comprises at least two time-domain symbols with a three-segment structure, grouping the basic accumulation correlation values obtained according to delayed moving auto-correlation according to different delay lengths, and performing another delay relationship match and/or phase adjustment during at least one symbol period between at least two time-domain symbols with specific assembling relationship in each group, and then carrying out a mathematical calculation to obtain several final accumulation correlation values with a certain delay length; and when there is only one time-domain symbol with a three-segment structure, the final accumulation correlation value is the basic accumulation correlation value; and after performing delay relationship match and/or a specific predefined mathematical calculation based on at least one of the final accumulation correlation values, using the result of the calculation for initial timing synchronization;

Particularly, performing delay relationship match and/or phase adjustment between one, or two or more symbols includes: performing delay relationship match and/or phase adjustment on one symbol, which is equivalent to that no operation is conducted, and performing delay relationship match and/or phase adjustment between two or more symbols, which comprises a practical operation.

According to processing relationships and/or modulation relationships between the third part C (corresponding to the prefix), the first part A (corresponding to the time-domain main body signal) and the second part B (corresponding to the postfix or the hyper prefix) in the three-segment structure desired to be received, necessary inverse processing and/or signal demodulation, and then delayed moving auto-correlation are performed on the baseband signal, to obtain any one or any at least two of three accumulation correlation values between the third part C and the first part A, between the first part A and the second part B, and between the third par C and the second part B in the obtained three-segment structure, i.e. $U_{ca}'(n)$ $U_{cb}'(n)$ and $U_{ab}'(n)$. A correlation value for detection is obtained based on at least one of the accumulation correlation value.

For example, assuming that the three-segment structure is C–A–B structure, based on the delay relationship between the third part C and the first part A, delayed moving auto-correlation is performed on the received signal, for which the delayed correlation expression $U_{ca}(n)$ and the delayed accumulation correlation value $U_{ca}'(n)$ are as follows:

$$U_{ca}(n) = r(n)r^*(n - N_A) \quad \text{(Formulas 37-1; and 37-2)}$$

$$U'_{ca}(n) = \frac{1}{Len_C} \sum_{k=0}^{Len_C-1} U_{ca}(n-k)$$

Energy normalization can optionally be conducted on $U_{ca}'(n)$.

That is, $$U'_{ca}(n) = \frac{U'_{ca}(n)}{0.5\frac{1}{Len_C} \sum_{k=0}^{Len_C-1} (|r(n-k)|^2 + |r(n-k-N_A)|^2)} \quad \text{(Formula 38)}$$

based on the processing relationship between the second part B and the third part C and a modulation frequency offset value, delayed moving auto-correlation and demodulation are performed on the received signal, for which the delayed correlation expression $U_{cb}(n)$ and the delayed accumulation correlation value $U_{cb}'(n)$ are as follows:

$$U_{cb}(n) = r(n)r^*(n - N_A - N_A + N1)e^{-jnf_{SH}T} \quad \text{(Formula 39-1; 39-2)}$$

$$U'_{cb}(n) = \frac{1}{corr\_len} \sum_{k=0}^{corr\_len-1} U_{cb}(n-k)$$

Also, energy normalization can be conducted on $U_{cb}'(n)$.

Based on the processing relationship between the second part B and the first part A and a modulation frequency offset value, delayed moving correlation is performed on the received signal, for which the delayed correlation expression $U_{ab}(n)$ and the delayed accumulation correlation value $U_{ab}'(n)$ are as follows:

$$U_{ab}(n) = r(n)r^*(n - N_A + N1)e^{-jnf_{SH}T} \quad \text{(Formula 40-1; 40-2)}$$

$$U'_{ab}(n) = \frac{1}{corr\_len} \sum_{k=0}^{corr\_len-1} U_{ab}(n-k)$$

Also, energy normalization can be conducted on $U_{ab}'(n)$.

corr_len can not only be taken as $1/f_{SH}T$ to avoid continuous wave interference, but also can be taken as $Len_B$ to obtain a sharp peak.

Performing required delay match and mathematical calculation by using the delayed accumulation correlation values $U_{ca}'(n)$, $U_{cb}'(n)$, and $U_{ab}'(n)$; the mathematical calculation contains multiplication or addition, using such as $U_{cb}'(n) \cdot U_{ab}'^*(n)$ or $U_{ca}'(n-N_A+N1) \cdot U_{cb}'(n) \cdot U_{ab}'^*(n)$ to obtain an calculation value, i.e. the correlation value 1 to be detected.

Figure 14:
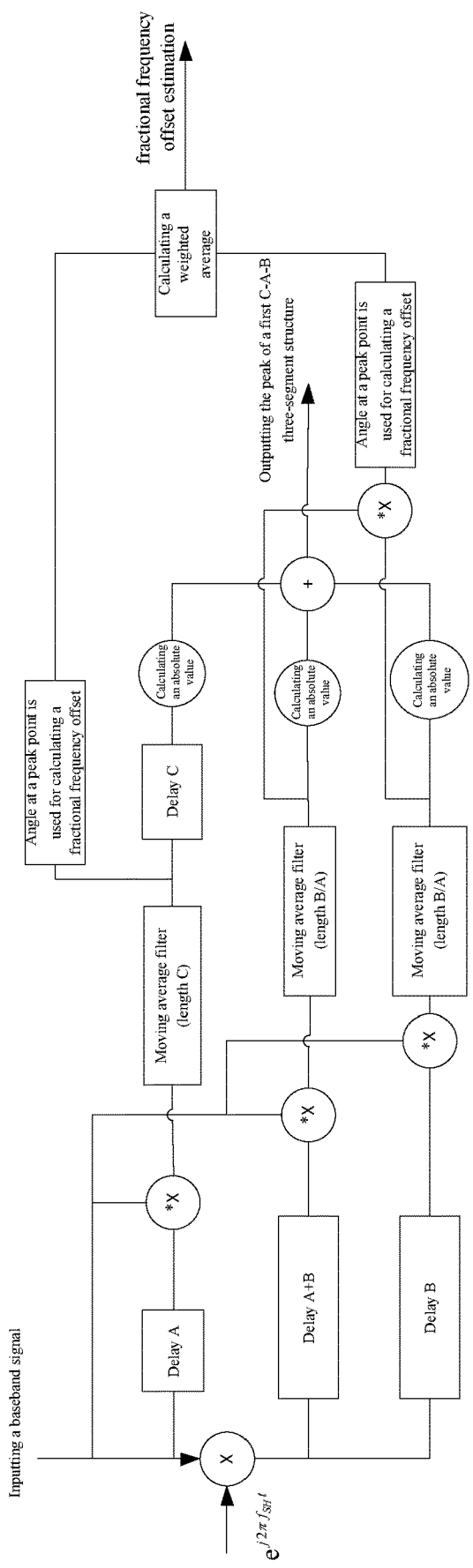
FIG. 14 is a logic diagram of a correlation result to be detected corresponding to a three-segment structure CAB in a preamble symbol receiving method in the embodiments of the present invention.

FIG. 14 is a logic diagram of obtaining correlation result to be detected corresponding to a three-segment structure CAB in the embodiments of the present invention. C, A and B in the Figure respectively indicate the length of segment C, segment A and segment B of a signal, and a moving average filter can be a power normalization filter, where A is $N_A$, B is $Len_B$, and C is $Len_C$.

For example, assuming that the three-segment structure is B–C–A structure, based on the delay relationship between the third part C and the first part A, delayed moving auto-correlation is performed on the received signal, for which the delayed correlation expression $U_{ca}(n)$ and the delayed accumulation correlation value $U_{ca}'(n)$ are as follows:

$$U_{ca}(n) = r(n)r^*(n - N_A) \quad \text{(Formula 41-1; 41-2)}$$

$$U'_{ca}(n) = \frac{1}{Len_C} \sum_{k=0}^{Len_C-1} U_{ca}(n-k)$$

Energy normalization can be conducted on $U_{ca}'(n)$.

That is, $$U'_{ca}(n) = \frac{U'_{ca}(n)}{0.5\frac{1}{Len_C} \sum_{k=0}^{Len_C-1} (|r(n-k)|^2 + |r(n-k-N_A)|^2)} \quad \text{(Formula 42)}$$

Based on the processing relationship between the second part B segment and the third part C segment and a modulation frequency offset value, delayed moving auto-correlation is performed on the received signal, and the frequency offset is demodulated; note that the delayed correlation expression $U_{cb}(n)$ and the delayed accumulation correlation value $U_{cb}'(n)$ are as follows:

$$U_{cb}(n) = r(n)r^*(n - N_A - N_A + N1)e^{-jnf_{SH}T} \quad \text{(Formula 43-1; 43-2)}$$

$$U'_{cb}(n) = \frac{1}{corr\_len} \sum_{k=0}^{corr\_len-1} U_{cb}(n-k)$$

Also, energy normalization can be conducted on $U_{cb}'(n)$.

Based on the processing relationship between the second part B segment and the first part A segment and a modulation frequency offset value, delayed moving correlation is performed on the received signal, for which the delayed correlation expression $U_{ab}(n)$ and the delayed accumulation correlation value $U_{ab}'(n)$ are as follows:

$$U_{ab}(n) = r(n)r^*(n - N_A - N_A + N1)e^{-jnf_{SH}T} \quad \text{(Formula 44-1; 44-2)}$$

$$U'_{ab}(n) = \frac{1}{corr\_len} \sum_{k=0}^{corr\_len-1} U_{ab}(n-k)$$

Also, energy normalization can be conducted on $U_{ab}'(n)$.

corr_len can be valued $1/f_{SH}T$ to avoid continuous wave interference, or can be valued $Len_B$ to enable the peak to be sharp.

Performing required delay match and mathematical calculation by using the delayed accumulation correlation values $U_{ca}'(n)$, $U_{cb}'(n)$, and $U_{ab}'(n)$; the mathematical calculation contains addition or multiplication, using such as $U_{cb}'^*(n-N_A) \cdot U_{ab}'(n)$ or $U_{ca}'(n) \cdot U_{cb}'^*(n-N_A) \cdot U_{ab}'(n)$ to obtain an calculation value, i.e. the correlation value 1 to be detected.

Figure 15:
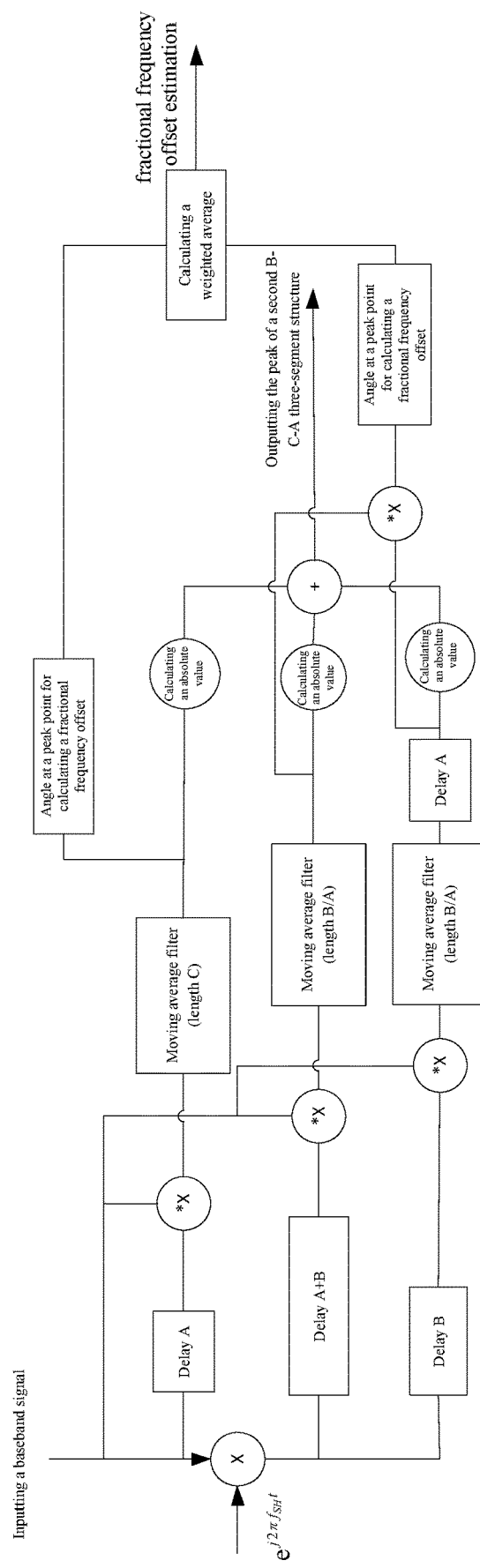
FIG. 15 is a logic diagram of a correlation result to be detected corresponding to a three-segment structure BCA in a preamble symbol receiving method in the embodiments of the present invention.

FIG. 15 is a logic diagram of obtaining correlation result to be detected corresponding to a three-segment structure BCA in the embodiments of the present invention.

Only one set of receiving resources are needed for the same portion in FIG. 14 and FIG. 15, they are shown in a separated mode for the sake of clarity. C, A and B in the Figure respectively indicate the length of segment C, segment A and segment B of a signal, and a moving average filter can be a power normalization filter, where A is $N_A$, B is $Len_B$, and C is $Len_C$.

A correlation value for preliminary timing synchronization are formed based on the correlation result 1 to be detected and/or the correlation result 2 to be detected.

Further, when both the following two situations (a) and (b) are contained in preamble symbol transmission, (a) the time-domain main body signal contains known information;

(b) and it is detected that the time-domain symbol has the C–A–B three-segment structure, the initial timing synchronization can be completed by means of any one or a combination of both of the above-mentioned initial timing synchronization method (①) and the initial timing synchronization method (②) below. When the two synchronization methods are completed, a first preliminary synchronization calculation value obtained via the initial timing synchronization method (①) and a second preliminary synchronization calculation value obtained via the initial timing synchronization method (②) are weighted, and initial timing synchronization is completed based on the weighted arithmetic value.

[Initial Timing Synchronization Method (②)]

Initial timing synchronization method (②) is specifically introduced in the following.

When any C–A–B and/or B–C–A main body signal A contains known information, such as a fixed subcarrier, or such as when a preamble symbol contains several time-domain symbols with a C–A–B and/or a B–C–A three-segment structure, and a main body signal A of some of the time-domain symbols is a known signal, that is, when any time-domain main body signal in the preamble symbol contains a known signal, the initial timing synchronization method (②) comprises: performing differential operation on the time-domain main body signal A in accordance with predefined N differential values, and performing differential operation on a time-domain signal corresponding to known information as well, then correlating the two to obtain N sets of differential correlated results corresponding to the N differential values on a one-to-one basis, and performing initial synchronization based on the N sets of differential correlated results to obtain processed values which are used for preliminarily determining the position of the preamble symbol, where N≥1.

The particular process of differential correlation in the initial timing synchronization method (②) is described below; and a single set of differential correlation process is introduced at first.

A differential value is determined; differential operation is conducted on received baseband data according to the differential value; differential operation is also performed on a local time-domain sequence corresponding to known information according to the differential value; and then results of the two differential operation are correlated, to obtain a differential correlation result corresponding to the differential value. The calculation process for the single set of differential correlation result is the same with the prior art. Assuming that the differential value is D, and the received baseband data $r_n$; and the description for each particular formula is as follows:

First of all, differential operation is conducted on the received baseband data according to the differential value.

$$z_m^{(D)} = r_m r^*_{m-D} \quad \text{(Formula 45)}$$

After the differential operation, phase rotation brought about by carrier frequency offset has become a fixed carrier phase $e^{j2\pi D \Delta f}$, where $\Delta f$ indicates the carrier frequency offset.

At the same time, differential operation is also performed on a time-domain sequence (such as, obtaining the corresponding time-domain sequence by filling fixed subcarriers according to corresponding positions, and adding zero at the rest of the positions and performing IFFT calculation).

$$c_n^{(D)} = s_n s^*_{n-D} \quad n = D, \ldots, L-1 \quad \text{(Formula 46)}$$

The received data after the differential operation and the local differential sequence are correlated, to obtain $$R_{dc,m}^{(D)} = \sum_{n=D}^{L-D} z_{n+m}^{(D)} [c_n^{(D)}]^* \quad \text{(Formula 47)}$$

In the case where a system has neither multipath nor noise, $$R_{dc,m}^{(D)} = \sum_{n=D}^{L-D} z_{n+m}^{(D)} [c_n^{(D)}]^* = e^{j2\pi D \Delta f} \sum_{n=D}^{L-D} c_{n+m}^{(D)} [c_n^{(D)}]^* \quad \text{(Formula 48)}$$

$R_{dc,m}^{(D)}$ can well provide a correlation peak, and the peak is not affected by the carrier offset. A frame synchronization/timing synchronization position is obtained using the following formula $$\hat{n}_0 = \arg\max_m \{|R_{dc,m}^{(D)}|\} \quad \text{(Formula 49)}$$

It can be seen from the above-mentioned process of single set of differential correlation operation that a differential correlation algorithm can resist the influence from any large carrier frequency offset; however, since differential operation is performed on a received sequence at first, signal noise is enhanced, and with a low signal-to-noise ratio, the noise enhancement is very serious, leading to significant deterioration of the signal-to-noise ratio.

In order to avoid the aforementioned problem, not only a single set of differential value is used for correlation calculation, a plurality of sets of differential correlation operations can be implemented, for example, taking the value of N to be 64 to implement 64 sets of differential correlation, thus obtaining $R_{dc(0),m}^{(D(0))}$, $R_{dc(1),m}^{(D(1))}$, ..., $R_{dc(N-1),m}^{(D(N-1))}$. $D(0), D(1), \ldots, D(N-1)$ are the N different differential values selected.

Specific mathematical calculation is performed on N results, to obtain a final correlation result.

In this embodiment, with respect to a plurality of sets of differential correlation operations (64 sets), a differential value can be selected by either of the two predefined differential selection rule based on the performance requirement of a transmission system:

(1) a first predefined differential selection rule: the differential value D(i) is arbitrarily selected to be N different values and satisfies D(i)<L, where L is the length of a local time-domain sequence corresponding to the known information.

(2) a second predefined differential selection rule: the differential value D(i) is N different values in arithmetic progression and satisfies D(i)<L, i.e D(i+1)−D(i)=K, and K is a constant integer satisfying $$K < \frac{L}{N},$$

where L is the length of a local time-domain sequence corresponding to the known information.

Predefined processing calculation are performed on the N (64) results to obtain a final correlation result, there are two preferred embodiments for the predefined processing calculation here, and elaboration will be provided respectively.

First predefined processing calculation:

the differential value D(i) can be arbitrarily selected to be N different values and satisfies D(i)<L. Due to the arbitrarily selected differential value D(i), the phase $e^{j2\pi D(i)\Delta f}$ i= 0, . . . , N−1 after each set of differential correlation is different from one another, and can not be directly added as vectors, weighted addition or average can be only conducted on absolute values. Predefined processing calculation are performed on N different differential correlation results through the following formula, to obtain a final differential result. The formula below is an example of obtaining a final differential result by absolute value addition.

$$R_{dc,m} = \sum_{i=0}^{N-1} \text{abs}(R_{dc(i),m}^{(D(i))}) \quad \text{(Formula 50)}$$

$$i = 0, \ldots N-1$$

Second predefined processing calculation:

the differential value D(i) can be arbitrarily selected to be N different values and satisfies D(i)<L, and satisfies that D(i) is a arithmetic progression, i.e. D(i+1)−D(i)=K; and K is a constant integer satisfying $$K < \frac{L}{N}.$$

differential values are selected according to such rules; after obtaining a differential correlation value such as $R_{dc(0),m}^{(D(0))}$, $R_{dc(1),m}^{(D(1))}$, . . . , $R_{dc(N-1),m}^{(D(N-1))}$), conjugate multiplication are conducted on adjacent two sets of differential correlation values, to obtain N−1 values after the conjugate multiplication through the following formula.

$$RM_{i,m} = R_{dc(i),m}^{(D(i))} \cdot (R_{dc(i+1),m}^{(D(i+1))})^* \; i=0,1,2,\ldots, N-2 \quad \text{(Formula 51)}$$

Originally different phases $e^{j2\pi D(i)\Delta f}$ for each set are changed into the same phase $e^{j2\pi K\Delta f}$ by means of the conjugate multiplication; therefore, weighted vector addition or average can be conducted on the obtained N−1 sets of $RM_{i,m}$ to obtain the final differential result, thus obtaining better performance than the first predefined processing calculation. The formula below is an example of obtaining a final differential result by vector addition.

$$R_{dc,m} = \sum_{i=0}^{N-2} RM_{i,m} \quad \text{(Formula 52)}$$

$$i = 0, \ldots N-1$$

It should be noted that, when the differential value D(i) is obtained using the above-mentioned second predefined differential selection rule, a final correlation result can not only be obtained by conducting weighted vector addition or average on values after conjugate multiplication according to the second predefined processing calculation, the final correlation result but also can be obtained by directly conducting weighted absolute value addition or average on at least two differential correlation result according to the above-mentioned first predefined processing calculation.

A correlation value for initial timing synchronization is obtained using $R_{dc,m}$.

Regardless of whether the initial timing synchronization method (①) or the initial timing synchronization method (②), assuming that a received signal contains a desired preamble symbol, the position of the maximum value of the correlation value for initial timing synchronization located in a certain range can be used to preliminarily determine the position of the preamble symbol in the physical frame. A value corresponding to this value is used to further judge whether the received signal contains the desired preamble symbol, or the position is used to conduct subsequent operations, such as an integral frequency offset estimation and/or decoding, so as to further judge whether the received signal contains the desired preamble symbol.

Based on a result of the above-mentioned initial timing synchronization, whether the processed signal, i.e. the baseband signal, contains the above-mentioned preamble symbol with a three-segment structure desired to be received is judged. It particularly comprises: making detection based on a result of initial timing synchronization, if the detected result satisfies a pre-set condition, then it is determined that the baseband signal contains the preamble symbol containing the three-segment structure and desired to be received. Further, satisfaction of the pre-set condition here can not only refer to the fact that a result of initial timing synchronization satisfies a pre-set condition, but also can refer to the fact that when whether the condition is satisfied cannot be determined enough according to the result of initial timing synchronization itself, whether the condition is satisfied is further determined according to subsequent other steps, such as an integer frequency offset estimation and/or decoding result.

Assuming that the judgement is made directly according to the result of initial timing synchronization, the judgement can be made based on whether a pre-set condition is satisfied; the pre-set condition contains making a judgement by performing specific calculation on the result of initial timing synchronization, and then judging whether the maximum value of an calculation result exceeds a threshold.

Specifically, in the particular implementation of the above-mentioned initial timing synchronization method (①), two sets of delayed accumulation correlation values corresponding to two three-segment structures can be obtained according to a predefined acquisition rule and/or a predefined processing rule between part C, part A and part B of the first three-segment structure and the second three-segment structure, and each set include 3 values; two sets of correlation results to be detected are generated using at least one of the three delayed accumulation correlation values in each of the 2 sets; thus the resultsare detected, and whether the preamble symbol contains a three-segment structure, and which three-segment structure is contained are judged.

For example, if the first set of correlation results to be detected satisfy the pre-set condition, then it is determined that the baseband signal contains a preamble symbol with the first three-segment structure; if the second set of correlation results to be detected satisfy the pre-condition, then it is determined that the baseband signal contains a preamble symbol with the second three-segment structure; and the two sets both satisfy the pre-set condition, then it indicates that the preamble symbol contains the two three-segment structures at the same time.

When the transmitting end chooses the second part at different start points in the time-domain main body signal to transmit signalling, the initial timing synchronization is used for parsing emergency broadcast through any one or a free combination of any two of follows: differently transmitting emergency broadcast and common broadcast by utilizing different delay relationships between the same content in the third part and the second part, and different delay relationships between the same content in the first part and second part, so as to transmit emergency broadcast and common broadcast differentially.

By way of example, the receiving end will implement step S12-1 contained in step S12 in a plurality of branches: the initial timing synchronization method for preliminarily determining the position of the preamble symbol in the physical frame, and then based on a plurality of correlation results to be detected, judging whether a preamble symbol desired to be received exists, and parsing transmitted time-domain signalling.

For example, when B is obtained by truncating the preamble symbol from different start point positions N1 in A, and the start point positions can be used for transmitting Q bit(s) of signalling, the delayed moving correlation for some value N1 above is defined as a branch. Each branch contains the above-mentioned 3 delayed accumulation correlation values. The receiving end implements the above-mentioned delayed moving auto-correlation branch with $2^Q$ different N1 values, and then judges whether the desired preamble symbol exists according to the absolute value of $2^Q U_2'(n) \cdot U_3'^*(n)$ or $U_{ca}'(n-N_A+N1) \cdot U_{cb}'(n) \cdot U_{ab}'^*(n)$.

If neither of the absolute values exceeds a threshold, then it indicates that the baseband signal does not contain a signal desired to be received. Such as, N1 is valued 504 or 520 to transmit 1 bit of emergency alarm or broadcast system identifier, wherein N1=520 indicates a normal preamble symbol, and N1=504 indicates an emergency alarm or broadcast system; then step S21-1 is carried out in 2 branches. For example, for a branch in which an emergency alarm broadcast flag is 0, i.e. N1=520, the following are adopted:

performing moving auto-correlation on the received signal which is delayed by 1024 sampling points with the received signal;

performing moving auto-correlation on the received signal which is delayed by 1528 sampling points with the received signal of which a frequency offset is demodulated;

performing moving auto-correlation on the received signal which is delayed by 504 sampling points with the received signal of which a frequency offset is demodulated; and For example, for a branch in which an emergency alarm broadcast flag is 0, i.e. N1=520, the following are adopted:

performing moving auto-correlation on the received signal which is delayed by 1024 sampling points with the received signal of which a frequency offset is demodulated;

performing moving auto-correlation on the received signal which is delayed by 1544 sampling points with the received signal of which a frequency offset is demodulated;

performing moving auto-correlation on the received signal which is delayed by 520 sampling points with the received signal of which a frequency offset is demodulated.

When a threshold is taken as a pre-set condition to judge whether the received signal contains the preamble symbol desired to be received, if the maximum value of the correlation value to be detected of a branch for with N1=520 exceeds the threshold, it indicates that the baseband signal is a desired signal, and a preamble symbol appears EAS_flag=0; on the contrary, if the maximum value of the correlation value to be detected while N1=504 exceeds the threshold, it indicates that EAS_flag=1; and if neither of the two sets exceeds the threshold, it indicates that the baseband signal is not a desired signal.

When the preamble symbol utilizes only one of the first three-segment structure and the second three-segment structure to identify non-emergency broadcast, the other one is used to identify emergency broadcast; and parsing is conducted through the following.

The above-mentioned step S12-1 for two branches corresponding to the two three-segment structures can be obtained in step S12-1 according to the predefined acquisition rule and/or the predefined processing rule between part C, part A and part B of the first three-segment structure and the second three-segment structure, and each branch includes 3 values; and step S12-2 contains detecting a correlation value to be detected of each of the two branches. If a detection result for a first branch satisfies a pre-set condition, then it is determined that the baseband signal contains the first three-segment structure desired to be received, and it indicates that EAS_flag=0; if a detection result for a second branch satisfies a pre-set condition, then it is determined that the baseband signal contains the second three-segment structure desired to be received, and it indicates that EAS_flag=1; and if it is the case where the two branches both satisfy the condition, another judgement should be made, for example, emergency broadcast can be judged according to the obviousness of two peak-to-noise ratios.

Further, after the initial timing synchronization is preliminarily completed, initial timing synchronization results from method (①) and/or method (②) can also be used for fractional frequency offset estimation.

When a preliminary timing synchronization method (①) is used, a second fractional frequency offset value can be calculated by taking the angle of the maximum value in $U_{ca}'$; after conducting conjugate multiplication on $U_{cb}'(n)$ and $U_{ab}'(n)$ (corresponding to a C–A–B structure) or conducting conjugate multiplication on $U_{ab}'(n)$ and $U_{cb}'(n-N_A)$ (corresponding to a B–C–A structure), a third fractional frequency offset value can be calculated by taking an angle corresponding to the maximum value. As shown in the schematic portion in FIG. 14 and FIG. 15 above, an angle in a logical calculation block is used for obtaining the fractional frequency offset, and fractional frequency offset estimation can be conducted using any one or two of the second fractional frequency offset and the third fractional frequency offset.

For an algorithm for fractional frequency offset estimation, by way of example, when a preliminary timing synchronization method (②) is used, $$R_{dc,m} = \sum_{i=0}^{N-2} RM_{i,m}$$

$$i = 0, \ldots N - 1,$$

the maximum value thereof is taken, and a corresponding phase is $e^{j2\pi K\Delta f}$; $\Delta f$ can be calculated and converted to the first fractional frequency offset value.

When the transmitted preamble symbol contains features required in implementing the preliminary timing synchronization method (①) and the preliminary timing synchronization method (②), a fractional frequency offset estimation value is obtained using any one or a combination of any two of the first, the second and the third fractional frequency offset value.

If it is known that the preamble symbol of a transmitting end contains time-domain symbols with two three-segment structures, i.e. C–A–B and B–C–A, at least one time-domain symbol is assembled according to some assembling mode to obtain the preamble symbol; and when judging whether the baseband signal contains a united symbol desired to be received, the preliminary timing synchronization method (①) comprises the following steps:

step S2-1A: according to the predefined acquisition rule and/or predefined processing rule between segment C, segment A and segment B in the C–A–B structure and B–C–A structure in the preamble symbol desired to be received, corresponding inverse processing is performed on the baseband signal, and delayed moving auto-correlation is performed on the demodulated signal, so as to obtain basic delayed accumulation correlation values (such as $U_{1,ca}'(n)$, $U_{1,cb}'(n)$, $U_{1,ab}'(n)$, $U_{2,ca}'(n)$, $U_{2,cb}'(n)$, and $U_{2,ab}'(n)$ in a C–A–B–B–C–A structure). The six values can be obtained actually by 3 delayed moving auto-correlators with different delay length, where $U_{1,ca}'(n)=U_{2,ca}'(n)=U_{A,\,raw}(n)$; $U_{1,cb}'(n)=U_{2,ab}'(n)=U_{A+B,\,raw}(n)$; and $U_{1,ab}'(n)=U_{2,cb}'(n)=U_{B,\,raw}(n)$; therefore, the six values can also be considered as three values actually, and are defined as 6 values for the convenience of description.

Step S2-1B: basic delayed accumulation correlation values in step S2-1A are grouped (into three group) according to different delay lengths of the delayed moving auto-correlation in the previous step; delay relationship match and/or phase adjustment are performed on each group according to an specific assembling relationship between two time-domain symbols, and then mathematical calculation is performed, to obtain a final accumulation correlation value corresponding to some delay length in the previous step; and three final accumulation correlation values with different delay lengths are obtained in all.

Step S2-1C: delay match and mathematical calculation are performed on one, two or three of the three final accumulation correlation values, to obtain a correlation value to be detected, i.e. a correlation value for initial timing synchronization.

Taking an assembling method of C–A–B–B–C–A as an example in particular, assuming that the assembling method of C–A–B–B–C–A is used in the preamble symbol transmitted by the transmission end, then after obtaining $U_{1,ca}'(n)$, $U_{1,cb}'(n)$, $U_{1,ab}'(n)$, $U_{2,ca}'(n)$, $U_{2,cb}'(n)$ and $U_{2,ab}'(n)$ in the way mentioned above, $U_{1,ca}'(n-(N_A+2Len_B+Len_C))$ and $U_{2,ca}'(n)$ are added; since they are both obtained via the moving auto-correlator with a delay length of $N_A$, a final accumulation correlation value $U_A(n)$ with a delay length of $N_A$ is obtained.

$U_{1,cb}'(n-(N_A+2Len_B))$ is added to $U_{2,ab}'(n)$, since they are both obtained via the moving auto-correlator with a delay length of $N_A+Len_B$, a final accumulation correlation value $U_{A+B}(n)$ with a delay length of $N_A+Len_B$ is obtained.

$U_{1,ab}'(n-(2Len_B))$ is added to $U_{2,cb}'(n)$, since they are both obtained through the moving auto-correlator with a delay length of $Len_B$, a final accumulation correlation value $U_B(n)$ with a delay length of $Len_B$ is obtained.

Finally, the correlation result to be detected, i.e. the correlation value for initial timing synchronization, is obtained according to the calculation $abs(U_B(n))+abs(U_{A+B}(n))+abs(U_A(n-Len_C))$.

Figure 16:
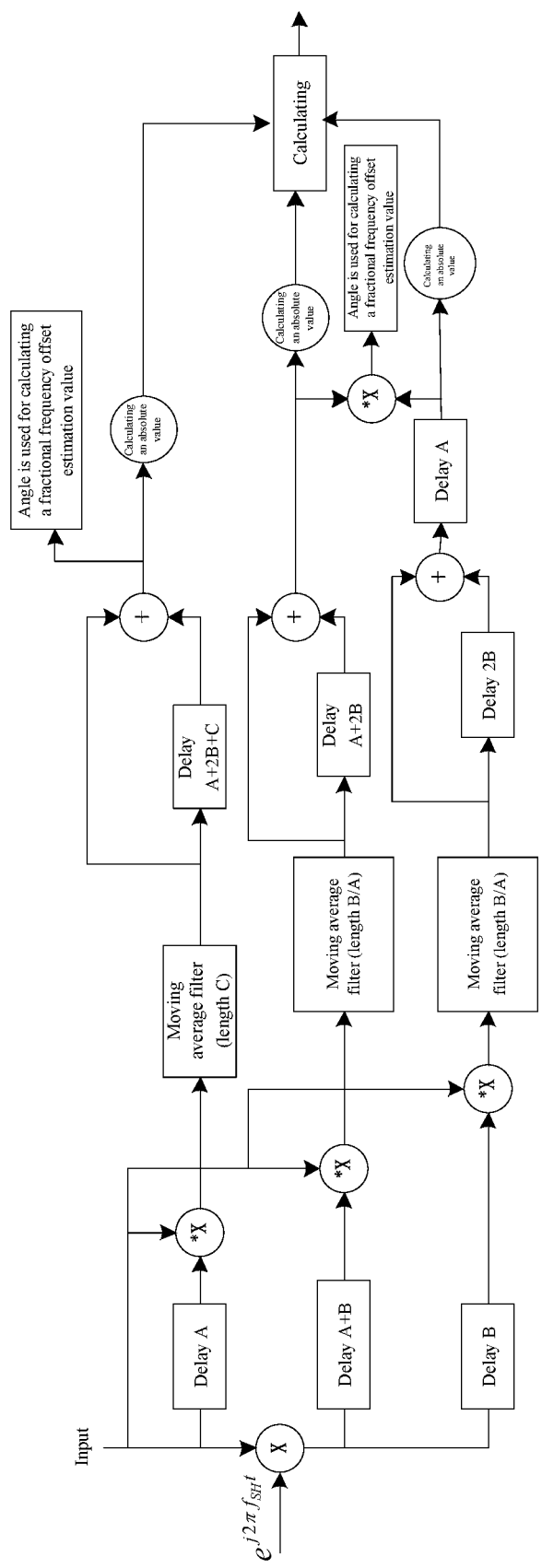
FIG. 16 a block diagram of the logic calculation for acquiring an initial timing synchronization result to be detected using C–A–B–B–C–A splicing mode in the embodiments of the present inventions.
Figure 17:
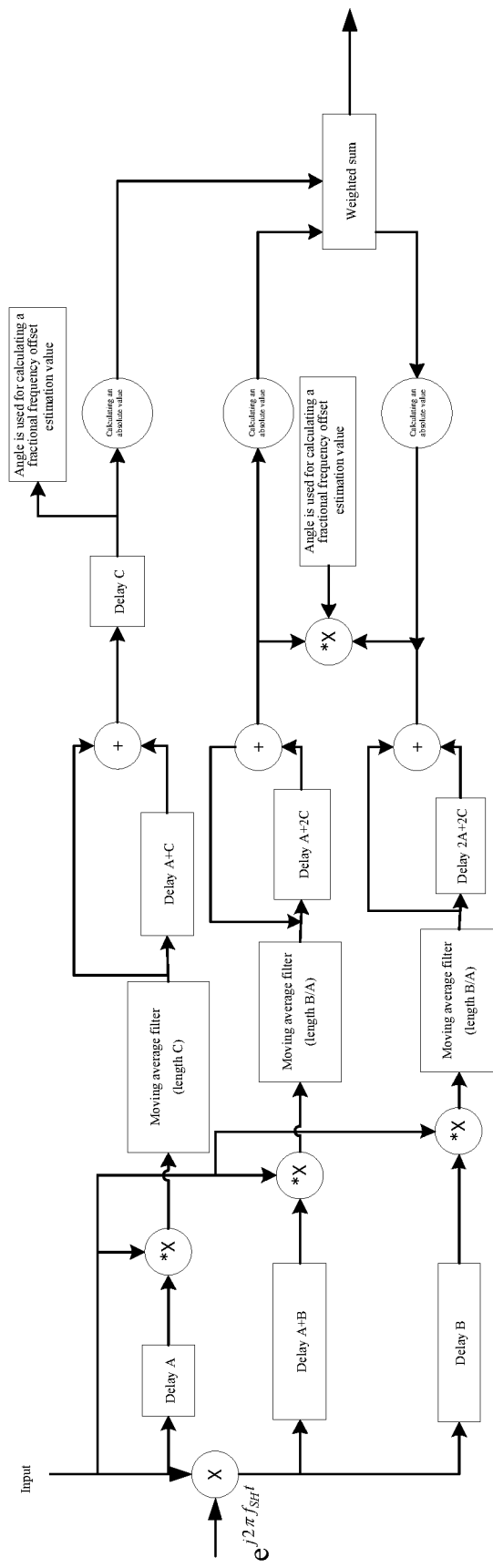
FIG. 17 a block diagram of the logic calculation for acquiring an initial timing synchronization result to be detected using B–C–A–C–A–B splicing mode in the embodiments of the present inventions.

A block diagram for logical calculations for the result of preliminary timing synchronization to be detected acquired under the assembling method of C–A–B–B–C–A in this embodiment is provided in FIG. 16, where A is $N_A$, B is $Len_B$, and C is $Len_C$. In the same way, a block diagram for logical calculations for the result of preliminary timing synchronization to be detected acquired under the assembling method of B–C–A–C–A–B in this embodiment is provided in FIG. 17, where A is $N_A$, B is $Len_B$, and C is $Len_C$. After the correlation value for initial timing synchronization is obtained, step S12-2 and step S12-3 above are performed.

Additionally, in step S2-1A, when FC sequences of 2 time-domain symbols of the united preamble symbol are the same, a delayed accumulation correlation value can be obtained for a combined and assembled part for segment C+A of two symbols, i.e. the former one and the later one; it can also be used for calculating the correlation result to be detected in step S2-1C, to further improve detection performance.

Further, if a transmitting end identifies emergency broadcast by utilizing different assembling mode about the first three-segment structure and the second three-segment structure, the initial timing synchronization method (①) comprises the following steps:

In step S2-1B, the delayed accumulation correlation values of step S2-1A (actually there should be outputs of three delayed moving auto-correlators, but for representation, six delayed moving auto-correlators are defined) are defined as $U_{A+B}^1(n)$, $U_A^1(n)$ and $U_B^1(n)$, and $U_{A+B}^2(n)$, $U_A^2(n)$ and $U_B^2(n)$ (a first time-domain symbol and a second time-domain symbol respectively), and the delays are respectively $N_A+Len_B$, $N_A$, and $Len_B$. Delay relationship match is performed on these accumulation correlation values with the same delay and/or phase adjustment is performed according to a specific, splicing relationship and then these accumulation correlation values are added and averaged to obtain the final accumulation correlation value; since two different splicing modes may exist, delay relationship match between two different symbols are listed herein respectively. Specifically, $U_{A+B}^1(n)$, $U_A^1(n)$ and $U_B^1(n)$, and $U_{A+B}^2(n)$, $U_A^2(n)$ and $U_B^2(n)$.

Assuming an assembling method of C–A–B–B–C–A for example, $U_A^1(n-(N_A+Len_C))$ is added to $U_A^2(n)$, since they are both obtained through the moving auto-correlator with a delay length of $N^A$, a final accumulation correlation value $U_A(n)$ with a delay length of NA is obtained.

$U_{A+B}^1(n-(N_A+2Len_B))$ is added to $U_{A-B}^2(n)$, since they are both obtained through the moving auto-correlator with a delay length of $N_A+Len_B$, a final accumulation correlation value $U_{A+B}(n)$ with a delay length of $N_A+Len_B$ is obtained.

$U_B^1(n-(2N_A+2Len_C))$ is added to $U_B^2(n)$, since they are both obtained through the moving auto-correlator with a delay length of $Len_B$, a final accumulation correlation value $U_B(n)$ with a delay length of $Len_B$ is obtained.

Finally, a correlation result to be detected for the first branch is obtained according to the calculation $abs(U_B(n-N_A))+abs(U_{A+B}(n))+abs(U_A(n))$.

Assuming an assembling method of B–C–A–C–A–B for example, $U_A^1(n-(N_A+2Len_B+Len_C))$ is added to $U_A^2(n)$, since they are both obtained through the moving auto-correlator with a delay length of $N_A$, a final accumulation correlation value $U_A(n)$ with a delay length of NA is obtained.

$U_{A+B}^1(n-(N_A+2Len_C))$ is added to $U_{A-B}^2(n)$, since they are both obtained through the moving auto-correlator with a delay length of $N_A+Len_B$, a final accumulation correlation value $U_{A+B}(n)$ with a delay length of $N_A+Len_B$ is obtained.

$U_B^1(n-(2Len_B))$ is added to $U_B^2(n)$, since they are both obtained through the moving auto-correlator with a delay length of $Len_B$, a final accumulation correlation value $U_B(n)$ with a delay length of $Len_B$ is obtained.

Finally, a correlation result to be detected for the second branch is obtained according to the calculation $abs(U_B(n))+abs(U_{A+B}(n))+abs(U_A(n-Len_C))$.

Correlation results to be detected of the 2 branches are finally obtained according to different delay relationships between symbols corresponding to the two assembling methods (the C–A–B–B–C–A assembling method and the B–C–A–C–A–B assembling method), wherein if a detection result for the first branch satisfy a pre-set condition, then it is determined that the baseband signal contains a united preamble symbol with three-segment structures assembled according to the first assembling method; if a detection result for the second branch satisfy a pre-set condition, then it is determined that the baseband signal contains a united preamble symbol with three-segment structures assembled according to the second assembling method; and if it is the case where the two groups both satisfy the condition, another judgement should be made, for example, judgement can be made according to the obviousness of the peak-to-noise ratio of the two branches.

Additionally, in step S2-1A, when FC sequences of 2 time-domain symbols of the united preamble symbol are the same, a delayed accumulation correlation value can be obtained for a combined and assembled part for segment C+A of two time-domain symbols, i.e. the former one and the later one; in the same way, since two different assembling methods may exist, a delayed accumulation correlation value can also be obtained for a combined and assembled part for segment C+A of two time-domain symbols, i.e. the former one and the later one, in the 2 branches respectively obtained; and In S2-1C, the value for the 2 branches can also be respectively used for the mathematical calculation for the 2 branches, to obtain a correlation result to be detected for the 2 branches, so as to further improve detection performance.

Since the assembled united preamble symbol must adopt any one three-segment structure, the pre-set condition can be satisfied, regardless of whether a receiving machine makes detection in accordance to a united preamble symbol or in accordance to a single three-segment structure. When a detection result of detecting in accordance to a united preamble symbol is obviously better than a detection result of detecting in accordance to some single preamble symbol, it can be determined that the received preamble symbols include time-domain symbols with a three-segment structures.

Further, satisfaction of the pre-set condition here can not only refer to determining whether the pre-set condition is satisfied according to a correlation result to be detected, but also can refer to the fact that when whether the condition is satisfied cannot be determined enough according to the correlation result to be detected itself, whether the condition is satisfied is determined according to subsequent other steps, such as an integer frequency offset estimation and/or decoding result.

Further, after the initial timing synchronization is preliminarily completed, initial timing synchronization results from the preliminary timing synchronization method (①) and/or the preliminary timing synchronization method (②) can be used for fractional frequency offset estimation.

What is different from the above description of the fractional frequency offset estimation is that when the preliminary timing synchronization method (①) is used, a second fractional frequency offset value can be calculated by taking the angle of the maximum value in $U_A(n)$; after conducting conjugate multiplication on $U_{A+B}(n)$ and $U_B(n-N_A)$ (corresponding to a C–A–B–B–C–A assembling mode) or conducting conjugate multiplication on $U_{A+B}(n)$ and $U_B(n)$ (corresponding to a B–C–A–C–A–B assembling mode), a third fractional frequency offset value can be calculated by taking the phase corresponding to the maximum angle. As shown in the schematic portion of block diagrams FIG. 16 and FIG. 17 of logical calculations above, an angle is used for obtaining the fractional frequency offset, and fractional frequency offset estimation can be conducted using any one or two of the second fractional frequency offset and the third fractional frequency offset.

The rest of the description is the same as the description of fractional frequency offset estimation above.

With regard to the preliminary timing synchronization method (①), taking a preferred united symbol with 4 time-domain symbols with a three-segment structure as an example, when the arrangement is C–A–B, B–C–A, C–A–B, B–C–A, $U_{ca}^1(n)$, $U_{ab}^1(n)$, $U_{ab}^1(n)$, $U_{ca}^2(n)$, $U_{cb}^2(n)$, $U_{ab}^2(n)$, $U_{ca}^3(n)$, $U_{cb}^3(n)$, $U_{ab}^3(n)$, $U_{ca}^4(n)$, $U_{cb}^4(n)$, and $U_{ab}^4(n)$ are obtained. In fact, the 12 values are outputs of 3 delayed moving auto-correlators, and can also be considered as 3 values, and is defined as 12 values for the convenience of expression, where $U_{ca}^1(n)=U_{ca}^2(n)=U_{ca}^3(n)=U_{ca}^4(n)=U_{A,raw}(n)$.

$$U_{cb}^1(n)=U_{ab}^2(n)=U_{cb}^3(n)=U_{ab}^4(n)=U_{A+B,raw}(n).$$

$$U_{ab}^1(n)=U_{cb}^2(n)=U_{ab}^3(n)=U_{cb}^4(n)=U_{B,raw}(n).$$

Delay relationship match and/or phase adjustment between symbols can be performed on one or more of $U_{ca}^1(n)$, $U_{ca}^2(n)$, $U_{ca}^3(n)$, and $U_{ca}^4(n)$, then addition or average is conducted on same, to obtain the final $U_A(n)$. This is because they have the same phase value. An example of delay match is as follows:

$$U_{ca}^1(n-2(N_A+Len_B+Len_C)-(N_A+2Len_B+Len_C)),$$

$$U_{ca}^2(n-2(N_A+Len_B+Len_C)),$$

$$U_{ca}^3(n-(N_A+2Len_B+Len_C)), \text{ and}$$

$$U_{ca}^4(n)$$

Delay relationship match and/or phase adjustment between symbols can be performed on one or more of $U_{cb}^1(n)$, $U_{ab}^2(n)$, $U_{cb}^3(n)$, and $U_{ab}^4(n)$, and then addition or average is conducted on same, to obtain the final $U_{A+B}(n)$. This is because they have the same phase value. An example of delay match is as follows:

$$U_{cb}^1(n-2(N_A+Len_B+Len_C)-(N_A+2Len_B)),$$

$$U_{ab}^2(n-2(N_A+Len_B+Len_C)),$$

$$U_{cb}^3(n-(N_A+2Len_B)), \text{ and}$$

$$U_{ab}^4(n).$$

Delay relationship match and/or phase adjustment between symbols can be performed on one or more of $U_{ab}^1(n)$, $U_{cb}^2(n)$, $U_{ab}^3(n)$, and $U_{cb}^4(n)$, and then addition or average is conducted on same, to obtain the final $U_B(n)$. An example of delay match is as follows: $U_{ab}{}^1(n-2(N_A+\text{Len}_B+\text{Len}_C)-(2\text{Len}_B))$ $$U_{cb}{}^2(n-2(N_A+\text{Len}_B+\text{Len}_C)),$$

$$U_{ab}{}^3(n-(2\text{Len}_B)), \text{ and}$$

$$U_{cb}{}^4(n)$$

Finally, delay match and a specific calculation are performed again based on one or more of $U_A(n)$ and $U_{A+B}(n)$ and $U_B(n)$, and an example of delay match herein is as follows:

$$U_A(n), U_{A+B}(n), \text{ and } U_B(n-N_A)$$

initial timing synchronization is accomplished by utilizing an calculation result, and the specific calculation may be absolute value addition. For example, the initial timing synchronization is accomplished by taking the position of the maximum value.

It should be noted that, considering the influence of sampling offset in system, in the above-mentioned embodiment, a delay number that there should be can be adjusted in a certain range, for example, incrementing or decrementing the delay number in some delayed correlator by one, to obtain three delay numbers, i.e. the delay number per se, the delay number incremented by one, and the delay number decremented by one; then a plurality of delayed moving auto-correlation are then performed according to the obtained adjusted delay numbers and the delay number that there should be, for example, implementing delayed moving auto-correlation according to the three delay numbers, then selecting the one with the most obvious correlation result; at the same time, a timing offset can be estimated using the correlation result.

Figure 18:
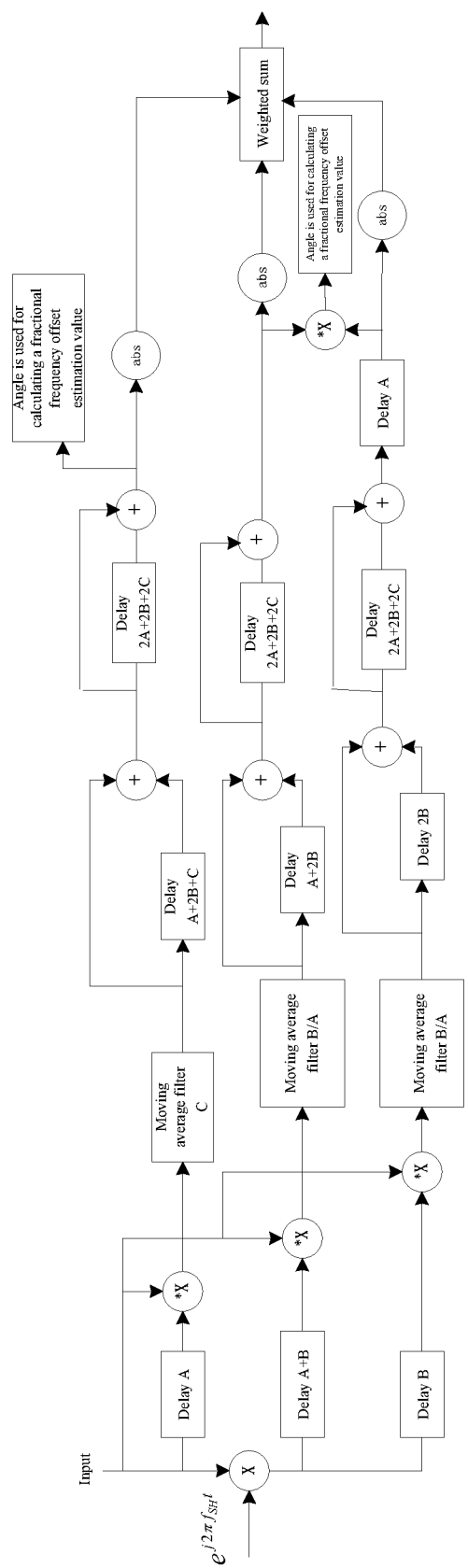
FIG. 18 a block diagram of the logic calculation for acquiring an initial timing synchronization result using 4 accumulation correlation values of 4 time-domain symbols in the embodiments of the present inventions.
Figure 19:
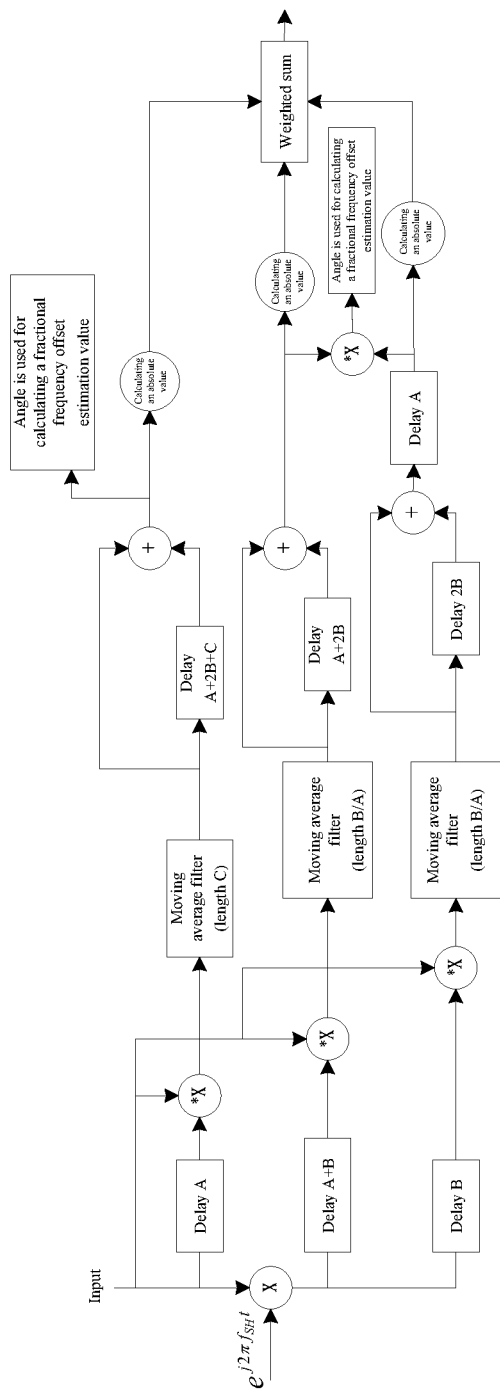
FIG. 19 a block diagram of the logic calculation for acquiring an initial timing synchronization result using 2 accumulation correlation values of 2 time-domain symbols in the embodiments of the present inventions.

FIG. 18 provides a block diagram of logical calculation for realizing preliminary timing synchronization using 4 sets of accumulation correlation values of 4 time-domain symbols in this embodiment; and FIG. 19 provides a block diagram of logical calculation for realizing preliminary timing synchronization using 2 sets of accumulation correlation values of 2 time-domain symbols in this embodiment.

Without loss of generality, if the preamble symbol contains other time-domain properties besides having a C–A–B or B–C–A structure, besides using the timing synchronization method with the above-mentioned C–A–B or B–C–A structural feature, using other timing synchronization methods implemented directed at other time domain structural features does not depart from the scope of the present invention.

Additionally, the principle of the method for fractional frequency offset estimation of a plurality of time-domain symbols with a three-segment structure is the same as that mentioned above, which will not be described here anymore.

Continuously, description is made with respect to the preliminary timing synchronization method (①) for K time-domain symbols with a three-segment structure, wherein a first time-domain symbol has a CAB structure, and the follow-ups are BCA structures connected successively.

There are two different three-segment structures, i.e. a CAB structure and a BCA structure; then in the CAB structure, when truncating A to generate a postfix or hyper prefix (part B), the position on the time-domain main body signal A corresponding to the start point of truncation is called a first sampling point serial number N1_1, and in the BCA structure, when truncating A to generate a postfix or hyper prefix (part B), the position on the time-domain main body signal A corresponding to the start point of truncation is called a second sampling point serial number N1_2, where N1_1 and N1_2 satisfy a predefined restriction relationship formula $N1\_1+N1\_2=2N_A-(\text{Len}_B+\text{Len}_C)$, and $N1\_1+\text{Len}_B=N_A$.

Specifically, as an example, assuming that $N_A$ is 2048, $\text{Len}_C$ is 520, $\text{Len}_B=504$, $N1\_1=1544$, and $N1\_2=1528$, $f_{SH}=1/(2048T)$.

By way of example, the formula of acquiring an accumulation correlation value through delayed moving auto-correlation:

$$U_{ca}(n) = r(n)r^*(n-N_A) \quad \text{(Formula 53-1; 53-2)}$$

$$U'_{ca}(n) = \frac{1}{\text{Len}_C}\sum_{k=0}^{\text{Len}_C-1} U_{ca}(n-k)$$

$U_{1s}'(n)$ can be obtained by conducting energy normalization on $U_1'(n)$.

That is, $$U'_{ca}(n) = \frac{U'_{ca}(n)}{0.5\frac{1}{\text{Len}_C}\sum_{k=0}^{\text{Len}_C-1}(|r(n-k)|^2+|r(n-k-N_A)|^2)} \quad \text{(Formula 54)}$$

Energy normalization can also be conducted in another way; and the conjugate operation * in $U_1(n)$ can also be realized by performing conjugate operation * on $r(n)$, and no conjugate operation is performed on $r(n-N_A)$.

In each C–A–B or B–C–A structure, three accumulation correlation values of CA, AB and BC based on the same content can be respectively acquired.

Delayed moving correlation is conducted using the same part in segment C and segment A; note that the above-mentioned step of energy normalization can be added, which will not be described any more. Three correlation values can be obtained from each C–A–B or B–C–A structure: $U_{ca}'(n)$, $U_{cb}'(n)$, and $U_{cb}'(n)$ $$U_1(n) = r(n)r^*(n-N_A) \quad \text{(Formula 55-1; 55-2)}$$

$$U'_{ca}(n) = \frac{1}{\text{Len}_C}\sum_{k=0}^{N_{CP}-1} U_1(n-k)$$

Delayed moving correlation is conducted using a corresponding part in segment B and segment C:

When the C–A–B structure is adopted, $$U_2(n) = r(n)r^*(n-N_A-N_A+N1\_1)e^{-jnf_{SH}T} = \quad \text{(Formula 56-1; 56-2)}$$
$$r(n)r^*(n-N_A-\text{Len}_B)e^{-jnf_{SH}T}$$

$$U'_{cb}(n) = \frac{1}{\text{corr\_len}}\sum_{k=0}^{N_{CP}-1} U_2(n-k)$$

When the C–B–A structure is adopted, $$U_2(n) = r(n)r^*(n-(N1\_2-N_A+\text{Len}_c+\text{Len}_B)) \quad \text{(Formula 57-1; 57-2)}$$
$$e^{-jnf_{SH}T} = r(n)r^*(n-(\text{Len}_B))e^{-jnf_{SH}T}$$

$$U'_{cb}(n) = \frac{1}{\text{corr\_len}}\sum_{k=0}^{N_{CP}-1} U_2(n-k)$$

Delayed moving correlation is conducted using a corresponding part in segment B and segment A:

in the case of the C–A–B structure, $$U_3(n) = r(n)r^*(n - N_A + N1\_1)e^{-jnf_{SH}T} = \quad \text{(Formula 58-1; 58-2)}$$
$$r(n)r^*(n - Len_B)e^{-jnf_{SH}T}$$

$$U'_{ab}(n) = \frac{1}{\text{corr\_len}} \sum_{k=0}^{N_{CP}-1} U_3(n-k)$$

in the case of the C–B–A structure, $$U_3(n) = r(n)r^*(n - N1\_2 - Len_B - Len_C)e^{-jnf_{SH}T} = \quad \text{(Formula 59-1; 59-2)}$$
$$r(n)r^*(n - N_A - Len_B)e^{-jnf_{SH}T}$$

$$U'_{ab}(n) = \frac{1}{\text{corr\_len}} \sum_{k=0}^{N_{CP}-1} U_3(n-k)$$

where corr_len can be valued $1/f_{SH}T$ to avoid continuous wave interference, or can be valued $Len_B$ to enable a peak to be sharp.

When the preamble symbol contains a plurality of time-domain symbols, and the time-domain symbols adopt a three-segment structure, three accumulation correlation values of CA, AB and CB can be obtained, i.e. $U_{ca}'(n)$, $U_{cb}'(n)$, and $U_{ab}'(n)$; an accumulation correlation value is obtained by any one or at least any two of $U_{ca}'(n)$, $U_{cb}'(n)$, and $U_{ab}'(n)$; delay relationship match and/or mathematical calculation between one or more symbols based on the accumulation correlation value, to obtain a final calculation value; and the final calculation value is used for initial synchronization.

For example, with respect to K time-domain symbols with a three-segment structure, when the arrangement is C–A–B, B–C–A, B–C–A, B–C–A, ..., B–C–A, i.e. the first symbol is of the C–A–B structure, and the following K−1 symbols are all of the B–C–A structure, $U_{ca}^1(n)$, $U_{cb}^1(n)$, $U_{ab}^1(n)$, $U_{ca}^2(n)$, $U_{cb}^2(n)$, $U_{ab}^2(n)$, $U_{ca}^3(n)$, $U_{cb}^3(n)$, $U_{ab}^3(n)$, $U_{ca}^4(n)$, $U_{cb}^4(n)$, $U_{ab}^4(n)$, ... $U_{ca}^K(n)$, $U_{cb}^K(n)$, and $U_{ab}^K(n)$ are obtained. In fact, the above-mentioned correlation values are outputs of three delayed moving auto-correlators, where $U_{ca}^1(n) = U_{ca}^2(n) = \ldots = U_{ca}^K(n)$;

$U_{cb}^1(n) = U_{ab}^2(n) = \ldots U_{ab}^K(n)$; and $U_{ab}^1(n) = U_{cb}^2(n) = \ldots U_{cb}^K(n)$;

then, delay relationship match and/or phase adjustment between symbols can be performed on one or more of, $U_{ca}^1(n)$, $U_{ca}^2(n)$, $U_{ca}^3(n)$, $U_{ca}^4(n)$, ... $U_{ca}^K(n)$ according to the relationship between one and more symbols, and then addition or average is conducted on same, to obtain the final $U_A(n)$.

This is because they have the same phase value. When only one symbol is adopted, the delay relationship match and/or phase adjustment are actually equivalent to performing no operation.

The delay match and/or phase adjustment contain all or some of the following, with an example provided below:

$U_{ca}^1(n-(K-2)\cdot(N_A+Len_B+Len_C)-(N_A+2Len_B+Len_C))$, $U_{ca}^2(n-(K-2)\cdot(N_A+Len_B+Len_C))$, ... $U_{ca}^j(n-(K-j)\cdot(N_A+Len_B+Len_C))$, $U_{ca}^{K-1}(n-(N_A+Len_B+Len_C))$, and $U_{ca}^K(n)$ where considering that in the embodiment $f_{SH}=1/(2048T)$, $N^A$ is 2048, $Len_C$ is 520, and $Len_B=504$, i.e. ($N_A+Len_B+Len_C$)=3072, phase adjustment should be performed on $U_{ca}^3(n-(N_A+Len_B+Len_C))$ by multiplying $e^{j\pi}$.

Delay relationship match and/or phase adjustment can be performed on one or more of $U_{cb}^1(n)$, $U_{ab}^2(n)$, $U_{ab}^3(n)$, $U_{ab}^4(n)$, ... $U_{ab}^K(n)$ according to the relationship between one and more symbols. Since they have the same phase value, they can then be added or averaged, to obtain a final $U_{A+B}(n)$. When only one correlation value is adopted, the delay relationship match and/or phase adjustment are actually equivalent to performing no operation. This is because they have the same phase value. The delay match result contains all or some of the following, with an example provided below:

$U_{cb}^1(n-(K-2)\cdot(N_A+Len_B+Len_C)-(N_A+2Len_B))$, $U_{ab}^2(n-(K-2)\cdot(N_A+Len_B+Len_C))$, ... $U_{ab}^j(n-(K-j)\cdot(N_A+Len_B+Len_C))$ $U_{ab}^{K-1}(n-(N_{-A}+Len_B+Len_C))$, and $U_{ab}^K(n)$.

where considering that in the embodiment $f_{SH}=1/(2048T)$, $N_A$ is 2048, $Len_C$ is 520, and $Len_B=504$, i.e. ($N_A+Len_B+Len_C$)=3072, phase adjustment should be performed on $U_{ab}^3(n-(N_A+Len_B+Len_C))$ by multiplying $e^{j\pi}$.

Delay relationship match and/or phase adjustment between symbols can be performed on one or more of $U_{ab}^1(n)$, $U_{cb}^2(n)$, $U_{cb}^3(n)$, $U_{cb}^4(n)$, ... $U_{cb}^K(n)$ according to the corresponding relationship between one and more symbols, and then addition or average is conducted on same, to obtain the final $U_B(n)$. When only one correlation value is adopted, the delay relationship match and/or phase adjustment are actually equivalent to no operation. The delay match result contains all or some of the following, with an example provided below:

$U_{ab}^1(n-(K-2)\cdot(N_A+Len_B+Len_C)-(2Len_B))$, $U_{cb}^2(n-(K-2)\cdot(N_A+Len_B+Len_C))$, ... $U_{cb}^j(n-(K-j)\cdot(N_A+Len_B+Len_C))$ $U_{cb}^{K-1}(n-(N_A+Len_B+Len_C))$, and $U_{cb}^K(n)$.

where considering that in the embodiment $f_{SH}=1/(2048T)$, $N_A$ is 2048, $Len_C$ is 520, and $Len_B=504$, i.e. ($N_A+Len_B+Len_C$)=3072, $U_{cb}^3(n-(N_A+Len_B+Len_C))$ needs to be multiplied by $e^{j\pi}$.

Finally, delay match and a specific calculation are performed again based on one or more of $U_A(n)$ and $U_{A+B}(n)$, and $U_B(n)$, and the delay match result herein contains all or some of the following, with an example provided below:

$U_A(n)$, $U_{A+B}(n)$, and $U_B(n-N_A)$ initial timing synchronization is accomplished by utilizing an calculation result, and the specific calculation may be absolute value addition. For example, the initial timing synchronization is accomplished by taking the position of the maximum value.

Step S12-2 contains the initial timing synchronization method for preliminarily determining the position of the preamble symbol in a physical frame. Further, after initial synchronization, the integer frequency offset estimation can further be conducted based on a result obtained from the initial timing synchronization method.

Further, when the time-domain main body signal A correspond to the above-mentioned frequency-domain structure I, the receiving end can also perform an integer frequency offset estimation using a fixed sequence, that is, the preamble symbol of the present invention can also be used for the integer frequency offset estimation in the following steps:

1) truncating a signal containing the fixed subcarrier, according to the determined position of the preamble symbol in the physical frame;

2) performing calculation on the received signal containing a fixed subcarrier, with a frequency-domain fixed subcarrier sequence or a time-domain signal corresponding to the frequency-domain fixed subcarrier sequence, so as to realize an integer frequency offset estimation.

Explanation below is provided for the integer frequency offset estimation method based on the result of the initial timing synchronization, and the steps of the integer frequency offset estimation include any one or a combination of any two of the particular methods below:

a first integer frequency offset estimation method contains: according to a result of the initial timing synchronization, truncating to get a section of time-domain signal containing the entirety or a portion of the time-domain main body signal, modulating the truncated section of time-domain signal with different frequency offsets in a frequency sweeping manner, to obtain N frequency sweeping time-domain signals corresponding to the offset values on a one-to-one basis, and after performing moving correlation between a known time-domain signal obtained by performing inverse transform on a known frequency-domain sequence and each frequency sweeping time-domain signal, comparing the maximum correlation peaks of N correlation results, regarding a frequency offset value by which a frequency sweeping time-domain signal corresponding to the maximum correlation result is modulated as the integer frequency offset estimation value; and/or a second integer frequency offset estimation method contains:

performing Fourier transform on the time-domain signal which is truncated to the length of the time-domain main body signal according to the result of the initial timing synchronization, conducting cyclic shift on the obtained frequency-domain subcarriers using different shift values within a frequency sweeping range, truncating a received sequence corresponding to a valid subcarrier, performing predefined calculation and then inverse transform on the received sequence and the known frequency-domain sequence, performing selection from several groups of inverse transform results corresponding to the shift values on a one-to-one basis to obtain a an optimum shift value, and obtaining the integer frequency offset estimation value according to a corresponding relationship between the shift value and the integer frequency offset estimation value.

The integral frequency offset estimation method is described in particular by way of example. For example, the time-domain main body signal A correspondingly has the above-mentioned frequency-domain structure I, that is, a frequency-domain OFDM symbol comprises three parts respectively, i.e. virtual subcarriers, signalling sequence (referred to as SC) subcarriers and fixed sequence (referred to as FC) subcarriers, then a known frequency-domain sequence recited below is a fixed subcarrier; for another example, the time-domain main body signal correspondingly has the above-mentioned frequency-domain structure II, that is, the first time-domain symbol of the preamble symbol is known information, then a known frequency-domain sequence recited below corresponds to the first time-domain symbol.

The first integer frequency offset estimation method contains: according to a result of the initial timing synchronization, truncating to get a section of time-domain waveform containing the entirety or a portion of the time-domain main body signal, modulating the section of time-domain waveform with different frequency offsets in a frequency sweeping mode, i.e. in a fixed frequency changing step, such as corresponding to an integer subcarrier spacing, to obtain several time-domain signals, $$A1_y(nT) = r(nT) \cdot e^{j2\pi y n T f_s / N_A} \qquad \text{(Formula 60)}$$

where T is the sampling period, and $f_s$ is the sampling frequency. The time-domain signal obtained by filling with known frequency-domain sequence in a predefined subcarrier filling mode and performing inverse Fourier transform on same is A2; and moving correlation is performed on A2, which is taken as a known signal, and each $A1_y$, so as to select the $A1_y$ which corresponds to the maximum correlation peak, then the corresponding modulation frequency offset value y is the integral multiple of frequency offset estimation value.

The frequency sweeping range corresponds to a frequency offset range requirement that the system needs to meet, for example, the system needs to cope with a frequency offset of 500 k, and a sampling rate of the system is 9.14M, and the main body of the preamble symbol has a length of 2 k, then the frequency sweeping range is $$\pm \left\lceil \frac{500 \text{ K} \times 2048}{9.14 \text{M}} \right\rceil,$$

i.e. [−114, 114].

The second integer frequency offset estimation method contains: according to the position where the preamble symbol appears detected by the initial timing synchronization, truncating to get the time-domain main body signal A, and performing FFT on same; performing cyclic shift with different shift values on the frequency-domain subcarrier after FFT in a frequency-sweeping range; after that, truncating to get a received sequence corresponding to a valid subcarrier; performing some calculation (generally, conjugate multiplication, or division) on the received sequence and the known frequency-domain sequence; performing IFFT on a result of the calculation; and performing specific calculation on a result of the IFFT, such as taking the path with the largest energy, or taking the accumulation of several paths with large energies. With the several shift values, after several times of IFFT, several calculation results will be obtained. Which shift value corresponds to the integer frequency offset estimation is judged based on the several operation results, thus obtaining an integer frequency offset estimation value.

A typical judgement method is based on several results, and a shift value corresponding to the result with the maximum energy is selected as the integer frequency offset estimation value.

When the time-domain main body signal A corresponds to the above-mentioned frequency-domain structure I, the following integral frequency offset estimation method can also be adopted.

The integer frequency offset estimation method comprises: truncating some symbols in a preamble symbol to get a time-domain main body signal A and performing Fourier transform on same to obtain a frequency-domain OFDM symbol, performing cyclic shift in the frequency sweeping range on the frequency-domain OFDM symbol obtained by transform, conducting interlaced differential multiplication according to the position of the FC on the subcarrier and an interval between two fixed sequence subcarriers, i.e. the former one and the later one, and performing correlation calculation on interlaced differential multiplication value of the known fixed sequence subcarriers to obtain a series of correlation values, and selecting the cyclic shift corresponding to the maximum correlation value, thus being able to accordingly obtain the integral frequency offset estimation value.

Further, when it is determined that the baseband signal contains a preamble symbol containing a C–A–B and B–C–A cascaded three-segment structure desired to be received, if the positions of the frequency-domain valid subcarriers of the 2 time-domain symbols, i.e. the former one and the later one, differ from each other by an even number of cyclic shift values, Fourier transform can be performed on the time-domain main body signals A of the 2 time-domain symbols to obtain 2 frequency-domain OFDM symbol; then the same cyclic shift is performed on the 2 frequency-domain OFDM symbols, which are obtained through the transform, in the above-mentioned frequency sweeping range at the same time; conjugate multiplication is performed on a received value of each shifted symbol and the known fixed sequence subcarrier value of the symbol; and after conjugate multiplication is again performed on multiplication values on the same subcarrier position of the 2 frequency-domain OFDM symbols, the conjugate multiplication values of all the valid FC subcarriers at common positions of the 2 frequency-domain OFDM symbols, That is, $$\text{corr}_j = \text{Re}\left(\sum_{i=0}^{M-1} R_{i,1,j} FC_{i,1}^* (R_{i,2,j} FC_{i,2}^*)^*\right) \quad \text{(Formula 61)}$$

$j \in$ frequency sweeping range $R_{i,1,j}$ is a received value of the first frequency-domain symbol corresponding to the FC position after a shift of j, $R_{i,2,j}$ is a received value of the second frequency-domain symbol corresponding to the FC position after a shift of j, $FC^*_{i,1}$ and $FC^*_{i,2}$ are respectively a known FC value on some subcarrier of the first symbol and the second symbol, and M is the number of the known FCs. In this way, a series of accumulation values corresponding to various cyclic shift values are obtained, and an integer frequency offset estimation value can be accordingly obtained using a cyclic shift corresponding to the maximum accumulation value.

There are many particular algorithms for integer frequency offset estimation, which will not be described here anymore.

Further, after the integer frequency offset estimation, the frequency offset is compensated, and thus the transmitted signalling is parsed.

Further optionally, after the integral frequency-offset estimation is accomplished, precise timing synchronization is performed using the known information in the preamble symbol.

For example, when the frequency-domain structure I is adopted, fine timing synchronization is conducted using a fixed subcarrier sequence (FC) contained by one or more time-domain symbols; and for another example, when the frequency-domain structure II is adopted, if the first time-domain main body signal in at least one time-domain main body signal is a known signal, a fine timing synchronization method is conducted using the known signal.

In the case where the above-mentioned judgement result in step S12-3 is yes, the step of determining the position of the preamble symbol in the physical frame and resolving signalling information carried by the preamble symbol will be described in detail below, and the step contains:

determining the position of the preamble symbol, comprising: based on a detection result satisfying a pre-set condition, determining the position of the preamble symbol in the physical frame; and if a preamble symbol desired to be received exists, determining the position where the preamble symbol appears according to a great correlation value to be detected or the greatest correlation value to be detected.

The step of parsing transmitted signalling further contains a channel estimation method.

For example, in the case of having the frequency-domain structure I, channel estimation is accomplished using a received signal containing the fixed sequence subcarrier and a known frequency-domain fixed subsequence subcarrier and/or a time-domain signal obtained by performing inverse Fourier transform thereon, and this can also chosen to be carried out in the time domain and/or in the frequency domain, which will not be described here anymore.

The channel estimation method comprises: when the decoding of the previous time-domain main body signal is achieved, using decoded information obtained as sending information, to perform channel estimation again in the time domain/frequency domain, and performing some specific calculation on it with a previous channel estimation result to obtain a new channel estimation result, for use in parsing signalling of the next time-domain main body signal.

Further, when a frame format parameter and/or an emergency broadcast content in the preamble symbols is resolved, the position of a subsequent signalling symbol and the position of a data symbol can be obtained according to the content of the parameter and the determined position of the preamble symbol, and is used to parse subsequent signalling symbol or data symbol.

The step of resolving signalling information carried by the preamble symbol in step S12-3 is explained continuously. The step of parsing a signalling signal comprises: resolving signalling information carried by the preamble symbol by utilizing the entirety or a portion of a time-domain waveform of the preamble symbol and/or a frequency-domain signal obtained from the entirety or a portion of the time-domain waveform of the preamble symbol through Fourier transform.

The signalling parsing process is explained with respect to the frequency-domain structure I below.

The signalling information carried by signalling sequence subcarriers in the preamble symbol is resolved by performing calculation using the received signal and a set of known signalling sequence subcarriers containing the signalling sequence subcarriers, or a time-domain signal corresponding to the set of signalling sequence subcarriers. The set of signalling sequence subcarriers is produced based on a set of known signalling sequences.

The signal containing the signalling sequence subcarriers comprises: the entire or a partial of a time-domain waveform of the received preamble symbol, and one or more frequency-domain OFDM symbols obtained by performing Fourier transform on one or more time-domain OFDM symbols truncated from the preamble symbol. The set of signalling sequence subcarriers is a set formed by filling the valid subcarriers with various signalling sequences in the set of signalling sequences.

Specifically, one or more frequency-domain OFDM symbols are obtained by performing Fourier transform on one or more truncated time-domain symbol corresponding to the length $N_A$ of the OFDM symbol; then zero subcarriers are removed, and one or more received frequency-domain signalling subcarriers are taken out according to the positions of the signalling subcarriers. A specific mathematical calculation is conducted on the one or more received frequency-domain signalling subcarriers with the above-mentioned channel estimation value and the known set of signalling sequence subcarriers, to complete a frequency-domain decoding function.

For example, let i=0:M−1, M be the number signalling subcarriers, and j=0:$2^P$−1, P denotes the number of bits of signalling transmitted in the frequency domain, that is, the corresponding set of signalling subcarriers has $2^P$ elements in total, and each element corresponds to a sequence with a length of M; $H_i$ be a channel estimation value corresponding to each signalling subcarrier, $SC\_rec_i$ be a received frequency-domain signalling subcarrier value, and $SC_i^j$ be the ith value of the jth element in the set of signalling sequence subcarriers. Then $$\text{corr}_j = \text{Re}\left(\sum_{i=0}^{M-1} SC\_rec_i H_i^* SC_i^{*j}\right)$$

$$j = 0:2^P - 1,$$

information about the signalling transmitted in the frequency domain can be obtained by taking j corresponding to max ($\text{corr}_j$).

In other embodiments, the previous process can also be carried out in the time domain; and the information about the signalling transmitted in the frequency domain can also be resolved by filling with zeros at appropriate positions of the known set of signalling sequence subcarriers to generate a frequency-domain symbol with a corresponding length, then performing inverse Fourier transform to obtain a set of time-domain signalling waveforms, directly conducting synchronous correlation on the set of waveforms with a received time-domain signal of which the accurate position has been acquired, then taking a correlation value with the maximum absolute value, which will not be described here anymore.

The signalling parsing process is explained with respect to the frequency-domain structure II below.

For example, after an FFT calculation with a corresponding length is performed on a time-domain main body signal with a length $N_{FFT}$ corresponding to the position section A, zero subcarriers are removed; and the received frequency-domain subcarriers are taken out according to the positions of the valid subcarriers, and are used for parsing signalling.

If a transmitted sequence has been PN modulated, then the receiving end can firstly perform a PN demodulation operation on the received frequency-domain subcarrier, and then parse the signalling of a ZC sequence. It is also possible to directly parse the signalling using frequency-domain subcarriers without PN modulation. The difference only lies in that sets of known sequences are different, which will be elaborated below.

Further, in the step of parsing signalling information, the transmitting end parses the signalling using a set of known signalling sequence produced by all possible different root values and/or different frequency-domain shift values of the transmitted frequency-domain main body sequence, and all possible frequency-domain modulation frequency offset values. The set of known sequences here contains the following significance:

if PN modulation is performed at the transmitting end on a CAZAC sequence produced by all possible root values and/or all possible frequency-domain cyclic shifts, then the set of known sequences can not only refer to a set of PN-modulated sequences, but also can refer to a set of sequences without PN modulation. If the receiving end performs a PN demodulation operation in the frequency domain, then the set of known sequences adopts the set of sequences without PN modulation; and if the receiving end does not perform PN demodulation in the frequency domain, then the set of known sequences adopts the set of PN-modulated sequences. If a time-domain waveform corresponding to the set of known sequences is to be used, then the set of PN-modulated sequences of the CAZAC sequence must be used.

Further, if the transmitting end also conducts an interleave operation after generating the CAZAC sequence, then the set of known sequences can not only refer to the ZACAC sequence and/or the set of PN-modulated and frequency-domain interleaved sequences, but also can refer to the set of sequences without frequency-domain interleave. If the receiving end performs a de-interleave operation in the frequency domain, then the set of known sequences adopts the set of sequence without frequency-domain interleave; and if the receiving end does not perform de-interleave in the frequency domain, then the set of known sequences adopts the set of frequency-domain interleaved sequences. If a time-domain waveform corresponding to the set of known sequences is to be used, then the ZACAC sequence and/or the set of PN-modulated and de-interleaved sequences must be used, i.e. a set consisting of various sequences finally mapped onto the subcarriers.

The following description is made to the particular process signalling parsing respectively from two transmission situations adopted by the generation method of the transmitting end.

<First transmission situation> In a process of generating the frequency-domain subcarrier, after a sequence is generated using different sequence generation formulas and/or a sequence is generated based on the same sequence generation formula, cyclic shift is further performed on the generated sequence, a specific mathematical calculation is performed on the frequency-domain signalling subcarrier and the channel estimation value, and all possible frequency-domain main body sequence, so as to realize signalling parsing, wherein the specific mathematical calculation containing any one of the following:

(1) maximum likelihood correlation operation combined with channel estimation; or (2) performing channel equalization on the frequency-domain signalling subcarrier using the channel estimation value, then performing correlation calculation on an equalized signal with all of the possible frequency-domain main body sequence, and selecting the maximum correlation value as a decoding result of signalling parsing.

The process of signalling parsing under the first transmitting situation is described in particular below.

For example, let $i=0:M-1$, M be the number of signalling subcarriers, and $j=0:2^P-1$, P denotes the number of bits of signalling transmitted in the frequency domain, that is, the corresponding set of signalling subcarriers has $2^P$ elements in total, and each element corresponds to a sequence with a length of M; $H_i$ be a channel estimation value corresponding to each signalling subcarrier, $SC\_rec_i$ be a received frequency-domain signalling subcarrier value, and $SC_i^j$ be the ith value of the jth element in the set of signalling subcarriers.

Then $$\text{corr}_j = \text{Re}\left(\sum_{i=0}^{M-1} SC\_rec_i H_i^* SC_i^{*j}\right) \quad \text{(Formula 62)}$$

$$j = 0:2^P - 1$$

The signalling transmitted in the frequency domain can be obtained by taking j corresponding to $\max(\text{corr}_j)$.

If the transmitting end performs PN modulation, and PN demodulation is not performed on $SC\_rec_i$, $SC_i^j$ then accordingly adopt the set of PN-modulated sequences; and if PN demodulation is performed on $SC\_rec_i$, then $SC_i^j$ accordingly adopt the set of sequences without PN modulation.

With regard to the situation where the transmitting end contains a frequency-domain interleave operation, it can be simply inferred, which will not be specially elaborated here anymore.

Optionally, the process of decoding frequency-domain transmission signalling can also be carried out in the time domain; and the signalling transmitted in the frequency domain can also be resolved by performing IFFT transform on the set of known signalling subcarrier to obtain a corresponding set of time-domain signalling waveforms, directly conducting synchronous correlation on the obtained set of time-domain signalling waveforms with a received time-domain signal of which the accurate position has been acquired, which will not be described herein anymore.

If the signalling subcarriers of each symbol is obtained by performing PN modulation on more than one ZC sequence before frequency-domain interleave, then after obtaining the valid frequency-domain subcarriers, the receiving end performs a corresponding frequency-domain de-interleave operation and a PN demodulation operation, and then parsing the signalling of the ZC sequence. If the PN modulation is before the frequency-domain interleave, then frequency-domain de-interleave is performed first, and then PN demodulation is performed. If the PN modulation is after the frequency-domain interleave, then PN demodulation is performed first, then frequency-domain de-interleave is performed; or frequency-domain de-interleave is performed first, and then PN demodulation is performed. However, a PN sequence used for demodulation at this time is a PN sequence obtained by de-interleaving an original PN.

<Second transmission situation> In the process of generating the frequency-domain subcarriers, phase modulation is performed on a pre-generated subcarrier with the frequency offset value.

In general, the predefined sending rule required to be satisfied contains: obtaining pre-generated subcarriers by processing a frequency-domain main body sequence corresponding to a time-domain main body signal in each transmitted time-domain signal, and performing phase modulation with a predefined frequency offset value S on each valid subcarrier or performing cyclic shift with a predefined shift value on the time-domain signal after inverse Fourier transform. A symbol for transmitting a basic parameter contained in the preamble symbol is referred to as a PFC symbol in the following.

Specifically, in the step of resolving signalling information carried by the preamble symbol using the frequency-domain signal, if the frequency-domain sequence in the transmitting end is generated by performing phase modulation on each valid subcarrier according to the above-mentioned frequency offset value S, then a parsing and receiving algorithm that can be implemented include the following 3 examples of signalling parsing, which are <example I of signalling parsing>, <example II of signalling parsing> and <example III of signalling parsing> respectively.

<Example I of Signalling Parsing>

Description is made directed at example I of signalling parsing: performing an FFT calculation on the time-domain main body signal A corresponding to each time-domain symbol in the preamble symbol generated according to the above-mentioned rule, to obtain a frequency-domain signal; taking out the value of valid subcarriers in the frequency-domain signal; after performing a predefined mathematical calculation on each subcarrier with the subcarrier corresponding to each known frequency-domain sequence of the set of known frequency-domain signalling of the symbol, conducting IFFT calculation, wherein each known frequency-domain sequence corresponds one IFFT result, and each symbol corresponds to one or more IFFT results; selecting the most reliable IFFT result of each symbol, and performing predefined processing; then using a processing result between a plurality of symbols to further perform some calculation between symbols to resolve information about the transmitted signalling (including signalling conveyed using different frequency-domain sequences and/or signalling conveyed transmitted using a frequency-domain modulation frequency offset value, i.e. a time-domain cyclic shift value).

The set of frequency-domain known signalling contains all possible frequency-domain sequences of the time-domain main body signal A corresponding to each time-domain symbol that are used for filling the frequency-domain subcarriers without phase modulation. If the transmitting end has a PN modulation operation, here it refers to all possible frequency-domain sequences after PN modulation.

When the set of known frequency-domain signalling of the symbol has only one known sequence, i.e. signalling is transmitted by only relying on a frequency-domain modulation frequency offset, the parsing method in the receiving method in example I of signalling parsing can be simplified as follows:

performing an FFT operation on the time-domain main body signal A corresponding to each time-domain symbol, to obtain a frequency-domain signal; taking out the value of valid subcarriers in the frequency-domain signal; performing some calculation (a conjugate multiplication/division calculation) on each valid subcarrier with a valid subcarrier of the unique known frequency-domain sequence corresponding to the symbol, and conducting an IFFT calculation; based on an IFFT result, optionally performing predefined processing; and then using a processed IFFT result between a plurality of symbols to further conduct a predefined processing operation between time-domain symbols to resolve the transmitted signalling (signalling conveyed using the frequency-domain modulation offset, i.e. the time-domain cyclic shift value).

Specifically, for some time-domain symbol, the expression of the pre-generated subcarrier without phase modulation corresponding to the time-domain main body signal A thereof is $A_k$, and the expression thereof after phase modulation is $$AM_k = A_k \cdot e^{j\frac{2\pi sk}{N_{FFT}}}, \quad \text{(Formula 63)}$$

where $H_k$ is a channel frequency-domain response, and after passing through a channel, the expression of received frequency-domain data is $$R_k = AM_k \cdot H_k + N_k = A_k \cdot H_k \cdot e^{j\frac{2\pi sk}{N_{FFT}}} + N_k, \quad \text{(Formula 64)}$$
$$k = 0, 1, \ldots N_{FFT} - 1$$

The predefined mathematical calculation (a conjugate multiplication/division calculation) adnnted in this embodiment is carried out, $$E(t)_k = \frac{R_k}{A(t)_k} \text{ or } E_k = R_k \cdot (A(i)_k)^*, \quad \text{(Formula 65)}$$

where $A(t)_k$ indicates the 'th known sequence of the set of known frequency-domain sequence of the time-domain symbol, and $t=1, \ldots T$, assuming that there are T sequences in total.

If the set of known frequency-domain sequences has only one known sequence, i.e. $T=1$, then $A(1)_k = A_k$. For example, when using the predefined mathematical calculation method of $$E(t)_k = \frac{R_k}{A(t)_k}$$

division, if the set of known frequency-domain sequences comprises only one known sequence, then it is derived out that $$E(1)_k = \frac{R_k}{A(1)_k} = H_k \cdot e^{j\frac{2\pi sk}{N_{FFT}}} + \frac{N_K}{A_k}, \quad \text{(Formula 66)}$$

The physical meaning thereof is the product of the channel estimation value and phase modulation value of each subcarrier; and the formula for other predefined mathematical calculation $$E(1)_k = R_k \cdot (A(1)_k)^* = H_k \cdot |A_k|^2 e^{j\frac{2\pi sk}{N_{FFT}}} + N_k \cdot A_k^*, \quad \text{(Formula 67)}$$

also contains the product of the channel estimation value and phase modulation value of each subcarrier.

Then an IFFT operation is conducted on $E(t)_k$, $k=0, 1, \ldots N_{FFT}-1$, then t IFFT operation results will be obtained for each time-domain symbol; an absolute value calculation or square of absolute value operation is conducted on the results optionally; then the most reliable one in the T results in the case of $t=1, \ldots T$ is selected according to a first predefined selection rule as the calculation result of the time-domain symbol; and the signalling conveyed by different frequency-domain sequences can be resolved using the 'value corresponding thereto. The most reliable judgement method in the first predefined selection rule may be using the maximum peak or the maximum peak-to-average ratio, etc.

If the set of known frequency-domain sequences of each time-domain symbol includes only one known sequence, then the step of selecting the most reliable one in T results as the calculation result of the symbol can be omitted, and the unique IFFT result of each symbol can be directly taken as the selected IFFT result.

Figure 20:
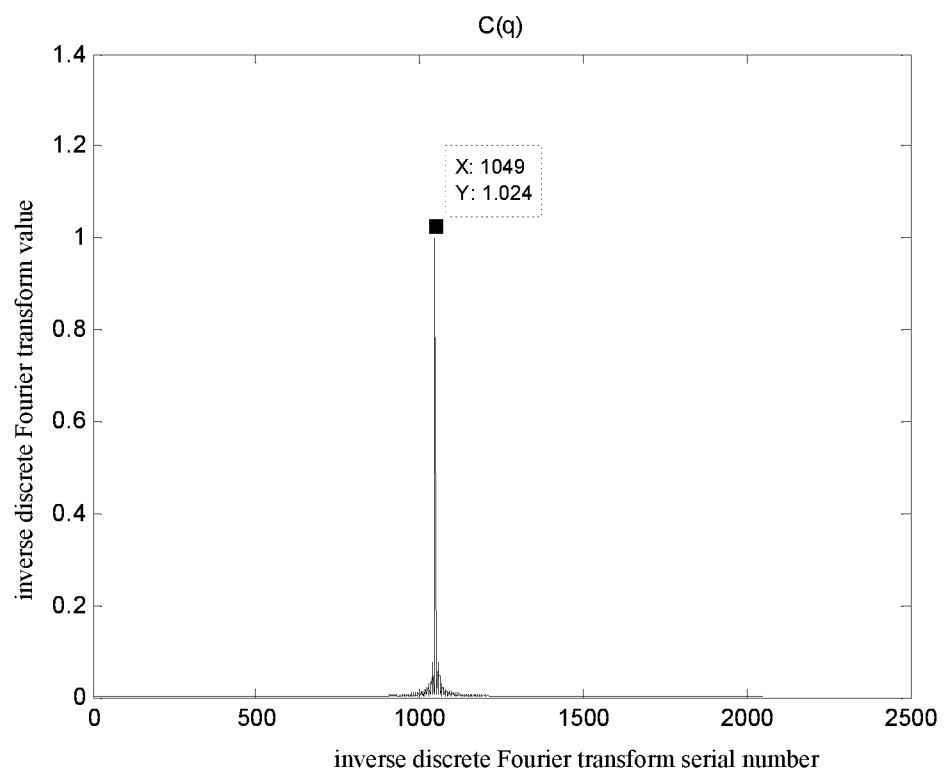
FIG. 20 is an oscillograph of an inverse Fourier result of a time-domain main body signal under AWGN in the embodiments of the present invention.

FIG. 20 is an oscillograph of an inverse Fourier result of a time-domain main body signal under AWGN in example I of signalling parsing of the present invention. As shown in FIG. 20, the position which the maximum value of the inverse discrete Fourier transform appears at is 1049, and the value is 1.024.

Then assuming that the PFC part in the preamble symbol includes Q symbols in total, the following wave form C(q), $q=1, \ldots Q$ of the Q symbols will be obtained. Note that C(q) can be a result of some original IFFT selected from T results, and can also be a result after calculating the absolute value or square of the absolute value.

Figure 21:
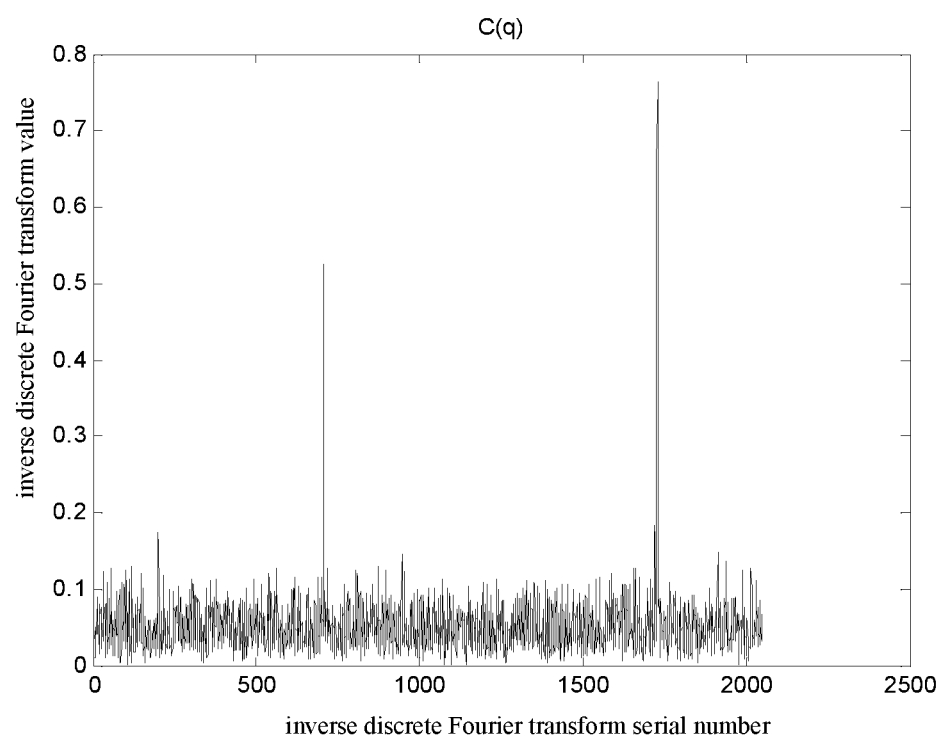
FIG. 21 provides an oscillograph of an inverse Fourier result of a time-domain main body signal under an 0 dB two-path channel in the embodiments.

Considering the influence of noise and multipath, and the influence of an interference path under various reasons, for example, in the case of 0 dB echo, 2 peaks will present, and it is difficult to judge the maximum peak. FIG. 21 provides an oscillograph of an inverse Fourier result of a time-domain main body signal under an 0 dB echo channel in example I of signalling parsing.

Figure 22A:
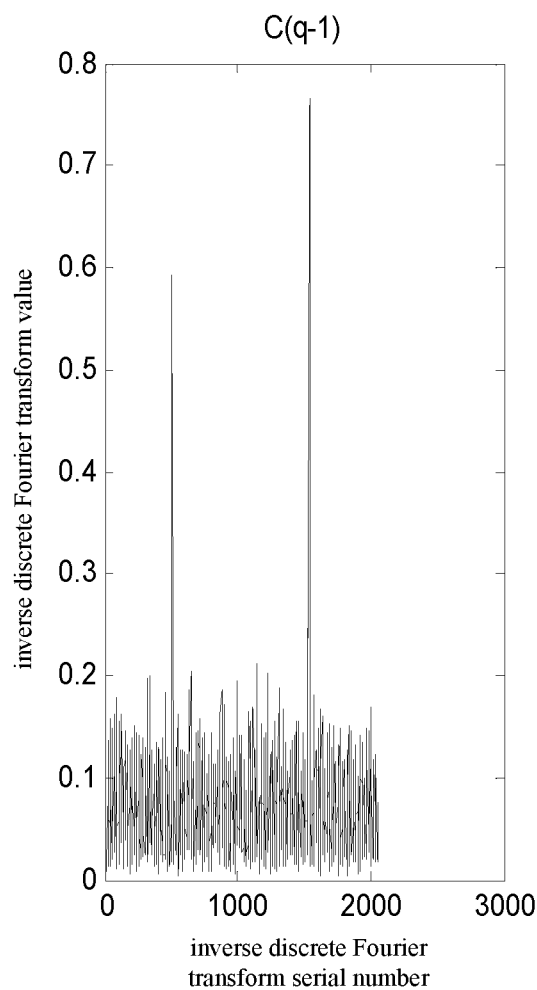
FIG. 22(*a*) is an oscillograph of an inverse Fourier result of the time-domain main body signal of the previous time-domain symbol before noise filter processing under an 0 dB two-path channel in the embodiments.
Figure 22B:
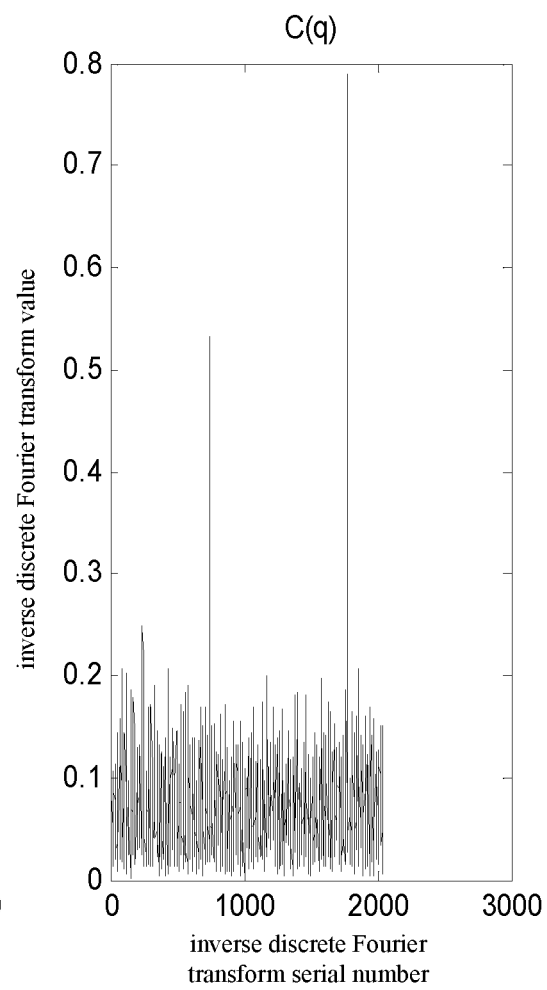
Figure 23A:
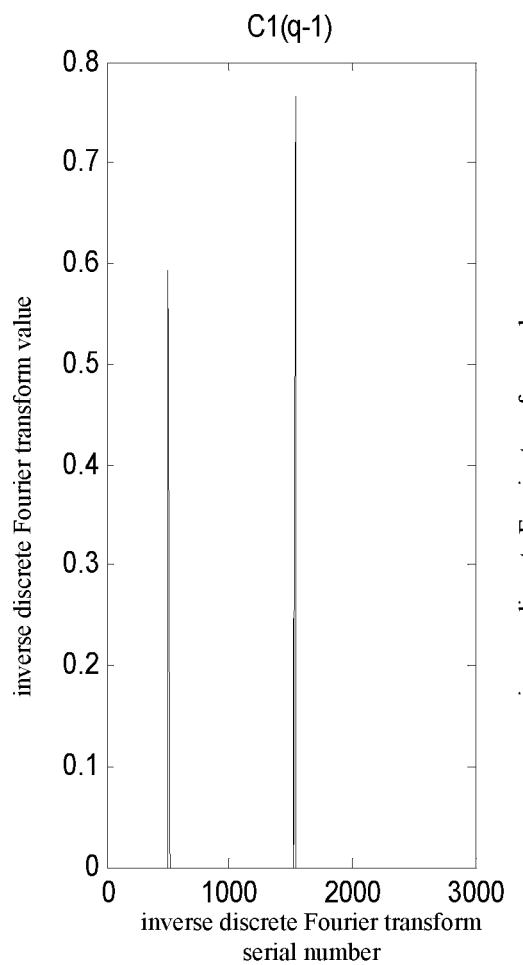
FIG. 23(*a*) is an oscillograph of an inverse Fourier result of a time-domain main body signal of the previous time-domain symbol after noise filter processing under an 0 dB two-path channel in the embodiments.
Figure 23B:
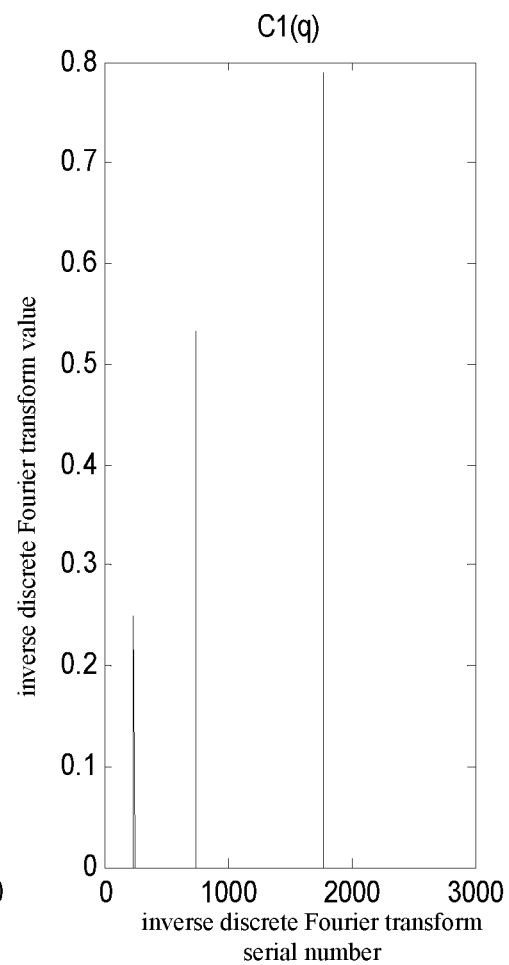

Therefore, as shown in FIG. 21, noise filtering processing is performed on the inverse Fourier calculation results of each time-domain symbol, i.e. keeping the maximum value and setting all the smaller values to zero. This step is optional. Processing results corresponding to all PFC symbols are obtained, and are named as C'(q), $_q=1, \ldots Q$ A schematic diagram of C'($q^1$) and C'(q) of 2 symbols, i.e. a former one and a later one, before and after processing under a 0 dB echo channel is provided below. FIG. 22(a) and FIG. 22(b) are respectively an oscillograph of an inverse Fourier result of a time-domain main body signal of a former time-domain signal and a later time-domain symbol before noise filter processing under an 0 dB echo channel in the embodiments; FIG. 23(a) and FIG. 23(b) are respectively an oscillograph of an inverse Fourier result of a time-domain main body signal of a former time-domain signal and a later time-domain symbol after noise filter processing under an 0 dB echo channel in the embodiments.

The C'(q) of the later symbol is cyclically shifted, and is multiplied or conjugately multiplied by C'(q−1) of the former symbol and is then accumulated; the one corresponding to the maximum accumulated value among all the shift values is found out, and the transmitted signalling can be derived from the shift value corresponding thereto; and after the pre-generated subcarrier is generated using the frequency-domain sequence of the time-domain main body signal A corresponding to the time-domain symbol in the preamble symbol, the signalling transmission function is realized by performing phase modulation on each valid subcarrier, which is equivalent to the way of performing cyclic shift on the time-domain OFDM symbol after IFFT.

The particular description of the predefined processing operation between a plurality of time-domain symbols is as follows: cyclically shifting C'(q) by V to obtain C'(q,V), wherein left-wise shift or right-wise shift can be selected, and right-wise shift is selected in this embodiment, $V \in [0, N_{FFT}-1]$; and then performing the conjugate multiplication and accumulation calculation as the formula below for example, $$Accum(V) = \sum_{i=0}^{N_{FFT}-1} C'(q-1) \cdot conj(C''(q,V)) \quad \text{(Formula 68)}$$

It should be specially noted that the predefined processing operation between a plurality of time-domain symbols mentioned above is just an example, and is not limited to conjugate multiplication; and the multiplication and accumulation operation therein do not have to be performed on all $N_{FFT}$ points, and can be performed at some great value points.

Accum(V) with the maximum absolute value is finally selected, and the signalling transmitted using a frequency-domain modulation frequency offset, i.e. a time-domain cyclic shift value, can be derived from the corresponding V value thereto; the method of calculation is not limited herein.

<Example II of Signalling Parsing>

In example II of signalling parsing, the steps of parsing signalling is contained in the preamble symbol receiving method corresponding to example I of signalling parsing, and the overall description of the preamble symbol receiving method is omitted in example II of signalling parsing.

In the step S1-2 of determining the position of the preamble symbol in a physical frame and parsing signalling information carried by the preamble symbol, the signalling parsing step contains the following particular steps:

performing Fourier transform on the time-domain main body signal of each of the time-domain symbol to extract valid subcarriers;

performing a predefined mathematical calculation on each of the valid subcarriers with the known subcarrier corresponding to each known frequency-domain sequence in a set of known frequency-domain signalling of the time-domain symbol and the channel estimation value, and then performing inverse Fourier transform, and obtaining a corresponding inverse Fourier result for each of the known frequency-domain sequence; and each of the time-domain symbol selecting an inverse Fourier selection result from one or more of the inverse Fourier results according to a first predefined selection rule, for directly resolving signalling information or performing a predefined processing operation between a plurality of the time-domain symbols, and resolving the signalling information based on an obtained inter-symbol processing result.

In this example II of signalling parsing: performing an FFT operation on the time-domain main body signal A corresponding to each time-domain symbol, to obtain a frequency-domain signal; taking out the value of valid subcarriers in the frequency-domain signal; after performing a predefined mathematical calculation (a conjugate multiplication/division calculation) on each valid subcarrier with a known valid subcarrier corresponding to each known frequency-domain sequence of the set of known frequency-domain signalling of the symbol and a channel estimation value, conducting IFFT calculation, wherein each known frequency-domain sequence corresponds to one IFFT result, and each symbol corresponds to one or more IFFT results; selecting the most reliable selected IFFT result of each symbol according to the predefined selection rule, and optionally performing predefined processing. A signalling transmission value can be directly obtained based on a selected IFFT result, and it is also possible to further use a processing results between a plurality of symbols to conduct a predefined processing operation (e.g. delayed correlation) again between time-domain symbols to resolve the transmitted signalling (including signalling conveyed using different frequency-domain sequences and/or signalling conveyed transmitted using a frequency-domain modulation frequency offset, i.e. a time-domain cyclic shift value).

The set of known frequency-domain signalling refers to all possible sequences of the time-domain main body signal A corresponding to each time-domain symbol that are used for filling the frequency-domain subcarriers without phase modulation. If the transmitting end has a PN modulation operation, here it refers to all possible frequency-domain sequences after PN modulation.

When the set of known frequency-domain signalling of the symbol has only one known sequence, i.e. signalling is transmitted by only relying on a frequency-domain modulation frequency offset, example II of signalling parsing can be simplified as follows:

performing an FFT calculation on the time-domain main body signal A corresponding to each time-domain symbol, to obtain a frequency-domain signal; taking out the value of valid subcarriers in the frequency-domain signal; performing a predefined mathematical calculation (a conjugate multiplication/division calculation) on each valid subcarrier with a known subcarrier signal corresponding to the unique known frequency-domain sequence corresponding to the time-domain symbol and a channel estimation value, and conducting an IFFT calculation; based on an IFFT result, and optionally performing predefined processing. A signalling transmission value can be directly obtained, and it is also possible to use a processing results between a plurality of symbols to further conduct delayed correlation to resolve the transmitted signalling (signalling conveyed using the frequency-domain modulation frequency offset, i.e. the time-domain cyclic shift value)

Specifically, for some time-domain symbol, the expression of the known sent pre-generated frequency-domain subcarrier without phase modulation corresponding to the time-domain main body signal A thereof is $A_k$, and the expression thereof after phase modulation is $$AM_k = A_k \cdot e^{j\frac{2\pi sk}{N_{FFT}}}, \quad \text{(Formula 69)}$$

where $H_k$ is a channel frequency-domain response, and after passing through a channel, the expression of received frequency-domain data is $$R_k = AM_k \cdot H_k + N_k = A_k \cdot H_k \cdot e^{j\frac{2\pi sk}{N_{FFT}}} + N_k, \quad \text{(Formula 70)}$$
$$k = 0, 1, \ldots N_{FFT} - 1$$

Then a predefined mathematical calculation (a division calculation/conjugate multiplication) is conducted $$E(t)_k = \frac{R_k}{A(t)_k \cdot H_{est,k}} \text{ or } E_k = R_k \cdot (A(t)_k \cdot H_{est,k})^*, \quad \text{(Formula 71)}$$

where $A(t)_k$ indicates the t th known sequence of the set of known frequency-domain sequences; and $t=1, \ldots T$, there are T sequences in total. If the set of known frequency-domain sequences has only one known sequence, i.e. T=1, then $A(l)_k = A_k$, where $H_{est}$ is a channel estimation value.

For example, the predefined mathematical calculation adopts the method of $$E(t)_k = \frac{R_k}{A(t)_k \cdot H_{est,k}},$$

if the set of known frequency-domain sequences comprises only one known sequence, and $H_{est} = H$, then $$E(1)_k = \frac{R_k}{A(1)_k \cdot H_{est,k}} = e^{j\frac{2\pi sk}{N_{FFT}}} + \frac{N_K}{A_k \cdot H_{est,k}}, \quad \text{(Formula 72)}$$

the physical meaning thereof is a phase modulation value of each subcarrier. The predefined mathematical calculation adopts another operation formula $$E(1)_k = \quad \text{(Formula 73)}$$
$$R_k \cdot (A(1)_k \cdot H_{est,k})^* \approx |H_k|^2 \cdot |A_k|^2 e^{j\frac{2\pi sk}{N_{FFT}}} + N_k \cdot A_k^* H_{est,k}^*,$$

which also contains the phase modulation value of each subcarrier.

Then an IFFT calculation is conducted on $E(t)_k$, k=0, 1, ... $N_{FFT}$−1 then IFFT calculation results will be obtained for each time-domain symbol; an absolute value calculation or square of absolute value operation is conducted on the results optionally; then the most reliable one in the T results in the case of t=1, ... T is selected according to the predefined selection rule as the calculation result of the time-domain symbol; and the signalling conveyed by different frequency-domain sequences can be resolved by means the value corresponding thereto. The most reliable judgement method in the predefined selection rule may be using the maximum peak or the maximum peak-to-average ratio, etc.

If the set of known frequency-domain sequences of each time-domain symbol includes only one known sequence, then the step of selecting the one with the maximum peak-average-ratio in T results as the calculation result of the symbol can be omitted, and the unique IFFT result of each symbol can be directly taken.

Figure 24:
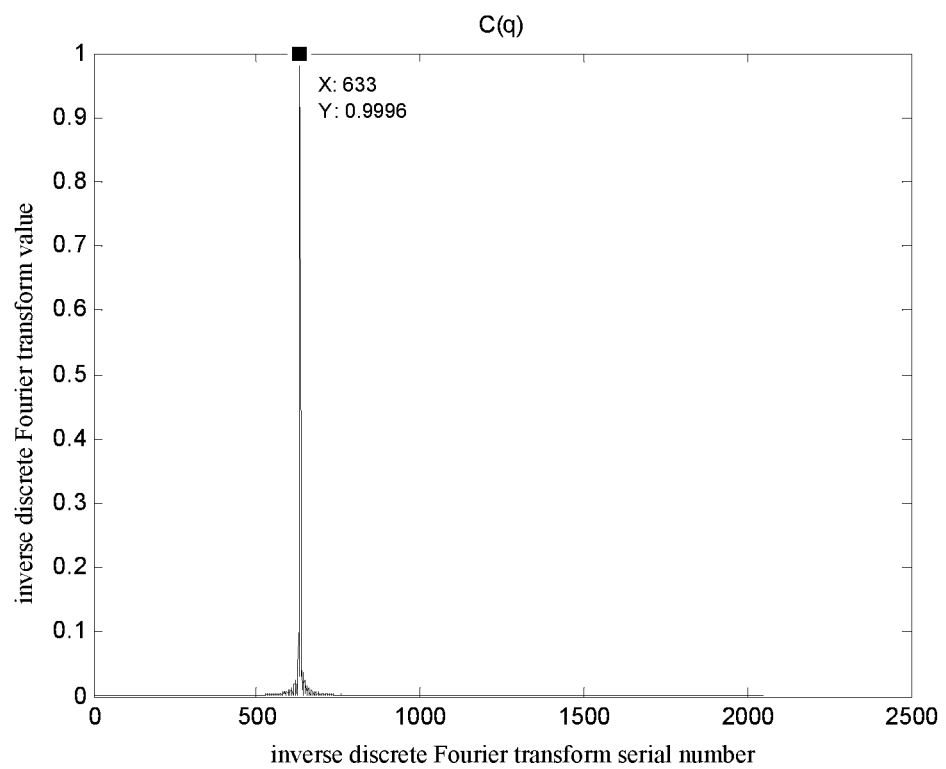
FIG. 24 is an oscillograph of an inverse Fourier result of a time-domain main body signal under AWGN in example II of signalling parsing of the present invention.

FIG. 24 is an oscillograph of an inverse Fourier result of a time-domain main body signal under AWGN in example II of signalling parsing of the present invention. As shown in the figure, the position which the maximum value of the inverse discrete Fourier transform appears at is 633, and the value is 0.9996.

Then assuming that the time-domain part in the preamble symbol includes Q time-domain symbols in total, the following wave form C(q), q=1, ... Q of the Q time-domain symbols will be obtained. Note that C(q) can be a result of some original IFFT selected from T results, and can also be a result after computing the absolute value or the square of absolute value.

At this time, since an operation in the frequency domain can eliminate the influence from the channel, the time-domain cyclic shift value can be derived by directly using the position where the absolute value peak is located in C(q), thus deriving the signalling transmitted using the frequency-domain modulation frequency offset, i.e. the time-domain cyclic shift value, for example, the position corresponding to the maximum peak is 633. (The calculation method is not limited herein.)

However, considering the influence of noise and multipath, and the influence of an interference path under various reasons, noise filtering processing can also be further performed on the calculation result of each symbol, i.e. keeping the maximum value and setting all the smaller values to zero. This step is optional. Processing results corresponding to all time-domain symbols are obtained, and are named as C'(q), q=1, ... Q.

The C'(q) of the later symbol is cyclically shifted, and is multiplied or conjugately multiplied by C'(q−1) of the former symbol and is then accumulated; the one corresponding to the maximum accumulated value in all the shift values is found out, and the transmitted signalling can be derived out using the shift value corresponding thereto. After the pre-generated subcarrier is generated using the frequency-domain sequence of the time-domain main body signal A corresponding to the time-domain symbol satisfying the above-mentioned predefined transmitting rule, the signalling transmission function is realized by performing phase modulation on each valid subcarrier, which is equivalent to the way of performing cyclic shift on the time-domain OFDM symbol after IFFT.

The particular description is as follows: cyclically shifting C'(q) by V to obtain C'(q,V), wherein left-wise shift or right-wise shift can be selected, and right-wise shift is selected in this embodiment, $V \in [0, N_{FFT}-1]$;

and then performing the conjugate multiplication and accumulation calculation as the formula below for example, $$Accum(V) = \sum_{i=0}^{N_{FFT}-1} C'(q-1) \cdot conj(C''(q, V)) \quad \text{(Formula 74)}$$

It should be specially noted that the above-mentioned is just an example, and is not limited to conjugate multiplication; and the multiplication and accumulation operation therein do not have to be performed on $N_{FFT}$ points, and can be performed at some great value points.

Accum(V) with the maximum absolute value is finally selected, and the corresponding V value thereto corresponds to the transmitted signalling.

Note that a first time-domain symbol of a preamble symbol is generally known, and the channel estimation value $H_{est}$ used in the introduction above can be obtained by means of time-domain/frequency-domain estimation of a known sequence, i.e. obtained by dividing a known frequency-domain sequence by a received frequency-domain signal in the frequency domain. With regard to the channel estimation of a subsequent symbol: when the decoding of the previous symbol is achieved, if the decoding is correct, performing channel estimation again in the time domain/frequency domain by using the previous decoded information as known information, and performing some specific operation on it with a previous channel estimation result to obtain a new channel estimation result, for use of channel estimation of the signalling parsing for the next symbol.

It should be specifically noted that, due to the specific mathematical relationship between the IFFT calculation and the FFT calculation, using FFT to realize the IFFT calculation mentioned in the example I of signalling parsing and the example II of signalling parsing equivalently also does not depart from the contents of the present invention.

In both the example I of signalling parsing and the example II of signalling parsing, coherent demodulation is adopted, and noise is eliminated in the time domain, thus having great robust performance under a multi-path channel and a low signal-to-noise ratio. Compared to the direct differential method in the frequency domain using a former and a later symbol in the background art, the present invention avoids the amplification of noise. Moreover, the relative shift of the calculation structures between the former and the later symbols is further used, thus solving the problem of misjudgement in the occurrence of inaccurate channel estimation an interference path due to various reasons.

<Example III of Signalling Parsing>

In example III of signalling parsing of the present invention, the flow of parsing signalling in the preamble symbol receiving method is contained in the same preamble symbol receiving method corresponding to the above-mentioned example I of signalling parsing, and the overall description of the preamble symbol receiving method is omitted in example III of signalling parsing.

In example III of signalling parsing, the step of determining the position of the preamble symbol and parsing signalling information carried by the preamble symbol comprises the following steps:

extending the set of known frequency-domain signalling of each time-domain symbol to be an extended set of know frequency-domain signalling.

performing Fourier transform of the time-domain main body signal of each of the time-domain symbol to extract valid subcarriers;

performing predefined mathematical calculation using each of the valid subcarriers and the known subcarrier corresponding to each known frequency-domain sequence in the extended set of known frequency-domain signalling and the channel estimation value, and then accumulating the calculation values on all the valid subcarriers; and selecting an accumulated value from a plurality of accumulated values according to a second predefined selection rule, using a known frequency-domain sequence of the extended set of known frequency-domain signalling corresponding to the accumulated value to infer the signalling which is transmitted by utilizing frequency-domain modulation frequency offset, i.e. the time-domain cyclic shift value, and inferring a corresponding known frequency-domain sequence in the original set of known frequency-domain signalling before extension, so as to resolve signalling information transmitted by different frequency-domain sequences.

Specifically, first of all, the set of known frequency-domain signalling of each time-domain symbol is extended to be an extended set of know frequency-domain signalling. Then an FFT calculation is performed on the time-domain main body signal A corresponding to each time-domain symbol in the preamble symbol, to obtain a frequency-domain signal, and taking the frequency-domain signal from the value of the valid subcarrier; a predefined mathematical calculation (conjugate multiplication/division calculation) is conducted on each of the valid subcarriers with the subcarrier signal corresponding to each known frequency-domain sequence in the extended set of known frequency-domain signalling and the channel estimation value, and then the calculation values on all the subcarriers are accumulated to obtain an accumulated value. Finally, the most reliable accumulated value is selected based on a plurality of accumulated values according to a second predefined selection rule; the modulation frequency offset value can be inferred using a known frequency-domain sequence of the extended set of known frequency-domain signalling corresponding to the accumulated value, thus obtaining the signalling transmitted using the frequency-domain modulation frequency offset, i.e. the time-domain cyclic shift; a corresponding known frequency-domain sequence in the original set of known frequency-domain signalling before extension is inferred out at the same time, so as to resolve signalling transmitted by different frequency-domain sequences.

When the set of known frequency-domain signalling of the symbol which is not extended has only one known sequence, i.e. signalling is transmitted by only relying on a frequency-domain modulation frequency offset, example III of signalling parsing is simplified as follows:

First of all, the unique known frequency-domain sequence of each symbol is extended to be an extended set of know frequency-domain signalling. Then an FFT calculation is performed on the time-domain main body signal A corresponding to each time-domain symbol, to obtain a frequency-domain signal, and taking the frequency-domain signal from the value of the valid subcarrier; performing a predefined calculation (conjugate multiplication/division calculation) on each of the valid subcarriers with the subcarrier corresponding to each known frequency-domain sequence in the extended set of known frequency-domain signalling and the channel estimation value, and then accumulating the calculation values on all the subcarriers to obtain an accumulated value. Finally, the most reliable accumulated value is selected based on a plurality of accumulated values; the modulation frequency offset value can be inferred using a corresponding known frequency-domain sequence in the extended set of known frequency-domain signalling, thus obtaining the signalling transmitted using the frequency-domain modulation frequency offset, i.e. the time-domain cyclic shift value.

The frequency-domain known signalling set herein refers to all possible frequency-domain sequences of the time-domain main body signal A corresponding to each time-domain symbol that are used for filling the frequency-domain subcarriers without phase modulation. If the transmitting end has a PN modulation operation, here it refers to all possible frequency-domain sequences after PN modulation.

The extended set of known frequency-domain signalling is obtained by: performing corresponding subcarrier phase modulation on each known frequency-domain sequence in the known frequency-domain signalling set according to all possible frequency offset values, and using all possible S modulation frequency offset values thereof to generate S known sequences after frequency offsets modulation. By way of example, if the original set of known frequency-domain signalling include T known frequency-domain sequences $L_t, L_2, \ldots, L_T$, then $L_{t,1}, L_{t,2}, \ldots, L_{t,S}$ and the like would be obtained respectively for each known frequency-domain sequence $L_t$ according to S modulation frequency offset values. By way of example:

$$L_{k,t,s} = L_{k,t} \cdot e^{j\frac{2\pi sk}{N_{FFT}}}, k = 0, 1, , N_{FFT} - 1,$$

where k corresponds to a subcarrier serial number, with the serial number of a zero subcarrier being 0. The number S of modulation frequency offset values is multiplied by the number T of known frequency-domain sequences, then T known frequency-domain sequences would be extended to be T·S known frequency-domain sequences, constructing an extended set of known frequency-domain signalling.

When the set of known frequency-domain signalling of the symbol which is not extended has only one known sequence, i.e. signalling is transmitted by only relying on a frequency-domain modulation frequency offset, namely, the time-domain cyclic shift value, i.e. T=1, then the extended set contains S known frequency-domain sequences in total.

Specifically, for example, assuming $K=0:N_{zc}-1$, where $N_{zc}$ is the number of valid subcarriers, $H_{est,k}$ is a channel estimation value corresponding to the kth valid subcarrier, $R_k$ is the value of the kth valid subcarrier received, $L_{k,t,s}$ is the kth value of the (t, s)th sequence in the extended set of known frequency-domain sequences;
then $$corr_{t,s} = Re\left(\sum_{k=0}^{N_{ZC}-1} R_k H^*_{est,k} L^*_{k,t,s}\right) \quad \text{(Formula 75)}$$
$t = 0: T-1 \quad s = 0: S-1$ or $$corr_{t,s} = \left|\left(\sum_{k=0}^{N_{ZC}-1} R_k H^*_{est,k} L^*_{k,t,s}\right)\right| \quad \text{(Formula 76)}$$
$t = 0: T-1 \quad s = 0: S-1$ where | | indicates the operation of calculating an absolute value.

Taking t and s corresponding to $\max(corr_{t,s})$, the modulation frequency offset value can be inferred using a known frequency-domain sequence corresponding to s in the extended set of known frequency-domain signalling, thus obtaining the signalling transmitted using the frequency-domain modulation frequency offset, i.e. the time-domain cyclic shift; a corresponding known frequency-domain sequence in the original set of known frequency-domain signalling before extension is inferred using t at the same time, so as to resolve signalling transmitted by different frequency-domain sequences.

When the set of known frequency-domain signalling of the symbol which is not extended has only one known sequence, i.e. signalling is transmitted by only relying on a frequency-domain modulation frequency offset, namely, the time-domain cyclic shift value, i.e. T=1, then the extended set contains S known frequency-domain sequences in total. The modulation frequency offset value can be inferred using a known frequency-domain sequence corresponding to s in the extended set of known frequency-domain signalling, thus obtaining the signalling transmitted using the frequency-domain modulation frequency offset, i.e. the time-domain cyclic shift.

Note that a PFC part in a first time-domain symbol is generally known; therefore, the channel estimation value $H_{est}$ used in the introduction above can be obtained by means of time-domain/frequency-domain estimation of a known sequence, i.e. obtained by dividing a known frequency-domain sequence by a received frequency-domain signal in the frequency domain. With regard to the channel estimation of a subsequent symbol: when the decoding of the previous symbol is achieved, if the decoding is correct, performing channel estimation again in the time domain/frequency domain by using the previous decoded information as sending information, and performing some specific calculation on it with a previous channel estimation result to obtain a new channel estimation result, for use of the signalling parsing for the next symbol.

This embodiment also provides a preamble symbol receiving device stated in the Content of the invention above; the preamble symbol receiving device correspond to the preamble symbol receiving method in the above-mentioned embodiments; then all the structural and technical factors of the device can be derived from the receiving method, thus the description therefor will be omitted.

The present invention has been disclosed above with the preferred embodiments which, however, are not intended to limit the present invention, and any person skilled in the art could make possible changes and alterations to the technical solutions of the present invention using the disclosed method and technical contents described above without departing from the spirit and scope of the present invention. Therefore, any simple alteration, equivalent change and modification which are made to the above-mentioned embodiments in accordance with the technical substance of the present invention and without departing from the contents of the present invention, will fall within the scope of protection of the technical solutions of the present invention.

The invention claimed is:

1. A preamble symbol receiving method, characterized by comprising the following steps:
    receiving a signal;
    processing the received signal;
    determining whether the processed signal obtained contains a preamble symbol; and
    in response to determining that the processed signal contains the preamble symbol, determining a position of the preamble symbol and demodulating signalling information carried by the preamble symbol,
    wherein the received preamble symbol comprises at least one time-domain symbol generated by using a combination of at least one first three-segment structure and at least one second three-segment structure according to a predefined generation rule,
    the first three-segment structure containing:
        a first time-domain main body signal,
        a first prefix generated based on a first portion, less than an entirety, of the first time-domain main body signal, and
        a postfix generated based on a portion, less than an entirety, of the first portion of the first time-domain main body signal, and
    the second three-segment structure containing:
        a second time-domain main body signal,
        a second prefix generated based on a second portion, less than an entirety, of the second time-domain main body signal, and
        a hyper prefix generated based on a portion, less than an entirety, of the second portion of the second time-domain main body signal,
    wherein the first time-domain main body signal and the second time-domain main body signal are a same time-domain main body signal or two different time-domain main body signals.

2. The preamble symbol receiving method of claim 1, characterized in that the steps of
    determining whether the processed signal obtained contains the preamble symbol desired to be received, and
    in response to determining that the processed signal obtains the preamble symbol, determining the position of the preamble symbol and demodulating signalling information carried by the preamble symbol contain at least any one of the following steps:
initial timing synchronization,
integer frequency offset estimation,
fine timing synchronization,
channel estimation, decoding analysis and fractional frequency offset estimation.

3. The preamble symbol receiving method of claim 2, characterized in that
the position of the preamble symbol is preliminarily determined by performing initial timing synchronization, and
determining whether the processed signal contains the preamble symbol is based on a result of the initial timing synchronization, whether the processed signal contains the preamble symbol containing the first three-segment structure and the second three-segment structure.

4. The preamble symbol receiving method of claim 3, characterized in that
the position of the preamble symbol is preliminarily determined by using one of the following initial timing synchronization methods,
a first initial timing synchronization method, comprising:
performing inverse processing on the processed signal by utilizing a processing relationship between any two segments in a first predefined three-segment time-domain structure and/or a second predefined three-segment time-domain structure, and performing delayed moving autocorrelation to acquire basic accumulation correlation values;
in response to determining that the signal comprises at least two time-domain symbols with the first three-segment structure or the second three-segment structure, grouping the basic accumulation correlation values according to different delay lengths of the delayed moving autocorrelation, and performing at least one delay relationship match and/or phase adjustment between symbols in each group according to a specific assembling relationship of the at least two time-domain symbols, and then carrying out a mathematical calculation to obtain several final accumulation correlation values with regard to a certain delay length, and in response to determining that there is only one time-domain symbol with the first three-segment structure or the second three-segment structure, the final accumulation correlation value is the basic accumulation correlation value; and
after performing delay relationship match and/or a specific predefined mathematical calculation based on at least one of the final accumulation correlation values, using the result of the calculation for initial timing synchronization; and
a second initial timing synchronization method, comprising:
in response to determining that the first time-domain main body signal or the second time-domain main body signal in any three-segment structure in the preamble symbol contains a known signal, performing a differential operation on the first time-domain main body signal or the second time-domain main body signal in accordance with N predefined differential values, and also performing a differential operation on a time-domain signal corresponding to known information, then correlating the two to obtain N sets of differential correlated results corresponding to the N differential values on a one-to-one basis, and performing initial synchronization based on the N sets of differential correlated results to obtain processed values for preliminarily determining the position of the preamble symbol, where N >1,
wherein the determination of the position of the preamble symbol is completed after performing the first initial timing synchronization method or the second initial timing synchronization method by: weighting the processed values obtained respectively, and completing initial timing synchronization using the weighted results.

5. The preamble symbol receiving method of claim 4, characterized in that the first initial timing synchronization method comprises:
in response to determining that the signal comprises two time-domain symbols with the first three-segment structure or the second three-segment structure, grouping the basic accumulation correlation values according to different delay lengths of the delayed moving autocorrelation, and for each set, performing one delay relationship match and/or phase adjustment between symbols according to a assembling relationship specific to the two time-domain symbols, and then carrying out a mathematical calculation to obtain several final accumulation correlation values with a certain delay length.

6. The preamble symbol receiving method of claim 5, characterized in that the first initial timing synchronization method further comprises adjusting, within a certain range, delay lengths that there should be during each delayed moving autocorrelation, to form a plurality of adjusted delay lengths;
then performing delayed moving autocorrelation according to the plurality of obtained adjusted delay lengths and the delay lengths that there should be, and choosing a largest correlation result as the basic accumulation correlation value.

7. The preamble symbol receiving method of claim 4, characterized in that the N differential values are selected according to at least any one of the following predefined differential selection rules, for initial synchronization:
a first predefined differential selection rule containing: selecting any several differential values within the range of the length of a local time-domain sequence corresponding to the known information; and
a second predefined differential selection rule contains: selecting several different values which constitute an arithmetic sequence, within the range of the length of a local temporal sequence corresponding to the known information.

8. The preamble symbol receiving method of claim 7, characterized in that responsive to selecting the N differential values according to the first predefined differential selection rule, accumulating or averaging the weighted absolute values of N sets of differential correlated results obtained on a one-to-one basis; or
responsive to selecting the N differential values according to the first predefined differential selection rule or the second predefined differential selection rule, accumulating or averaging weighted vectors of the obtained N sets of differential correlated results.

9. The preamble symbol receiving method of claim 4, characterized in that fractional frequency offset estimation is conducted by utilizing a result of the first initial timing synchronization method and/or the second initial timing synchronization method,
wherein the result of the first initial timing synchronization method comprises the final accumulation correlation value obtained by performing predefined processing calculation utilizing a processing relationship corresponding to the first time-domain main body signal and the first prefix in the first three-segment structure and/or the second time-domain main body signal and the second prefix in the second three-segment structure, and a second fractional frequency offset value calculated from the accumulation correlation value;

wherein the result of the first initial timing synchronization method also comprises two of the several final accumulation correlation values obtained by performing predefined processing calculation utilizing a processing relationship corresponding to the first time-domain main body signal and the postfix or the second time-domain main body signal and the hyper prefix and a processing relationship corresponding to the first prefix and the postfix or the second prefix and the hyper prefix in the first three-segment structure and the second three-segment structure, and a third fractional frequency offset value is calculated from the two accumulation correlation values;

wherein the fractional frequency offset estimation is conducted based on at least any one of the obtained second fractional frequency offset value and third fractional frequency offset value; and wherein the results of the first initial timing synchronization method and the second initial timing synchronization method comprise a fractional frequency offset value based on at least any one of or a combination of at least any two of the first fractional frequency offset value, the second fractional frequency offset value and the third fractional frequency offset value.

10. The preamble symbol receiving method of claim 2, characterized in that based on a result of the initial timing synchronization, in response to detecting that the result satisfies a pre-set condition, then it is determined that the processed signal contains an expected preamble symbol containing the first three-segment structure or the second three-segment structure, wherein the pre-set condition contains:

conducting a specific calculation based on the result of the initial timing synchronization, and then determining whether a maximum value of a calculation result exceeds a predefined threshold, or further determining it in conjunction with an integer frequency offset estimation result and/or a decoding result.

11. The preamble symbol receiving method of claim 2, characterized in that the preamble symbol receiving method further comprises:

conducting fractional frequency offset estimation by utilizing a result of the initial timing synchronization.

12. The preamble symbol receiving method of claim 2, characterized in that in response to determining that the time-domain main body signal in the preamble symbol or a corresponding frequency-domain main body signal contains a known signal, the preamble symbol receiving method further comprises integer frequency offset estimation in any of the following manners:

according to a result of the initial timing synchronization, truncating a section of time-domain signal at least containing the entirety or a portion of the time-domain main body signal, modulating the truncated section of time-domain signal using different frequency offsets in a frequency sweeping manner to obtain N frequency sweeping time-domain signals corresponding to the offset values on a one-to-one basis, and after performing moving correlation between a known time-domain signal obtained by performing inverse Fourier transform on a known frequency-domain sequence and each frequency sweeping time-domain signal, comparing the maximum correlation peaks of N correlation results, regarding a frequency offset value by which a frequency sweeping time-domain signal corresponding to the maximum correlation result is modulated as the integer frequency offset estimation value; or performing Fourier transform on the time-domain signal which is truncated to the length of the time-domain main body signal according to the result of the initial timing synchronization, conducting cyclic shift on the obtained frequency-domain subcarriers using different shift values within a frequency sweeping range, truncating a received sequence corresponding to an active subcarrier, performing predefined calculation and then inverse transform on the received sequence and the known frequency-domain sequence, performing selection from several groups of inverse transform results corresponding to the shift values on a one-to-one basis to obtain a corresponding shift value, and obtaining the integer frequency offset estimation value according to a corresponding relationship between the shift value and the integer frequency offset estimation value.

13. The preamble symbol receiving method of claim 2, characterized in that the step of channel estimation comprises:

performing on the time domain and/or on the frequency domain:

after finishing the decoding of a previous first time-domain main body signal or a previous second time-domain main body signal, using obtained decoded information as known information to perform channel estimation on the time domain/frequency domain once again and perform certain specific calculation with a previous channel estimation result to obtain a new channel estimation result, which will be used in channel estimation of signalling parsing for a next first time-domain main body signal or a next second time-domain main body signal.

14. The preamble symbol receiving method of claim 1, characterized in that at least any one of the following is utilized to determine whether the processed signal contains the preamble symbol desired to be received:

an initial timing synchronization method,
an integer frequency offset estimation method,
a fine timing synchronization method,
a channel estimation method,
a decoding result analysis method and
a fractional frequency offset estimation method.

15. The preamble symbol receiving method of claim 1, characterized in that the step of determining the position of the preamble symbol and demodulating signalling information carried by the preamble symbol comprises:

demodulating signalling information carried by the preamble symbol by utilizing the entirety or a portion of a time-domain waveform of the preamble symbol and/or a frequency-domain signal obtained from the entirety or a portion of the time-domain waveform of the preamble symbol through Fourier transform.

16. The preamble symbol receiving method of claim 1, characterized in that in the predefined generation rule, the generated preamble symbol comprises:
   a free combination of several time-domain symbols with the first three-segment structure and several time-domain symbols with the second three-segment structure arranged in any order,
   wherein the first three-segment structure contains:
      the first time-domain main body signal,
      the first prefix generated based on a rear part of the first time-domain main body signal, and
      the postfix generated based on the rear part of the first time-domain main body signal, and
   the second three-segment structure contains:
      the second time-domain main body signal,
      the second prefix generated based on a rear part of the second time-domain main body signal, and
      the hyper prefix generated based on the rear part of the second time-domain main body signal.

17. The preamble symbol receiving method of claim 16, characterized in that
   wherein responsive to generating the postfix or the hyper prefix by truncating a partial signal from the first time-domain main body signal or the second time-domain main body signal, transmitting different signalling information using different start points of the truncation, and
   the signalling is parsed based on the following:
   delay relationships of the same content between the first prefix and the postfix, between the second prefix and the hyper prefix, between the first prefix and the first time-domain main body signal, between the second prefix and the second time-domain main body signal, between the first time-domain main body signal and the postfix, and/or between the second time-domain main body signal and the hyper prefix.

18. The preamble symbol receiving method of claim 17, characterized in that the parsed signalling contains emergency broadcast.

19. The preamble symbol receiving method of claim 1, characterized in that
   the preamble symbol is obtained by processing a frequency-domain symbol, and
   a generation step of the frequency-domain symbol comprises:
   arranging a fixed sequence and a signalling sequence, which are generated respectively, in a predefined arrangement rule, and
   filling an active subcarrier with an arranged fixed sequence and the signalling sequence.

20. The preamble symbol receiving method of claim 19, characterized in that the step of
   demodulating signalling information carried by the preamble symbol comprises:
   demodulating the signalling information carried by signalling sequence subcarriers in the preamble symbol by performing calculation using a signal containing all or some of the signalling sequence subcarriers and a set of signalling sequence subcarriers, or
   demodulating the signalling information carried by the signalling sequence subcarriers in the preamble symbol by performing calculation using a time-domain signal corresponding to the entirety or a portion of the set of signalling sequence subcarriers.

21. The preamble symbol receiving method of claim 19, characterized in that conducting fine timing synchronization using a fixed subcarrier sequence contained in at least one time-domain symbol.

22. The preamble symbol receiving method of claim 1, characterized in that
   the received preamble symbol is obtained by processing frequency-domain subcarriers,
   the frequency-domain subcarriers being generated based on a frequency-domain main body sequence, the steps of generating the frequency-domain subcarriers contain:
   a predefined sequence generation rule for generating the frequency-domain main body sequence, and/or a predefined processing rule for processing the frequency-domain main body sequence to generate the frequency-domain subcarriers;
   the predefined sequence generation rule contains either one of or a combination of two of the following:
      generating a sequence based on different sequence generation formulas; or
      generating a sequence based on the same sequence generation formula, and
      further performing cyclic shift on the generated sequence,
   the predefined processing rule contains:
   according to the frequency offset value, performing phase modulation on a pre-generated subcarrier which is obtained by processing the frequency-domain main body sequence.

23. The preamble symbol receiving method of claim 22, characterized in that
   in response to determining that the preamble symbol contains at least one time-domain symbol, in the case where a first time-domain symbol contains known information, fine timing synchronization is conducted by utilizing the known information.

24. The preamble symbol receiving method of claim 22, characterized in that
   in a step of parsing signalling information, firstly, producing a set of known signalling sequences using all possible different root values and/or different frequency-domain shift values, and
   then conducting calculation using the set of signalling sequences and all possible frequency-domain modulation frequency offset values and a received frequency-domain main body sequence.

25. The preamble symbol receiving method of claim 22, characterized in that
   in response to determining that the first time-domain main body signal or the second time-domain main body signal in the preamble symbol or a corresponding frequency-domain main body signal contains a known signal, the preamble symbol receiving method further comprises integer frequency offset estimation in any of the following manners:
   according to a result of the initial timing synchronization, truncating a section of time-domain signal at least containing the entirety or a portion of the first time-domain main body signal or the second time-domain main body signal,
   modulating the truncated section of time-domain signal using different frequency offsets in a frequency sweeping manner to obtain N frequency sweeping time-domain signals corresponding to the offset values on a one-to-one basis, and after performing moving correlation between a known time-domain signal obtained by performing inverse Fourier transform on a known frequency-domain sequence and each frequency sweeping time-domain signal, comparing the maximum correlation peaks of N correlation results, wherein a frequency offset value by which a frequency sweeping time-domain signal corresponding to the maximum correlation result is modulated is the integer frequency offset estimation value; or performing Fourier transform on the time-domain signal which is truncated to the length of the first time-domain main body signal or the second time-domain main body signal according to the result of the initial timing synchronization, conducting cyclic shift on the obtained frequency-domain subcarriers using different shift values within a frequency sweeping range, truncating a received sequence corresponding to an active subcarrier, performing predefined calculation and then inverse transform on the received sequence and the known frequency-domain sequence, performing selection from several groups of inverse transform results corresponding to several groups of shift values on a one-to-one basis to obtain a corresponding shift value, and obtaining the integer frequency offset estimation value according to a corresponding relationship between the shift value and the integer frequency offset estimation value.

26. The preamble symbol receiving method of claim 25, characterized in that after the integer frequency offset estimation, compensating a frequency offset and parsing the transmitted signalling.

27. The preamble symbol receiving method of claim 22, characterized in that the step of channel estimation comprises:

performing on the time domain and/or on the frequency domain: after finishing the decoding of a previous first time-domain main body signal or a previous second time-domain main body signal, using obtained decoded information as known information to perform channel estimation on the time domain/frequency domain once again and perform certain specific calculation with a previous channel estimation result to obtain a new channel estimation result, which will be used in channel estimation of signalling parsing for a next first time-domain main body signal or a next second time-domain main body signal.

28. The preamble symbol receiving method of claim 22, characterized in that, the process of generating the frequency-domain subcarrier according to the predefined sequence generation rule comprises:

performing a specific mathematical calculation on the frequency-domain signalling subcarriers and the channel estimation result, and all possible frequency-domain main body sequences, so as to parse the signalling, wherein the specific mathematical calculation contains any one of the following:

maximum likelihood correlation calculation incorporating channel estimation; or performing channel equalization on the frequency-domain signalling subcarrier using the channel estimation value, then performing correlation calculation with all of the possible frequency-domain main body sequences, and selecting the maximum correlation value as a decoding result of signalling parsing.

29. The preamble symbol receiving method of claim 22, characterized in that the process of generating the frequency-domain subcarrier includes:

performing phase modulation on a pre-generated subcarrier using the frequency offset value, or performing cyclic shift in the time domain after inverse Fourier transform.

30. The preamble symbol receiving method of claim 29, characterized in that after determining the position of the preamble symbol, the step of demodulating signalling information carried by the preamble symbol comprises:

performing Fourier transform of the first time-domain main body signal or the second time-domain main body signal of each of the time-domain symbol to extract active subcarriers;

performing predefined mathematical calculation using
(i) each of the active subcarriers,
(ii) a known subcarrier signal corresponding to each known frequency-domain sequence in a set of known frequency-domain signalling of the time-domain symbol, and
(iii) a channel estimation result, and then performing inverse Fourier transform, and obtaining a corresponding inverse Fourier result for each of the known frequency-domain sequence; and for each of the time-domain symbol, selecting an inverse Fourier selection result from one or more of the inverse Fourier results according to a first predefined selection rule, performing a predefined processing operation using a plurality of the time-domain symbols, and demodulating the signalling information based on an obtained inter-symbol processing result.

31. The preamble symbol receiving method of claim 30, characterized in that calculating an absolute value or square of the absolute value of the inverse Fourier selection result, and then selecting the inverse Fourier selection result according to the first predefined selection rule.

32. The preamble symbol receiving method of claim 31, characterized in that the first predefined selection rule contains performing
selection according to the maximum peak value and/or performing selection according to the peak-to-average ratio.

33. The preamble symbol receiving method of claim 30, characterized in that the method further comprises:

a noise filtering processing step comprising:

noise filtering processing is performed on the inverse Fourier result of each time-domain symbol, with large values being reserved and all smaller values being set to zero.

34. The preamble symbol receiving method of claim 30, characterized in that the parsed signalling information contains:

signalling transmitted using different frequency-domain sequences and/or signalling transmitted using a frequency-domain modulation frequency offset.

35. The preamble symbol receiving method of claim 30, characterized in that the set of known frequency-domain signalling refers to all possible frequency-domain sequences of the first time-domain main body signal or the second time-domain main body signal that corresponds to each time-domain symbol on frequency-domain subcarriers while phase modulation is not performed.

36. The preamble symbol receiving method of claim 30, characterized in that
in response to determining that there is only one known sequence within a set of known frequency-domain sequences of the time-domain symbols, the first predefined selection rule is:
directly selecting a unique inverse Fourier result of each of the time-domain symbols as the inverse Fourier selection result, then
performing a predefined processing operation between a plurality of the time-domain symbols, and
demodulating the signalling information based on an obtained inter-symbol processing result.

37. The preamble symbol receiving method of claim 30, characterized in that the predefined mathematical calculation contains: conjugate multiplication or division calculation.

38. The preamble symbol receiving method of claim 30, characterized in that the step of performing a predefined processing operation between a plurality of the time-domain symbols and demodulating the signalling information based on an obtained inter-symbol processing result comprises:
multiplying or conjugate multiplying a later time-domain symbol which have been cyclically shifted and a former time-domain symbol, and
accumulating to obtain an accumulated value,
finding out a shift value corresponding to a maximum accumulated value among all the predefined frequency offset values or cyclic shift values, and
deriving the signalling information from the shift value.

39. The preamble symbol receiving method of claim 29, characterized in that the method comprises: the step of determining the position of the preamble symbol and parsing signalling information carried by the preamble symbol comprises: extending the set of known frequency-domain signalling of each time-domain symbol to be an extended set of know frequency-domain signalling;
performing Fourier transform of the first time-domain main body signal or the second time-domain main body signal of each of the time-domain symbol to extract active subcarriers;
performing predefined mathematical calculation using each of the active subcarriers and a known subcarrier signal corresponding to each known frequency-domain sequence in the extended set of known frequency-domain signalling and a channel estimation value, and then accumulating calculation values on all the active subcarriers; and
selecting an accumulated value from a plurality of accumulated values according to a second predefined selection rule, using a known frequency-domain sequence of the extended set of known frequency-domain signalling corresponding to the accumulated value to infer the signalling transmitted, and selecting a corresponding known frequency-domain sequence from the original set of known frequency-domain signalling before extension, so as to demodulate signalling information transmitted by different frequency-domain sequences.

40. The preamble symbol receiving method of claim 39, characterized in that the second predefined selection rule contains performing selection according to a maximum absolute value or performing selection according to a maximum real part.

41. The preamble symbol receiving method of claim 39, characterized in that the set of known frequency-domain signalling refers to all possible frequency-domain sequences of the first time-domain main body signal or the second time-domain main body signal corresponding to each time-domain symbol for filling the frequency-domain subcarriers while phase modulation is not performed.

42. The preamble symbol receiving method of claim 39, characterized in that the extended set of known frequency-domain signalling is obtained in the following way:
performing phase modulation on each known frequency-domain sequence of the set of known frequency-domain signalling on the subcarriers using all possible frequency offset values,
wherein all the possible S modulation frequency offset values correspondingly generate S frequency offset modulated known sequences.

43. The preamble symbol receiving method of claim 42, characterized in that in response to determining that there is only one known sequence within the set of known frequency-domain signalling of the symbol before extension, the extended set of known frequency-domain signalling contains altogether S known frequency-domain sequences, and
the modulation frequency offset value is inferred by utilizing the known frequency-domain sequences of the extended set of known frequency-domain signalling corresponding to the modulation frequency offset s, thus obtaining the signalling information transmitted by the frequency-domain modulation frequency offset.

44. The preamble symbol receiving method of claim 39, characterized in that the predefined mathematical calculation contains: conjugate multiplication or division calculation.

* * * * *